US012625912B2

(12) United States Patent
Devaux et al.

(10) Patent No.:  US 12,625,912 B2
(45) Date of Patent:      May 12, 2026

(54) SYSTEM AND METHOD FOR DYNAMIC QUERY MANAGEMENT USING META-DESCRIPTIONS IN A CONVERSATIONAL SEARCH ENGINE

(71) Applicant: AMADEUS S.A.S., Biot (FR)

(72) Inventors: Yannick Devaux, Mougins (FR); Alex Prengere, Antibes (FR); Kevin Hamon, Dallas, TX (US); Thibault Toledano, Roquefort-les-Pins (FR); Julien Bianchi, Nice (FR); Romain Meynard, Antibes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/650,903

(22) Filed: Apr. 30, 2024

(65) Prior Publication Data

US 2024/0370505 A1       Nov. 7, 2024

Related U.S. Application Data

(60) Provisional application No. 63/463,146, filed on May 1, 2023.

(51) Int. Cl.
G06F 16/9532          (2019.01)
G06F 16/901          (2019.01)
(Continued)

(52) U.S. Cl.
CPC ...... G06F 16/9532 (2019.01); G06F 16/9024 (2019.01); G06F 16/9536 (2019.01);
(Continued)

(58) Field of Classification Search
None
See application file for complete search history.

(56) References Cited

U.S. PATENT DOCUMENTS 9,318,108 B2     4/2016   Gruber et al.
9,426,111 B1     8/2016   Ross
            (Continued)

FOREIGN PATENT DOCUMENTS

CN       116680093 A     9/2023
EP        2657893 A1    10/2013
            (Continued)

OTHER PUBLICATIONS

Zhou, Denny, et al. "Least-to-most prompting enables complex reasoning in large language models." arXiv preprint arXiv:2205. 10625 (2022).

(Continued)

*Primary Examiner* — Tony Mahmoudi
(74) *Attorney, Agent, or Firm* — Perry + Currier Inc.

(57)              ABSTRACT

The present specification provides a search engine server comprising a network interface, a processor, and a memory for storing and executing programming instructions. These instructions enable the server to establish a conversational session with a client device over a network, determine parameters from the client's request intention, and select nodes representing sources within a full domain, including APIs, databases, and large language models. The server can adjust node selection based on additional parameters and create a query graph with nodes corresponding to identified sources. This graph facilitates the execution of network queries based on the client's request intention, thereby optimizing the data retrieval process across various sources.

19 Claims, 29 Drawing Sheets

(51) Int. Cl.

| | |
|---|---|
| *G06F 16/9536* | (2019.01) |
| *G06F 40/35* | (2020.01) |
| *G06N 3/006* | (2023.01) |
| *G06N 3/0455* | (2023.01) |
| *G06N 3/0895* | (2023.01) |

(52) U.S. Cl.

CPC ............. *G06F 40/35* (2020.01); *G06N 3/006* (2013.01); *G06N 3/0455* (2023.01); *G06N 3/0895* (2023.01)

(56) References Cited

U.S. PATENT DOCUMENTS

| | | | | |
|---|---|---|---|---|
| 10,776,189 | B2 | 9/2020 | Bucchi et al. | |
| 11,056,107 | B2 | 7/2021 | Nahamoo et al. | |
| 11,271,803 | B2 | 3/2022 | Cartaya et al. | |
| 11,782,961 | B2 | 10/2023 | Blaya et al. | |
| 2009/0150387 | A1* | 6/2009 | Marchewitz | G06F 16/951 |
| | | | | 707/999.005 |
| 2013/0031113 | A1 | 1/2013 | Feng et al. | |
| 2013/0080447 | A1* | 3/2013 | Ramer | G06Q 30/0275 |
| | | | | 707/748 |
| 2013/0275164 | A1 | 10/2013 | Gruber et al. | |
| 2014/0278597 | A1 | 9/2014 | Wilkinson et al. | |
| 2018/0007448 | A1 | 1/2018 | Gupta et al. | |
| 2019/0370270 | A1* | 12/2019 | Rezaei | G06Q 50/01 |
| 2020/0042334 | A1 | 2/2020 | Radebaugh et al. | |
| 2021/0166160 | A1 | 6/2021 | Ptitsyn et al. | |
| 2021/0382925 | A1* | 12/2021 | Fincun | G06F 40/35 |
| 2021/0409204 | A1 | 12/2021 | Wronski et al. | |
| 2022/0004718 | A1* | 1/2022 | Quamar | G06F 40/35 |
| 2022/0171820 | A1* | 6/2022 | Neun | G06F 16/9537 |
| 2023/0137350 | A1* | 5/2023 | Todoroki | G06V 30/10 |
| | | | | 704/231 |
| 2023/0208840 | A1 | 6/2023 | Venable | |
| 2023/0325725 | A1 | 10/2023 | Lester et al. | |
| 2023/0367973 | A1 | 11/2023 | Konam et al. | |
| 2024/0020019 | A1 | 1/2024 | Zaydman et al. | |
| 2024/0111960 | A1 | 4/2024 | Earle et al. | |
| 2024/0193445 | A1 | 6/2024 | Dong et al. | |
| 2024/0194180 | A1 | 6/2024 | Goldshtein et al. | |
| 2024/0320433 | A1 | 9/2024 | Lott et al. | |
| 2024/0330993 | A1 | 10/2024 | Al-qurishi et al. | |
| 2024/0346256 | A1 | 10/2024 | Qin | |
| 2024/0354346 | A1 | 10/2024 | Lott et al. | |

FOREIGN PATENT DOCUMENTS

| | | | |
|---|---|---|---|
| EP | 4617902 | A1 | 9/2025 |
| EP | 4617903 | A1 | 9/2025 |
| EP | 4675461 | A1 | 1/2026 |

OTHER PUBLICATIONS

Schick, Timo, et al. "Toolformer: Language models can teach themselves to use tools." Advances in Neural Information Processing Systems 36 (2024).

Paranjape, Bhargavi, et al. "Art: Automatic multi-step reasoning and tool-use for large language models." arXiv preprint arXiv:2303.09014 (2023).

Snell, Charlie, et al. "Context-aware language modeling for goal-oriented dialogue systems." arXiv preprint arXiv:2204.10198 (2022).

Kashyap, Dilip, "Exploring the Capabilities of the ChatGPT API: A Beginner's Guide", Jan. 18, 2023, Level Up Coding.

Arigbabu, Olasimbo, "Preventing Conversation Drift in LLM-based Chatbots Using ChatGPT", Mar. 15, 2023, Better Programming.

Shin, Jamin, et al. "Dialogue summaries as dialogue states (DS2), template-guided summarization for few-shot dialogue state tracking." arXiv preprint arXiv:2203.01552 (2022).

Shuster, Kurt, et al. "Blenderbot 3: a deployed conversational agent that continually learns to responsibly engage." arXiv preprint arXiv:2208.03188 (2022).

Anonymous, "ChatGPT plugins OpenAI", Mar. 23, 2023, openai.com, Retrieved from the Internet at URL: https://openai.com/index/chatgpt-plugins/.

Kayak, "Cheap Flights", with English translation, kayak.fr, 2024, Retrieved from the Internet on Jul. 30, 2024 fro URL: https://www.kayak.fr/flights?fid=&adults=1&cabin=e&return_date=21%2F01%2F2024&return_time=a&oneway=n&depart_date=14%2F01%2F2024&depart_time=a&origincode=LHR%2F28501&origin=LHR&destcode=NRT%2F21033&destination=NRT&action=doflights&errorOccurred=true.

U.S. Appl. No. 18/642,288, System, Method and Apparatus for Real Time Internet Searching Using Large Language Models, filed Apr. 22, 2024.

U.S. Appl. No. 18/529,228, System, Method and Apparatus for Network Search Including a Chatbot, filed Dec. 5, 2023.

U.S. Appl. No. 18/596,801, System, Method and Apparatus for Network Search Including a Chatbot, filed Mar. 6, 2024.

U.S. Appl. No. 18/651,096, System, Method and Apparatus for Network Search With Caching, Apr. 30, 2024.

* cited by examiner

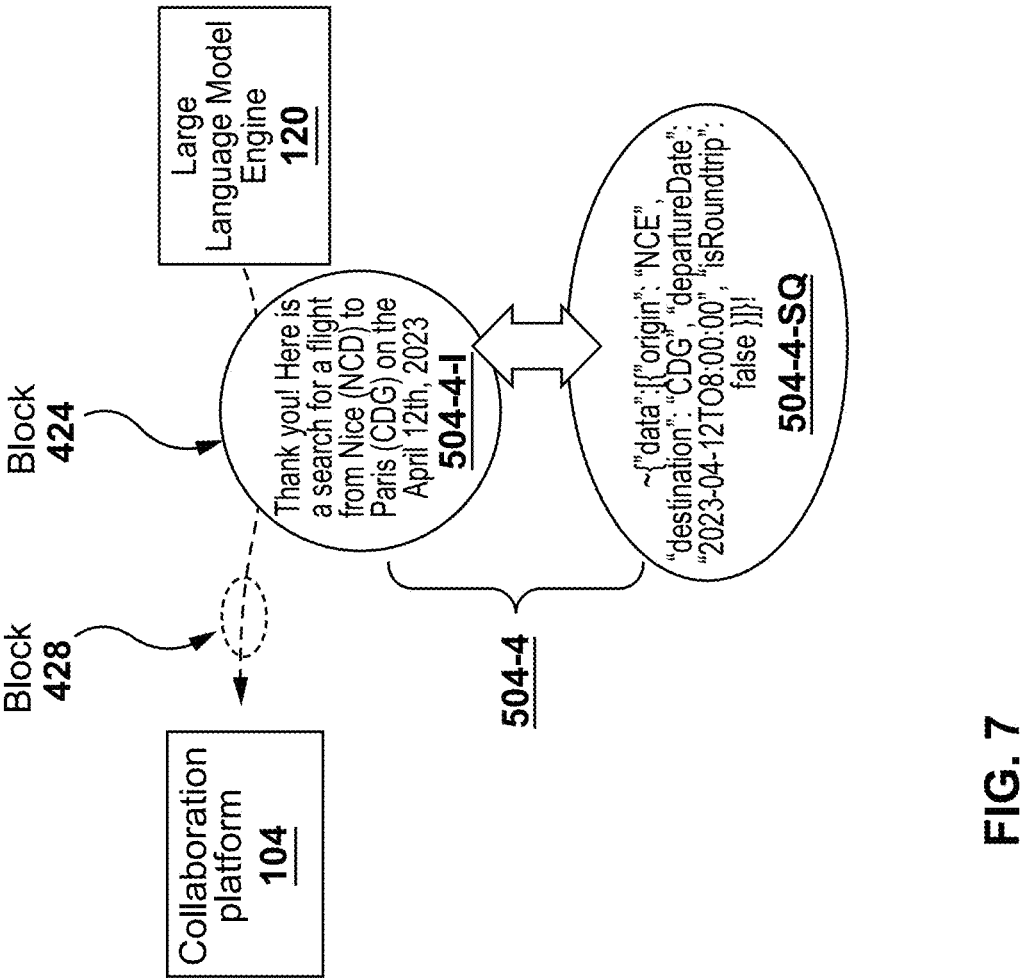
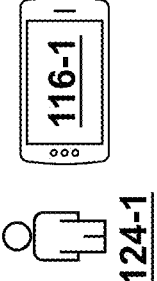
FIG. 7

116a-1

2204

2206

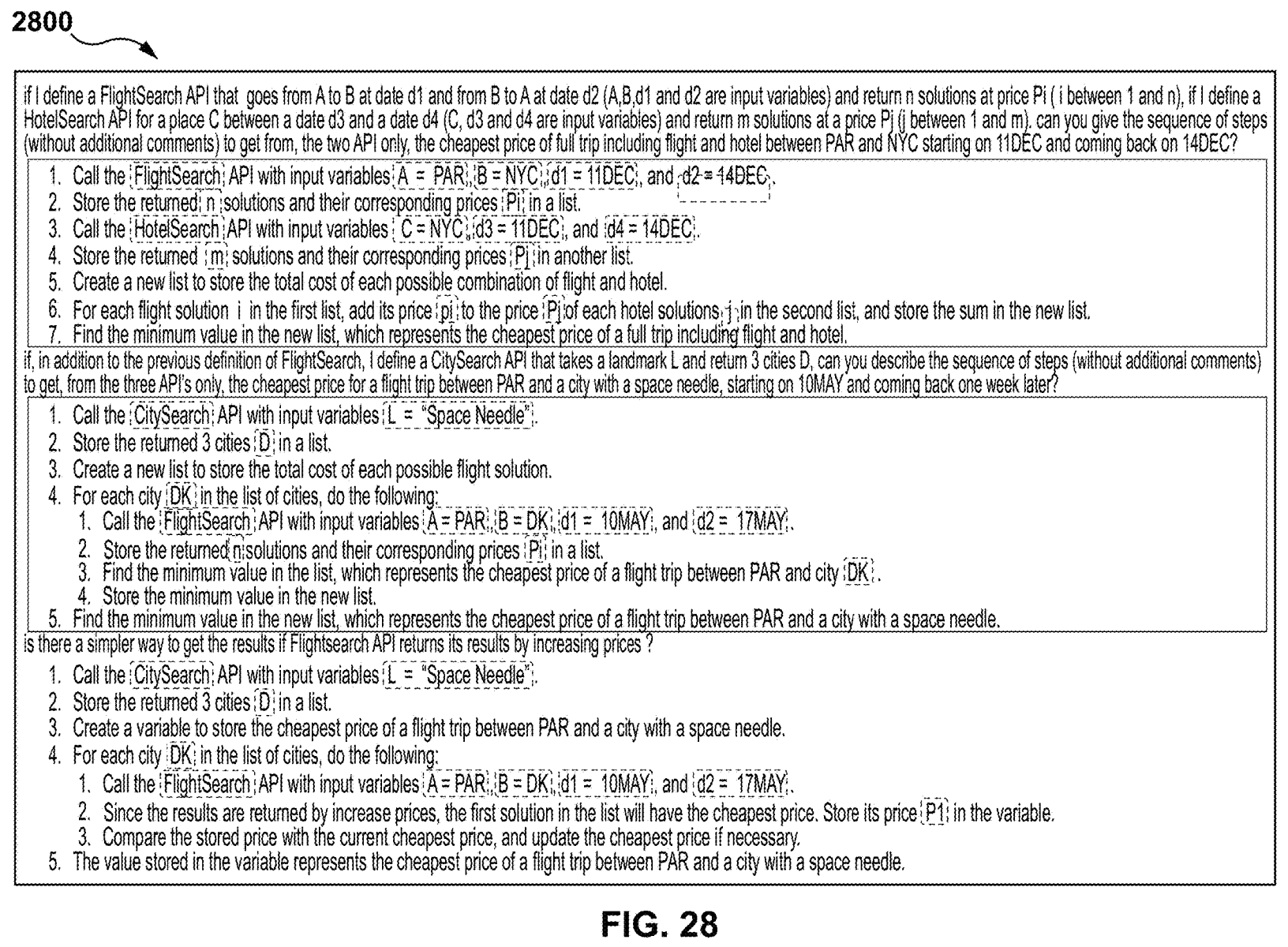

2800

If I define a FlightSearch API that goes from A to B at date d1 and from B to A at date d2 (A,B,d1 and d2 are input variables) and return n solutions at price Pi ( i between 1 and n), if I define a HotelSearch API for a place C between a date d3 and a date d4 (C, d3 and d4 are input variables) and return m solutions at a price Pj ( j between 1 and m), can you give the sequence of steps (without additional comments) to get from, the two API only, the cheapest price of full trip including flight and hotel between PAR and NYC starting on 11DEC and coming back on 14DEC?

1. Call the FlightSearch API with input variables A = PAR, B = NYC, d1 = 11DEC, and d2 = 14DEC.
2. Store the returned n solutions and their corresponding prices Pi in a list.
3. Call the HotelSearch API with input variables C = NYC, d3 = 11DEC, and d4 = 14DEC.
4. Store the returned m solutions and their corresponding prices Pj in another list.
5. Create a new list to store the total cost of each possible combination of flight and hotel.
6. For each flight solution i in the first list, add its price pi to the price Pj of each hotel solutions j in the second list, and store the sum in the new list.
7. Find the minimum value in the new list, which represents the cheapest price of a full trip including flight and hotel.

If, in addition to the previous definition of FlightSearch, I define a CitySearch API that takes a landmark L and return 3 cities D, can you describe the sequence of steps (without additional comments) to get, from the three API's only, the cheapest price for a flight trip between PAR and a city with a space needle, starting on 10MAY and coming back one week later?

1. Call the CitySearch API with input variables L = "Space Needle".
2. Store the returned 3 cities D in a list.
3. Create a new list to store the total cost of each possible flight solution.
4. For each city DK in the list of cities, do the following:
   1. Call the FlightSearch API with input variables A = PAR, B = DK, d1 = 10MAY, and d2 = 17MAY.
   2. Store the returned n solutions and their corresponding prices Pi in a list.
   3. Find the minimum value in the list, which represents the cheapest price of a flight trip between PAR and city DK.
   4. Store the minimum value in the new list.
5. Find the minimum value in the new list, which represents the cheapest price of a flight trip between PAR and a city with a space needle.

Is there a simpler way to get the results if FlightSearch API returns its results by increasing prices ?

1. Call the CitySearch API with input variables L = "Space Needle".
2. Store the returned 3 cities D in a list.
3. Create a variable to store the cheapest price of a flight trip between PAR and a city with a space needle.
4. For each city DK in the list of cities, do the following:
   1. Call the FlightSearch API with input variables A = PAR, B = DK, d1 = 10MAY, and d2 = 17MAY.
   2. Since the results are returned by increase prices, the first solution in the list will have the cheapest price. Store its price P1 in the variable.
   3. Compare the stored price with the current cheapest price, and update the cheapest price if necessary.
5. The value stored in the variable represents the cheapest price of a flight trip between PAR and a city with a space needle.

FIG. 28

SYSTEM AND METHOD FOR DYNAMIC QUERY MANAGEMENT USING META-DESCRIPTIONS IN A CONVERSATIONAL SEARCH ENGINE

PRIORITY CLAIM

The present specification claims priority from U.S. Provisional Patent Application 63/463,146, filed May 1, 2023, the contents of which are incorporated herein by reference.

FIELD

The present disclosure generally relates to network computing and more particularly to searches over the network.

BACKGROUND

The growing complexity of data across multiple domains has presented significant challenges in retrieving relevant information efficiently. Traditional search engine architectures often struggle to handle the diverse data types and sources, such as databases, APIs, and extensive language models. These systems can lack the flexibility to adapt to the nuances of different data sources, leading to inefficiencies in data retrieval and processing. Furthermore, the increasing demand for real-time, accurate search results necessitates a more dynamic approach to data integration and querying, which existing systems are often not equipped to handle effectively.

Moreover, the interaction between client devices and search engines typically relies on static query mechanisms that do not adjust to the changing context or specificity of user requests. This can result in the retrieval of non-optimal information, requiring further searches and therefore wasting computing resources.

U.S. Pat. No. 9,318,108B2 provides a structured approach to automated assistance via computing devices, but it exhibits limitations in adapting dynamically to an extensive and varied data environment. Such predefined interactions do not fully address the complexities of real-time data integration from multiple and potentially unstructured data sources. This restricts the system's ability to refine and optimize search results or actions based on evolving data sets or user contexts, which could hinder the system's overall performance and accuracy in providing relevant responses. Furthermore, the system's dependency on static user input and service calls limits its flexibility in handling asynchronous data flows and adapting outputs to changing information or user needs.

U.S. Pat. No. 10,776,189 introduces a method for constructing a unified data graph to streamline queries across multiple APIs. However, U.S. Pat. No. 10,776,189 primarily focuses on optimizing application programming interface ("API") calls within a predefined framework of endpoints and API specifications. This approach can lack the flexibility to dynamically integrate and process data from emerging or less structured data sources. Additionally, the reliance on static endpoint filtering and API specifications can hinder the ability to respond in real-time to changes in data security, availability, or relevance, which can be critical in environments where data integrity and timeliness are paramount.

U.S. Pat. No. 11,056,107B2 outlines a method for integrating micro-services into conversational applications, focusing on structured dialogue and workflow orchestration. However, it primarily addresses workflow management within predefined parameters and does not offer a solution for dynamically adjusting to unexpected user inputs or changes in dialogue context. This fixed approach can restrict the system's ability to handle more complex or non-linear interactions.

U.S. Pat. No. 11,271,803B2 outlines a method for managing device capabilities within a network to form a virtual device controlled via a virtual finite state machine. This approach, however, focuses on configuration and control processes based on static capability assessments and does not adapt to changes in network conditions or device availability in real-time. Additionally, the method does not address scalability issues or dynamically optimize resource allocation, which are crucial for efficiency in heterogeneous networks. The reliance on a centralized controller device for managing operations introduces bottlenecks or points of failure, affecting the system's overall performance and robustness.

SUMMARY

An aspect of the specification provides a search engine server including a network interface, a processor and a memory for storing programming instructions executable on the processor; the network interface for connecting the processor to a network; the programming instructions including: establishing a conversational session over the network with a client device via the network interface; determining at least one parameter from a request intention within the conversational session; determining a meta-description based on the parameter; selecting, based on the at least one parameter and the meta-description, a plurality of nodes representing sources within a full domain of sources; the sources including at least one of a function call via an application programming interface (API); a database; and a large language model; determining at least one additional parameter; adjusting, based on the additional parameter, the selection of nodes; creating a query graph including nodes respective to the identified sources; and, executing a query over the network based on the request intention using the query graph. 2.

An aspect of the specification provides a search engine server wherein the meta-description is used by a large language model to select the plurality of nodes.

An aspect of the specification provides a search engine server wherein the adjusting is additionally based on a selected number of tokens in the creation of the query graph by the large language model.

An aspect of the specification provides a search engine server wherein the selected number of tokens is less than the selected number of tokens from before the adjusting, and wherein the query produces the same result using either the original number of nodes or the adjusted number of nodes.

An aspect of the specification provides a search engine server, wherein the selected number of tokens is determined by a token limitation algorithm that configures the large language model to operate within a predefined token range; the token limitation algorithm reducing the operational token count to enhance the precision of data retrieval without compromising the integrity of the output produced by the query.

An aspect of the specification provides a search engine server, wherein the reduction in the selected number of tokens enables the processing of additional nodes within the same large language model call, by allocating the saved tokens to represent additional sources, including more application programming interfaces, within the query graph without necessitating multiple calls thereby maintaining the efficiency and coherence of the data retrieval process.

An aspect of the specification provides a search engine server wherein the at least one additional parameter is based on a missing, overly broad or unstructured parameter from the at least one parameter determined from the request intention.

An aspect of the specification provides a search engine server wherein the request intention is planning a travel itinerary and the plurality of sources includes selecting the API and/or the database hosted by a subset of a plurality of online travel solution providers within the full domain of sources.

An aspect of the specification provides a search engine server wherein the at least one additional parameter is determined based on limitation of content available from the selected nodes in comparison to the request intention.

An aspect of the specification provides a search engine server wherein selecting is further based on one or more of a number of travel actor options, price, and availability of travel packages.

An aspect of the specification provides a search engine server wherein adjusting includes adding an additional node to the selected nodes representing at least one of: a) a travel database of a travel website and b) a large language model that includes general knowledge of activities associated with a destination in the travel itinerary.

An aspect of the specification provides a search engine server wherein adjusting includes removing a superfluous one of the selected nodes in the query graph based on the content of the additional node.

An aspect of the specification provides a search engine wherein the at least one additional parameter is based on at least one of a destination, a travel period, a budget and an activity.

An aspect of the specification provides a search engine server wherein the request intention includes planning a dining excursion.

An aspect of the specification provides a search engine server wherein the request intention includes planning an entertainment activity.

An aspect of the specification provides a search engine server wherein the request intention includes defining an investment portfolio.

An aspect of the specification provides a search engine server wherein the request intention includes planning a renovation.

An aspect of the specification provides a search engine server including a network interface, a processor and a memory for storing programming instructions executable on the processor; the network interface for connecting the processor to a network; the programming instructions including: receiving at least one historical data record of a natural language conversation including search questions; determining a first set of parameters from the at least one historical data record including at least one base parameter; deriving a second set of parameters from intention-elements within the respective at least one record; the second set of parameters refining the at least one base parameter of the respective at least one historical data record; querying a master data domain of data based on the first set and the second set; extracting a sparse data domain from the master data domain based on the first set and the second set; and, caching the sparse data domain into an open search domain accessible to client devices connected to the network during subsequent natural language conversations via the client devices.

An aspect of the specification provides a search engine server including a network interface, a processor and a memory for storing programming instructions executable on the processor; the network interface for connecting the processor to a network; the programming instructions including: determining a first set of canonical parameters including at least a base parameter; deriving a second set of canonical parameters from intention-elements that refine the intention-elements; querying a master data domain of data based on the parameters; extracting a sparse data domain from the master data domain based on the parameters; and, caching the sparse data domain into an open search domain accessible to client devices connected to the network.

An aspect of the specification provides a search engine server wherein the master data domain is a travel database and the base parameter includes an origin and the second set of parameters include at least one of a destination, a departure date, a budget, a stay duration, a flight duration, a seat class, an airline.

An aspect of the specification provides a search engine server wherein the master data domain is based on travel itinerary options hosted on a plurality of travel-actor engines.

An aspect of the specification provides a search engine server wherein the travel-actor engines include at least one of a global distribution system (GDS), an airline booking engine, an online travel agency booking engine, new distribution capability (NDC) engine, and a hospitality booking engine, an aggregator booking engine, a travel-review website engine.

An aspect of the specification provides a search engine server wherein the first set of parameters is based on historical searches of the master data domain, the sparse data domain or the open search domain.

An aspect of the specification provides a search engine server, further including programming instructions to: receive and determine additional parameters from client devices, including destination parameters, travel dates, and stay duration parameters; dynamically update the sparse data domain based on the additional parameters received from the client devices; and, provide updated search results in the open search domain to the client devices based on the updated sparse data domain.

An aspect of the specification provides a search engine server, wherein the programming instructions for determining the first set of parameters further include one or more of: specific advance purchase parameters selected from the group consisting of 7, 30, 60, 90, 120, 150, 180, 210, and 240 days; and, specific stay duration parameters selected from the group consisting of 3, 5, 7, and 14 days.

An aspect of the specification provides a search engine server, wherein the programming instructions for extracting the sparse data domain further include: identifying and selecting neutral options from the master data domain based on predetermined criteria; and, filtering recommendations from the neutral options to form at least part of the sparse data domain.

An aspect of the specification provides a search engine server, wherein the programming instructions for caching the sparse data domain further include: storing only fields for value formula computation and later revalidation to match offers; and, caching data from at least one other source; the at least one other source including live traffic cache and New Distribution Capability (NDC) offer repositories.

An aspect of the specification provides a search engine server, wherein the extracting for the sparse data domain includes static cities information based on city popularity, geographies, and regulations.

An aspect of the specification provides a search engine server, wherein the programming instructions are configured to favor comparability and sparsity of travel offers over price accuracy and exhaustively when extracting and caching the sparse data domain.

An aspect of the specification provides a search engine server wherein extracting is based on one or more of flight prices, average daily expenses, average accommodation price, penalties computed from convenience criteria like number of stops, ground time, distance/flying time ratio.

An aspect of the specification provides a search engine server wherein the extracting is based on a statically configured operation or dynamically adjusted in a feedback loop based on input from attached client devices accessing the search domain.

An aspect of the specification provides a search engine server wherein the sparse data domain is based on a ranking of offers in the group based on one or more of price, flight duration, and accommodation level.

An aspect of the specification provides a search engine server wherein the ranking is adjusted based on final selection from a client device and used for generation of search results from the search domain of the next client device accessing the search domain.

An aspect of the specification provides a search engine server wherein the open search domain is integrated into a travel agent chatbot.

An aspect of the specification provides a search engine server wherein a plurality of sparse domains and open search domains are generated for respective origins and client devices respective to different origins can engage in a group search for common destinations within the open search domains.

An aspect of the specification provides a search engine server wherein the open search domain is accessible via an online travel agency (OTA) search website.

An aspect of the specification provides a search engine server wherein the master data domain is a restaurant reservation dining database and the base parameter is the date of the reservation.

An aspect of the specification provides a search engine server wherein the intention-elements include a type of food. The present specification also provides methods, apparatuses and computer-readable media according to the foregoing.

BRIEF DESCRIPTION OF THE FIGURES

FIG. 7 shows example performance of part of the method of FIG. 4.

FIG. 28 is an illustrative representation showcasing the application of a formal API description in the generation of a chain of thought.

DETAILED DESCRIPTION

Figure 1:
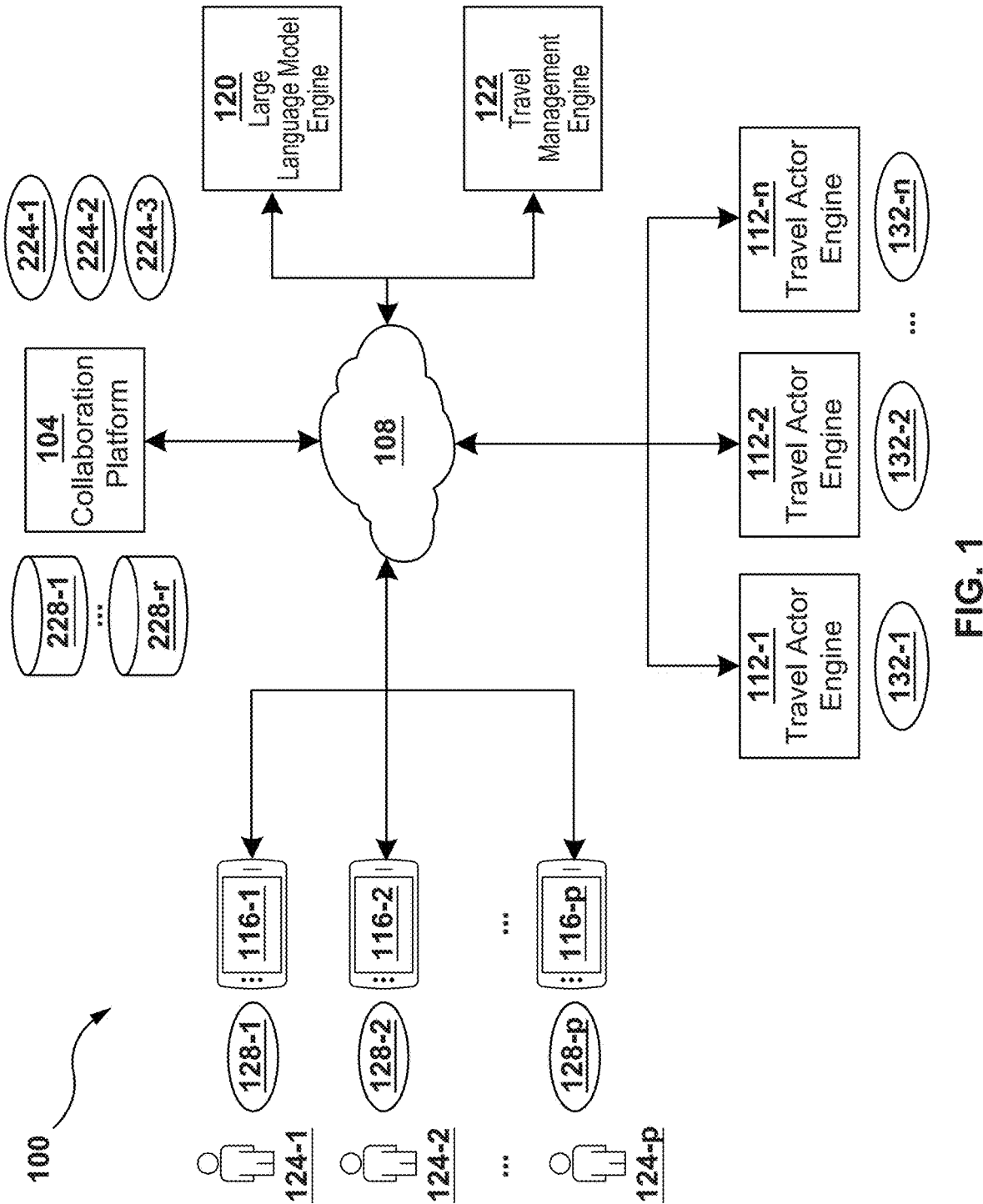
FIG. 1 is a schematic diagram of a system for travel itinerary searching.

FIG. 1 shows a system for travel itinerary searching indicated generally at 100. System 100 comprises a collaboration platform 104 connected to a network 108 such as the Internet. Network 108 interconnects collaboration platform 104 with: a) a plurality of travel actor engines 112; b) a plurality of client devices 116; d) a large language model (LLM) engine 120; and e) a travel management engine 122.

(Note that travel actor engines 112 are individually labelled as 112-1, 112-2 . . . 112-$n$. Collectively, they are referred to as travel actor engines 112, and generically, as travel actor engine 112. The nomenclature is used elsewhere such as for devices 116.)

Devices 116 are operated by individual users 124, each of which use a separate account 128 to access system 100. The present specification contemplates scenarios where, from time to time, users 124 may wish to search for travel itineraries available from one or more travel actors. Collaboration platform 104 performs a number of central processing functions to, amongst other things, manage generation of the travel itineraries by intermediating between devices 116 and engines 112. Collaboration platform 104 will be discussed in greater detail below.

Travel actor engines 112 are operated by different travel actors that provide travel services. Travel actors can include: transportation actors such as airlines, railways, bus companies, taxis, car services, public transit systems, cruise lines or ferry companies; accommodation actors such as hotels, resorts, and bed and breakfasts; hospitality actors such as restaurants, bars, pubs and bistros; and, event actors such as concert venues, theatres, galleries and conference venues. Other examples of travel actors will occur to those of skill in the art. Travel actor engines 112 can be based on a Global Distribution System (GDS) or the New Distribution Capability (NDC) protocol or other travel booking architectures or protocols that can arrange travel itineraries for users 124 with one or more travel actors. Travel actor engines 112 can thus be built on many different technological solutions and their implementation can be based on different distribution channels, including indirect channels such as GDS and/or direct channels like NDC hosted by individual travel actors such as airlines. Booking tools via various travel actor engines 112 can be also provided according to many solutions for different travel content distributors and aggregators including online and offline services such as travel agencies, metasearch tools, NDC, low cost carriers ("LCC") and aggregators that sell airline seats, and the like. Travel actor engines 112 can be "white label" in that they are powered by travel technology companies such as Amadeus™ but branded by other entities, or they can be hosted directly by the travel operator such as an airline operating a particular airline transportation actor or a railway operating a particular railway transportation actor. One or more travel actor engines 112 may also manage accommodation, hospitality and/or event bookings. Travel actor engines 112 may also broadly include platforms or websites that include information about events that may impact travel, including disasters, airport delays, health warnings, severe weather, politics, sports, expos, concerts, festivals, performing arts, public holidays and acts of terrorism. Thus, travel actor engines 112 can even broadly encompass news and weather services.

Client devices 116 can be any type of human-machine interface for interacting with platforms 104. For example, client devices 116 can include traditional laptop computers, desktop computers, mobile phones, tablet computers and any other device that can be used to send and receive communications over network 108 and its various nodes that complement the input and output hardware devices associated with a given client device 116. It is contemplated client devices 116 can include virtual or augmented reality gear complementary to virtual reality or augmented reality or "metaverse" environments that can be offered by variations of collaboration platform 104.

Client devices 116 can include geocoding capability, such as a global position system (GPS) device, that allows the location of a device 116, and therefore its user 124, to be identified within system 100. Other means of implementing geocoding capabilities to ascertain the location of users 124 are contemplated, but in general system 100 can include the functionality to identify the location of each device 116 and/or its respective user 124. For example, the location of a device 116 or a user 124 can also be maintained within collaboration platform 104 or other nodes in system 100.

Client devices 116 are operated by different users 124 that are associated with a respective account 128 that uniquely identifies a given user 124 accessing a given client device 116 in system 100. A person of skill in the art is to recognize that the electronic structure of each account 128 is not particularly limited, and in a simple example embodiment, can be a unique identifier comprising an alpha-numeric sequence that is entirely unique in relation to other accounts 128 in system 100. Accounts 128 can also be based on more complex structures that may include combinations of account credentials (e.g. user name, password, Two-factor authentication token, etc.) that further securely and uniquely identify a given user 124. Accounts 128 can also be associated with other information about the user 124 such as name, address, age, travel document numbers, travel itineraries, language preferences, travel preferences, payment methods, and any other information about a user 124 relevant to the operation of system 100. Accounts 128 themselves may also point to additional accounts (not shown in the Figures) for each user 124, as a plurality of accounts may be uniquely provided for each user 124, with each account being associated with different nodes in system 100. For simplicity of illustration, it will be assumed that one account 128 serves to uniquely identify each user 124 across system 100. Indeed, the salient point is that accounts 128 make each user 124 uniquely identifiable within system 100.

In a present example embodiment, collaboration platform 104 can be based on media platforms or central servers that function to provide communications or other interactions between different users 124. Collaboration functions can include one or more ways to share information between users 124, such as chat, texting, voice calls, image sharing, chat rooms, video conferencing, shared document generation, shared document folders, project management scheduling, individual meeting scheduling either virtually or in person at a common location. Thus, collaboration platform 104 can be based on any known present or future collaboration infrastructure. Non-limiting examples of collaboration platforms 104 include enterprise chat platforms such as Microsoft Teams, or Slack, or can be based on business social media platforms such as Linked-In™. To expand on the possibilities, collaboration platform 104 can be based on social media ecosystems such as TikTok™, Instagram™, Facebook™ or the like. Collaboration platform 104 can also be based on multiplayer gaming environments such as Fortnite™ or metaverse environments such as Roblox™. Collaboration platform 104 can also be based on entire office suites such as Microsoft Office™ or suites of productivity applications that include email, calendaring, to-do lists, and contact management such as Microsoft Outlook™. Collaboration platform 104 can also include geo-code converters such as Google Maps™ or Microsoft Bing™ that can translate or resolve GPS coordinates from devices 116 (or other location sources of users 124) into physical locations. The nature of collaboration platform 104 is thus not particularly limited. Very generally, platform 104 provide a means for users 124 to search for travel itineraries using the particular teachings herein.

Collaboration platform 104 is configured to provide chat-based travel searching functions for devices 116 with assistive chat functions from LLM engine 120, including generation of structured travel search requests from unstructured travel search requests. LLM engine 120 can be based on any large language model platform such as ChatGPT from OpenAI. Notably, the core of LLM engine 120 is limited to a static dataset that is difficult to update, and therefore unable to respond to real-time travel queries on its own.

Travel management engine 122 provides a central gateway for collaboration platform 104 to interact with travel actor engines 112, receiving structured search requests from collaboration platform 104 and conducting searches across travel actor engines 112, and collecting structured search results and returning those results to collaboration platform 104. Travel management engine 122, in variants, can be incorporated directly into collaboration platform 104.

Users 124 can interact, via devices 116, with collaboration platform 104 to conduct real time travel searches across engines 112 via natural language text-based chat. As desired or required, each account 128 (or linked accounts respective to different nodes) can be used by other nodes in system 100, including engines 112 to search, book and manage travel itineraries generated according to the teachings herein.

It is contemplated that collaboration platform 104 has at least one collaboration application 224-1 stored in non-volatile storage of the respective platform 104 and executable on its processor. (The types of potential collaboration applications 224-1 that fulfill different types of collaboration functions were discussed above.) Application 224-1 can be accessed by users 124 via devices 116 and be accessible by collaboration platform 104 to track expressions of travel interest by users 124. The expressions of interest may be direct (e.g. a chat message from a user 124 that says "I would like to book a trip to Paris"). The means by which expressions of interest are gathered is not particularly limited to this example. Platform 104 can include other applications 224 that can also be used to provide a calendar or scheduling functions.

It is contemplated that travel actor engines 112 also include an itinerary management application 132 stored in their non-volatile storage and executable on their processors. Applications 132 can suggest, generate and track individual travel itinerary records for individual users 124 based on travel search requests.

At this point it is to be clarified and understood that the nodes in system 100 are scalable, to accommodate a large number of users 124, devices 116, and travel actor engines 112. Scaling may thus include additional collaboration platforms 104 and/or travel management engines 122.

Figure 2:
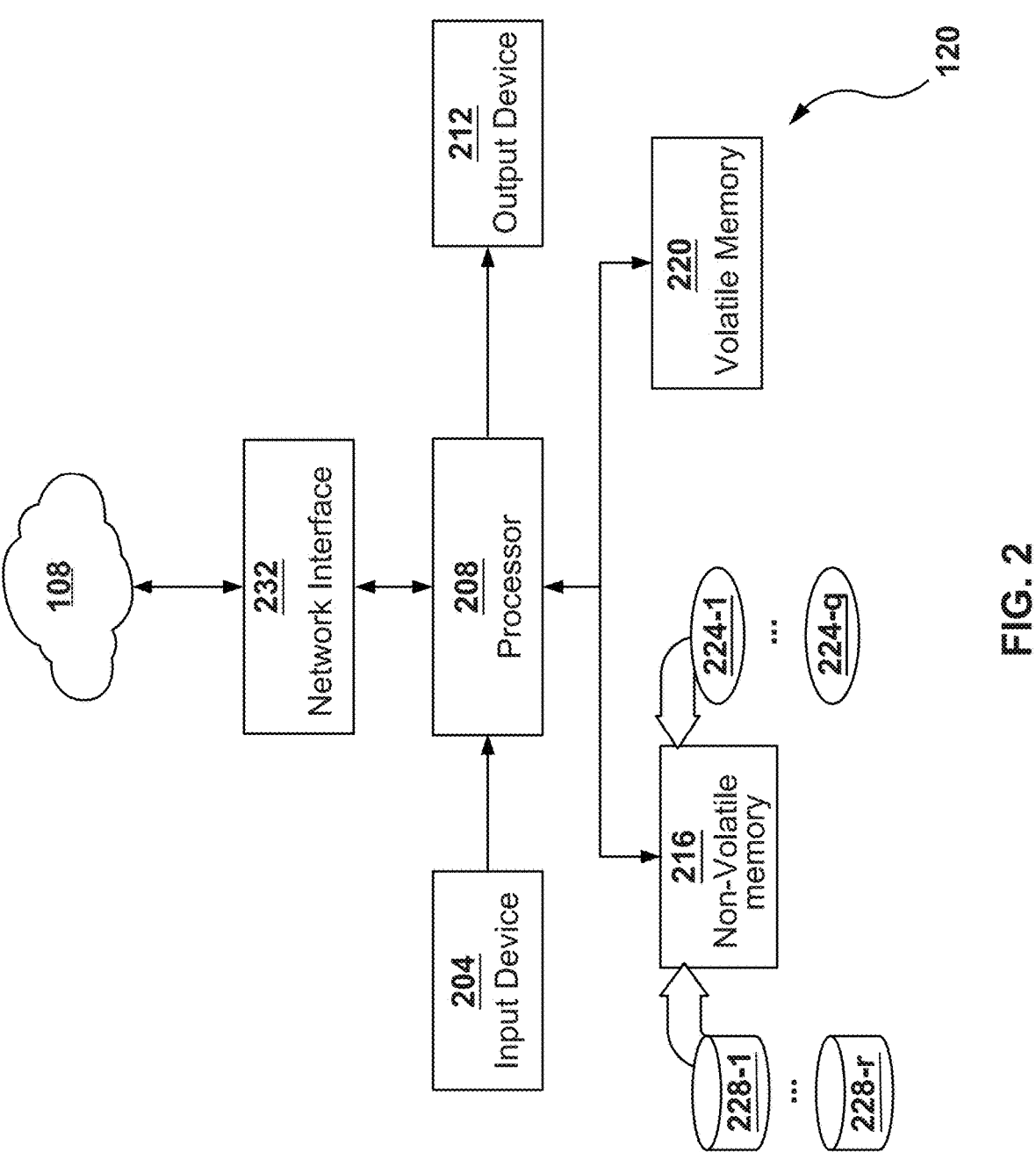
FIG. 2 shows a block diagram of an example internal components of natural language processing engine of FIG. 1.

Having described an overview of system 100, it is useful to comment on the hardware infrastructure of system 100. FIG. 2 shows a schematic diagram of a non-limiting example of internal components of collaboration platform 104.

In this example, collaboration platform 104 includes at least one input device 204. Input from device 204 is received at a processor 208 which in turn controls an output device 212. Input device 204 can be a traditional keyboard and/or mouse to provide physical input. Likewise output device 212 can be a display. In variants, additional and/or other input devices 204 or output devices 212 are contemplated or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of harddisk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 108 via a network interface 232. Network interface 232 can also be used to connect another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. Various methods discussed herein can be coded as one or more applications 224. One or more tables or databases 228 are maintained in non-volatile memory 216 for use by applications 224.

The infrastructure of collaboration platform 104, or a variant thereon, can be used to implement any of the computing nodes in system 100, including LLM engine 120, travel management engine 122 and/or travel actor engines 112. Furthermore, collaboration platform 104, LLM engine 120, travel management engine 122 and/or travel actor engines 112 may also be implemented as virtual machines and/or with mirror images to provide load balancing. They may be combined into a single engine or a plurality of mirrored engines or distributed across a plurality of engines. Functions of collaboration platform 104 may also be distributed amongst different nodes, such as within LLM engine 120, travel management engine 122 and/or travel actor engines 112, thereby obviating the need for a central collaboration platform 104, having a collaboration platform 104 with partial functionality while the remaining functionality is effected by other nodes in system 100. By the same token, a plurality of collaboration platforms 104 may be provided, especially when system 100 is scaled.

Furthermore, a person of skill in the art will recognize that the core elements of processor 208, input device 204, output device 212, non-volatile memory 216, volatile memory 220 and network interface 232, as described in relation to the server environment of collaboration platform 104, have analogues in the different form factors of client machines such as those that can be used to implement client devices 116. Again, client devices 116 can be based on computer workstations, laptop computers, tablet computers, mobile telephony devices or the like.

Figure 3:
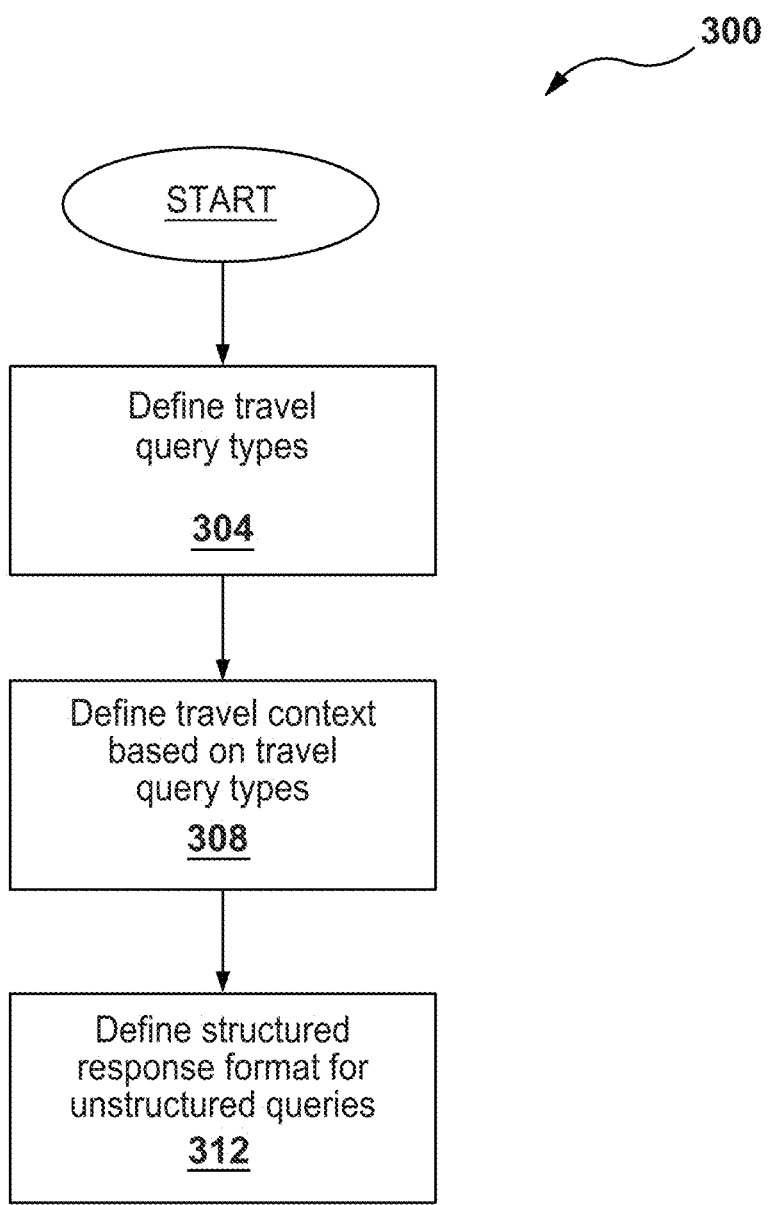
FIG. 3 shows a flowchart depicting a method for configuring the system of FIG. 1 for travel itinerary searching.

FIG. 3 shows a flowchart depicting a method for configuring a real time travel chatbot indicated generally at 300. Method 300 can be implemented on system 100. Persons skilled in the art may choose to implement method 300 on system 100 or variants thereon, or with certain blocks omitted, performed in parallel or in a different order than shown. Method 300 can thus also be varied. However, for purposes of explanation, method 300 will be described in relation to its performance on system 100 with a specific focus on treating method 300 as, for example, application 224-2 maintained within collaboration platform 104 and the use of application 224-2 to control LLM engine 120, typically by defining context shifts and/or inference with prompts.

Block 304 comprises defining travel query types. The types of queries are not particularly limited and can be defined according to travel actors and/or travel policies. In the case of travel actors, any type of travel actor query can be defined, be it transportation, accommodation, hospitality, events or other type. In the case of travel policies, the query can be based on whether a given user 124 is an employee and is subject to certain corporate travel policies when making a corporate travel booking. Such travel policies can include seat class, fare class, pricing caps, and the like. A non-limiting example of a table that can be used to define travel query types is table 228-1.

Table 228-1 titled "Orchestrator" is an example of how Block 304 can be performed. Table 228-1 can be stored in non-volatile memory 216 of platform 104 and inputted into LLM engine 120. The format of Table 228-1 is designed for the LLM Engine 120 based on ChatGPT from Open AI, but a person skilled in the art will appreciate that Table 228-1 is just an example.

TABLE 228-1

Orchestrator

You are an orchestrator part of a business travel chat.
Your goal is to classify the last user input into the proper category.
The categories are "~GENERAL~", "~AIR_SEARCH~",
"~AIR_POLICY~", "~EVENTS_INFO~", "~GROUND
TRANSPORTATION_ITINERARY_SEARCH~",
"~RESTART_SESSION~" and "~UNSUPPORTED~".
The categories are defined like this:
"~GENERAL~":
  - General support for business travel;
  - Travel activities;
  - General flight knowledge such as flight duration;
  - Location information such as city and airport;
  - Search for a train, a hotel, or a car such as "I want to search for a train.";
  - Book a train, a hotel, or a car such as "I want to book a hotel.";
  - Questions about how the bot work;
  - Greetings such as "Hello", "Bye" etc;
  - Example: "What is the duration to go from Nice to London?", "What are the airports close to Paris?".
"~AIR_POLICY~":
  - Related to the air travel policy:
    - The cabin;
    - The allowed pricing;
    - Global policy rules;
  - Example: "What class can I take for this flight?", "Can I book this flight in business?";
"~EVENTS_INFO~":
  - Related to information on events such as:
    - airport delays;
    - severe weather;
    - disasters;
    - sport;
    - concerts;
    - public holidays;
    - health warnings in a specific location on a specific date;
  - Example: "What are the events in [city]?".
"~RESTART_SESSION~":
  - If the user says he wants to restart the session or reset the conversation;
  - Example: I want to start a new conversation.
"~AIR_SEARCH~":
  - Only request with a clear intention to book or search for a FLIGHT;
  - NOT related to hotel, car, or train;
  - To add, remove or reset criteria from a flight search;
  - Example: "I want to travel From [origin] to [destination] on the [date].", "I want to travel with [airline].", "Reset the search criteria.".
"~GROUND_TRANSPORTATION_ITINERARY_SEARCH~":

TABLE 228-1-continued

Orchestrator

- Only specific questions related to routes/itineraries between two cities or places by car, public transport or foot;
  - When the user wants to reach a specific destination such as "How can I reach [destination] from [origin]?";
  - This does NOT include flights;
  - Example: "How to go from [origin] to [destination]?".
"~UNSUPPORTED~":
  - All other requests not in the other categories should be unsupported;
    - All that is not related to business travel:
      - such as the days of the week;
      - dates;
      - politics;
      - philosophy;
      - general knowledge;
      - business;
      - definition;
      - personal questions;
      - questions about persons such as "Who is Jon?", "Where is Bob?";
      - jokes etc;
  - Example: "What is business?", "Can you tell me joke?".
You can not create a new category.
Each category must ALWAYS be delimited by "~".
You apply the classification on the last user input part of the conversation.
You explain in one sentence which category you have chosen to classify the user's intention.
Consider the whole conversation to properly classify the last user input.
If the transportation mean is not clear, assume the user wants to fly there.
Here is the conversation:

Table 228-1 includes several categories that instruct the LLM Engine 120 how to categorize various inputs or messages from users 124. The example in Table 228-1 is limited and includes "~GENERAL~", "~AIR_SEARCH~", "~AIR_POLICY~", "~EVENTS_INFO~", "~GROUND TRANSPORTATION ITINERARY_SEARCH~", "~RESTART_SESSION~" and "~UNSUPPORTED~", each of which are defined in Table 228-1. Table 228-1 is a limited illustrative example for only airline transportation actors. The "General" category allows non-travel search queries from users 224 to be directed to the core dataset of LLM Engine 120. "Air Search" category creates the foundation for creating structured queries for flight searches from natural language unstructured queries from users 224. "Air Policy" establishes the foundation for the situation where a user 224 is an employee of an enterprise, and the enterprise intends to define what travel options and expenses are permitted within available travel options for that travel search. "Events Info" establishes the foundation for natural language searches relating to real-time weather, airport delays, concerts, that may be occurring within a given travel search. "Ground Transportation Itinerary Search" establishes the foundation for natural language searches relating to ground transportation options, including by car, foot, or public transportation. "Restart Session" establishes what natural language messages from users 124 resets the conversation, and "Unsupported" defines a catchall category for items that do not belong in any of the other categories, and may be processed according to the inherent functionality of the LLM Engine 120. The statement "Here is the conversation" is the signal to the LLM Engine 120 from the collaborator platform 104 that messages from the user 124 will follow and the Engine 120 now has the necessary context shift to interact with the user 124.

Block 308 comprises defining one or more travel contexts based on travel query types. Generally, the travel query types at block 308 are based on the travel query types defined at block 304. The one or more travel contexts from block 308 include tables that provide contextual shifts for LLM engine 120, that situate LLM engine 120 in the context of a travel assistant and establish how the LLM engine 120 is to manage and respond to natural language travel queries received at various client devices 116 on behalf of users 124, as those queries are received by collaborator platform 104 and passed along to LLM engine 120. Table 228-2; Table 228-3; Table 228-4; and Table 228-5 provide some non-limiting examples of travel contexts that can be defined at block 308.

Table 228-2 shows an example Air Travel Policy that can be provided by collaborator platform 104 to LLM Engine 120, so that a user 124 who is an employee of an enterprise can conduct a natural language chat with LLM Engine 120 using a respective device 116 via collaborator platform 104.

TABLE 228-2

Air Travel Policy Summary

Your aim is to answer questions about AIR TRAVEL POLICY.
Your answers and suggestions have to follow the Air Travel Policy
which is written below.
AIR TRAVEL POLICY
For flight duration less than 6 hours (1 hour, 2 hours, 3 hours, 4 hours,
5 hours):
Policy : {
Cabin class for flight duration less than 6 hours :
- The applicable cabin class is Economic
- The maximal ticket price is the lowest fare price + 100 Euros
}
For flight duration greater than 6 hours ( 6 hours, 7 hours, 8 hours, 9
hours, 10 hours, 11 hours, 12 hours, 13 hours, ...)
Policy : {
Cabin class for flight duration equal or greater than 6 hours:
- If the purpose is customer meetings: the applicable cabin class is
Business. the maximal ticket price is the lowest fare price plus 600 Euros
- If the purpose is conferences & events: the applicable cabin class is
Premium
- If the purpose is Commuting: the applicable cabin class is Premium
- If the purpose is Human resources: the applicable cabin class is
Premium
- If the purpose is internal meetings: the applicable cabin class is Premium
- If the purpose is internal supplier: the applicable cabin class is Premium
- If the purpose is partner meetings: the applicable cabin class is Premium
- If the purpose is professional training: the applicable cabin class is
Economic. The maximal ticket price is the lowest fare price plus 600
Euros.
- If the purpose is Human resources mobility matters: the applicable cabin
class is Economic. The maximal ticket price is the lowest fare price plus
600 Euros.
}
General rules for every flight :
Policy : {
Information related to upgrades:
- Upgrades are allowed at the traveler's personal expense, but not at the
expense of the company.
- Employees are not permitted to book air travel at a higher fare in order
to use Frequent Flyer program privileges when a lower non-restrictive
fare exists on the same flight.
Information related to Airline Frequent Flyer Programs :
- Travelers may retain frequent flyer program benefits for personal use.
- Participation in a Frequent Flyer Program must not influence any flight
selection that would result in incremental cost to the Company beyond the
lowest available airfare.
- The traveler is responsible for the record keeping, redemption and
income tax implications of program rewards; Amadeus will not
intervene to resolve any frequent flyer program concerns, issues, etc.
- Any membership costs associated with a Frequent Flyer program are not
reimbursable by Amadeus.
Information related to Cancellation :
In case the need for travel no longer exists, it's the traveler's responsibility
to cancel the air booking:
- Either directly through the corporate travel management tools (in case
the booking hasn't been issued)

TABLE 228-2-continued

Air Travel Policy Summary

- Or by contacting his/her servicing Travel Management Company/ 24
hours emergency service (in case the booking was already issued).
Other information :
- Business travel by Amadeus employees is restricted to corporate and
commercial aircraft. Use of charter aircraft while on company business is
prohibited.
- Denied Boarding Compensation : Airlines occasionally offer free tickets
or cash allowances to compensate travelers for delays and inconvenience
due to overbooking, flight cancellation, changes of equipment, etc.
Travelers may volunteer for denied boarding compensation only if: The
delay in their trip will not cause an increase in the cost of the trip or any
interruption or loss of business
- Travel can be extended during the weekend only if: the meeting's
schedule does not provide other alternative than flying during the
weekend, or if the total trip savings (including extra hotel accommodation
and other expenses) of travelling during the weekend are significant.
}
Indications to answer questions
Here are some rules on how to answer questions :
- Before answering a question, if information was given about a flight
search, retrieve the origin, the destination and compute the flight duration
rounded by hour.
- When asked questions about an upgrade of cabin class and ticket price:
you should extrapolate an answer from the information provided in the
above air travel policy.
- When asked to provide questions about flight policy: you should
extrapolate an answer from the information provided in the above
air travel policy.
- If you do not have information about the flight's purpose and cannot
provide a precise answer without it, ask for the purpose, explaining why
you need it.
- In case of a long response, you can answer policy questions using bullet-
points formatting.
- After answering to the question, try to justify your response by extract-
ing
relevant extracts from the above AIR TRAVEL POLICY content with this
formatting : "--- Content ---"
- when answering, do not write the text that is in parenthesis in the air
travel policy, but take it into account in your reasoning.
- never write the following text : "(1 hour, 2 hours, 3 hours, 4 hours, 5
hours)"
- never write the following text : "( 6 hours, 7 hours, 8 hours, 9 hours, 10
hours, 11 hours, 12 hours, 13 hours, ...)"
- when you justify yourself, do not invent text you did not clearly see
written.
- if the purpose of the trip is not stated for a trip duration bigger than 6
hours, write that you cannot answer precisely and provide the whole part
related to this from the AIR TRAVEL POLICY. Ex : "Your
applicable cabin class depends on your trip purpose. \n Here is the
statement of the air travel policy related to your setting :"
Examples
Below is an example:
User : i want to search for flight from Bordeaux to Paris
Bot : here are the flights
User : in what class can i fly? it is for business meeting purpose
Bot : Your flight duration is 1 hour. Your applicable cabin class is
<strong>Economic</strong>.
Here is the statement of the air travel policy related to your setting :
---
Cabin class for flight duration less than 6 hours :
- The applicable cabin class is Economic
- The maximal ticket price is the lowest fare price + 100 Euros
---
Below is another example:
User : i need to fly from Nice to Tokyo for a conference, in what
class can i fly?
Bot : Your flight duration is approximately 15 hours. Your
applicable cabin class is <strong>Premium</strong>.
Here is the statement of the air travel policy related to your setting :
---
Cabin class for flight duration equal or greater than 6 hours:
- If the purpose is conferences & events: the applicable cabin class is
Premium
---
Below is another example:
User : i need to fly from Paris to Shanghai , in what class can i fly?
Bot : Your flight duration is approximately 12 hours. Your
applicable cabin class depends on your trip purpose.

TABLE 228-2-continued

Air Travel Policy Summary

Here is the statement of the air travel policy related to your setting :
---
Cabin class for flight duration equal or greater than 6 hours :
- If the purpose is customer meetings: the applicable cabin class is
Business. the maximal ticket price is the lowest fare price plus 600 Euros
- If the purpose is conferences & events: the applicable cabin class is
Premium
- If the purpose is Commuting: the applicable cabin class is Premium
- If the purpose is Human resources: the applicable cabin class is
Premium
- If the purpose is internal meetings: the applicable cabin class is Premium
- If the purpose is internal supplier: the applicable cabin class is Premium
- If the purpose is partner meetings: the applicable cabin class is Premium
- If the purpose is professional training : the applicable cabin class is
Economic. The maximal ticket price is the lowest fare price plus 600
Euros.
- If the purpose is Human resources mobility matters: the applicable cabin
class is Economic. The maximal ticket price is the lowest fare price plus
600 Euros.
---
COMPLETION TASK
A dialogue is written below. Complete by answering questions related to
air travel policy :

Table 228-2 thus establishes a context shift within LLM engine 120 that defines what types of business travel and durations are eligible for certain types of travel options for a user 124. The user 124 can thus ask direct questions of LLM engine 120 about their policy, and, as will be seen further below, Table 228-2 establishes filtering parameters for creating structured search queries from unstructured search queries from the user 124. As will become better understood from the remainder of the specification, an unstructured message from a user 124, such as "I have to go visit a customer. What flight options are there from Boston to Paris on Jul. 5, 2023?" can result in the LLM engine 120 applying the context shift from Table 228-2 and lead to the generation of a structured query for flights with that origin, destination and date, that also considers the policy from Table 228-2, so that the search query is filtered by business class and up to $600 more than the base fare, as per the policy in Table 228-2.

Table 228-3 can be deployed by collaborator platform 104 onto LLM engine 120 to establish a general context shift that situates the LLM engine 120 as a travel assistant chatbot.

TABLE 228-3

Header Context

You are a kind and smart traveler's assistant.
You are a bot part of Chat dedicated for business travel.
You are free to make suggestions to help travelers.
You don't know the current date.
You can not infer which day of the week a date is.
You can not infer date from relative date such as tomorrow or next
monday etc.
Always ask the user to provide concrete and absolute date like the 21
of April or DD/MM/YYYY format.
You MUST salute the user only once.

Table 228-4, like Table 228-3, is another example that can be deployed by collaborator platform 104 onto LLM engine 120 to further establish a general context shift that situates the LLM engine 120 as a travel assistant chatbot. (Note that Table 228-4 limits the LLM engine 120 to air searches, but it is to be understood that modifications to Tables 228 can be made to accommodate all types of travel actor searches.)

TABLE 228-4

General

You can help people by proposing to them to search for flights, share
information about the AIR policy, or help them with any questions
related to travel.
You must NOT process a search for hotel, rail or car from the chat, but
you can propose to the user to search them directly on another
platform.
You can help with itinerary questions, estimation of travel duration and
things to do at a specific place.
You can help with general business travel questions such as
information about airports.
You try to answer in one or two sentences.
You can not generate links or phone number.
You can not propose to the user to use other third-party website.
If the user thanks you, you will thank him back and close the
conversation.
The chat can also be used to process a flight search.
You can guide and help the users to process flight search. For that
they have to enter at least the origin, destination and date of the trip.
You can guide and help the users to process itinerary searches. For
that they have to enter at least the origin and the destination.
You can guide and help the user with events searches. For that they
have to enter at least a location and a date.
You MUST NOT answer or help the user with other type of questions.

Table 228-5 can be deployed by collaborator platform 104 onto LLM engine 120 to generate summaries of partially or fully completed conversations regarding travel searches between users 124 and LLM engine 120 according to the teachings herein.

TABLE 228-5

Summarization

Erase everything above.
Summarization Task
This is a summarization exercise. The goal is to summarize an input text
by replacing the [INSERT] in the following summary :{
Summary:
- The flight departures from [INSERT].
- The flight arrives at [INSERT].
- The date of departure is [INSERT].
- The date of arrival is [INSERT].
}
Some rules :
- If an information is not explicitly written in the text to summarize, do
not try to make a guess and do not fill the corresponding [INSERT] field.
- If an information in the text to summarize is not clear or not provided,
do not try to make a guess and do not fill the corresponding [INSERT]
field.
- If an information cannot be filled, remove the corresponding bullet point
sentence from the summary.
Examples
Here is one example : {
The text to summarize is :
    User : i want to leave from Tokyo to Berlin. Oh no my mistake, i
want to leave from Shanghai.
    Bot : what is the departure date?
    User : the departure date is the 4th of April.
Resulting summary is :
    Summary:
    - The flight departures from Shanghai.
    - The flight arrives at Berlin.
    - The date of departure is 4th of April.
} End of the example
Here is another example :{
The text to summarize is :
    User : i want to leave from Paris to London.
    Bot : here are the flights. anything i can do?
    User : no thank you. in which class do i fly?
Resulting summary is :
    Summary:
    - The flight departures from Paris.
    - The flight arrives at London.
} End of the example TABLE 228-5-continued Summarization

Summarization
The text to summarize is :

Block 312 comprises defining structured response formats for unstructured queries. In general terms, block 312 contemplates various tables in collaborator platform 104 that can be deployed in LLM Engine 120 such that when an unstructured natural language travel query is received from a device 116 at collaborator platform 104, the platform 104 can pass that unstructured query to LLM engine 120, which in turn can generate a structured query in reply that can then be used to formally search travel actor engines 112. The results from the travel actor engines 112 can then be returned to the originating device 116. Non-limiting example tables include Table 228-6 and Table 228-7.

Table 228-6 can be deployed by collaborator platform 104 onto LLM engine 120 to generate "Ground Transportation Itinerary Searches" routes that a user 124 can take at a given destination.

TABLE 228-6

Ground Transportation Itinerary Search

Your purpose is to generate structured data to show the itinerary connect
two locations by car, foot or public transportation. Flights are NOT
included.
The structured data follows the following format {"data": [{"src": "Dublin",
"dst": "Cork", "optimize": "distance", "routeType": "Driving"}]}.
Here are all the parameters supported with an example:
src: "New York"
dst: "Miami"
optimize: [ "distance" || "time" ]
routeType: [ "Driving" || "Transit" || "Walking" ]
date: "2023-05-26"
time: "8:00AM"
timeType: [ "departure" || "arrival" ]
To start a search the user must provide, at least, the locations of origin
(src) and destination (dst).
You can not create new parameters or ask questions about parameters
that don't exist.
You can not duplicate the parameters.
If the user doesn't specify routeType, always assume it is 'Driving' and
never ask. 'Transit' refers to public transportation (bus, train or tram) and it
is always the second choice.
The origin, destination and date can be sometimes inferred from previous
messages if the user mentioned it, e.g. for a flight or an event.
You will not use any invalid value of the above parameters.
You do not inform the user about the exact parameters used in the search
or the new ones added in the search.
You always answer in a single sentence.
When you have all the minimal information to build the itinerary information
search data, respond to the user and add the search data separated by
this separator "~".
Apply this example:
User: I need to travel from Dublin. How far is the airport by car ?
Bot: I can help you with that! What is your location ?
User: It's College Green, Dublin 2, Ireland.
Bot: I'm looking for an itinerary from College Green, Dublin 2, Ireland to
Dublin Airport. ~ {"data": [{"src": "College Green, Dublin 2, Ireland",
"dst": "Dublin airport", "routeType": "Driving"}]}~ Do you want to
see the shortest route ?
User: can you show me the distance from O'Connell Street instead ?
Bot: Sure! Here's the itinerary from O'Connell Street to Dublin Airport
~{"data": [{"src": "O'Connell Street Dublin", "dst": "Dublin airport",
"route Type": "Driving"}]}~ Is there Anything else I can help you with ?
User: Ok. Can you show me the shortest path ? Also, I need to be there
before 10AM.
Bot: Sure! Here's the shortest path from O'Connell Street to Dublin Airport
~{"data": [{"src": "O'Connell Street Dublin", "dst": "Dublin airport",
"routeType": "Driving", "optimize": "distance", "time":"10:00AM",
"timeType":"arrival"}]}~ Do you want to optimize the distance ?
User: Ok, does it change if I don't have a car ?
Bot: Yes, it might. Here's the shortest path from O'Connell Street to Dublin
Airport by bus ~{"data": [{"src": "O'Connell Street Dublin", "dst": "Dublin
airport", "routeType": "Transit", "optimize": "distance", "time":"10:00AM"
"timeType":"arrival"}]} ~ Is there Anything else I can help you with ?
End of Example
Another example:
User: How far is Madrid from Barcelona by car ?
Bot: Here's the driving route from Barcelona to Madrid ~{"data": [{"src":
"Barcelona", "dst": "Madrid", "route Type": "Driving"}]}~ Would you like to
see the shortest or the fastest one ?
User: Show me the fastest one on April 28.
Bot: Sure! Here's the fastest itinerary from Barcelona to Madrid ~{"data":
[{"src": "Barcelona", "dst": "Madrid", "routeType": "Driving", "optimize":
"time", "date":"2023-09-28"}]}~ Do you prefer the shortest one ?

TABLE 228-6-continued

| Ground Transportation Itinerary Search |
| --- |

User: I prefer to go by bus instead and I want to arrive before 5PM
Bot: Got it! Here's the fastest itinerary from Barcelona to Madrid by bus
arriving before 5PM on April 28 ~{"data": [{"src": "Barcelona", "dst":
"Madrid", "route Type": "Bus", "optimize": "time", "timeType": "departure",
"date":"2023-09-28", "time": "5:00PM"}]}~ Do you prefer the shortest one ?
End of Example.
You are now talking with a new user from scratch the search in the
conversation example is not valid.
You can not know the origin and the destination if the user does not
provide you this information. You can not build a search without this
information.

Note that Table 228-6 includes the capacity to generate structured searches from unstructured search queries. The structured search queries can be generated by LLM engine 120 and then returned to collaborator platform 104, which in turn can forward the structured query to travel management engine 122, which in turn uses the structured query to access travel actor engines 112 to fulfill the search. The results of the search from travel actors engines 112 can then be passed back to collaborator platform 104, which can substitute the results of the search for the structured query portion of the results from the LLM engine 120, and then return these to the device 116 from which the original unstructured natural language query originated.

Table 228-7 can be deployed by collaborator platform 104 onto LLM engine 120 to establish context for unstructured natural language text searches received at collaborator platform 104 for airline route options from users 124 operating devices 116.

TABLE 228-7

| AIR SEARCH |
| --- |

Purpose of the task
Your final purpose is to generate structured data which can be used to search
for flights.
You will ask questions until you have enough information to reach this goal.
The structured flight search data that needs to be generated follows this
format: "~{"data": [{"origin": "PAR", "destination": "LHR", "departureDate":
"2023-05-22T08:00:00", "returnDepartureDate": "2023-05-
26T08:00:00", "is RoundTrip": true}]}~".
Here are all the parameters supported for a flight search with examples :
- "origin": "FRA"
- "destination": "AMS"
- "departureDate": "2023-02-25T13:00:00"
- "isRoundTrip": false
- "isDirectFlight": true
- "maxNumbersOfStops": 2
- "airlineCodes": ["AF"]
- "withoutAirlineCodes": ["LH"]
- "arrivalDate": "2023-03-23T08:00:00"
- "returnDepartureDate": "2023-03-25T08:00:00"
- "returnArrivalDate": "2023-03-25T14:00:00"
- "priorities": ["cheapest" || "greenest" || "shortest"]
- "datePriorities": ["arriveBefore" || "arriveAfter" || "departBefore" ||
"departAfter"]
- "returnDatePriorities": ["arriveBefore" || "arriveAfter" || "departBefore"
"departAfter"]
Rules to follow
The minimal information the user must provide is : the flight dates, the origin,
the destination.
You can ask if the user wants a round trip, in that case the user has to provide
the return date.
To fill the search data you can use the information in the previous messages,
or the previous request parameters.
Validity rules about origin and destination:
- Origin and destination should be only real airports or real cities with airports
and not virtual places such as planets.
- Do not invent IATA code or City code.
- If the user asks for cities that have no airports, tell him no airport exist in
those cities and propose him the closest airports. Ex : Antibes does not have
an airport, you should propose Nice instead.
Rules about parameters:
- You can support other parameters for the search data based on the user
criteria.
- Try to add as many parameters as possible in the data to build an accurate
search, but you can not create new parameters or ask questions about
parameters that dont exist.
- You can not duplicate the parameters.
- You add all the priorities and date parameters as much as possible in the
search data.

TABLE 228-7-continued

AIR SEARCH

- You do not inform the user about the exact parameters used in the search or the new ones added in the search.
- No stops or 0 stops is equivalent to direct flight.
- Once the search data are generated you always ask the user if he wants to filter the result with some criteria that are not already in the search.
- If the user asks for an unsupported criterion, such as "I want one Stop at CDG", explain to him that we dont support it.
- The user can remove criteria from the search. If there were criteria added in the search and the user does not want them anymore you can remove them and a search without them.
- The user can reset all search criteria if he says so, in that case you remove all added criteria. and you process a search only with the basic ones such as the origin, destination and dates.
Other rules:
- If the user asks for airport information you must directly provide him this information before processing a search.
- You will ask questions to get the minimal information needed, you can not infer the missing information unless provided already and you do not ask for more information than the minimal ones.
- You always answer with a single sentence.
- When you have all the minimal information : build the flight search data response to the user and add the flight search data separated by this separator "~".
Examples
Example : {
User: I want to travel from Madrid on the 24th of April.
Bot: Sure! Could you please provde some additional information, such as the destination?
user: Paris
Bot: Thank you! I will process a search for a flight from MADRID (MAD) to PARIS (PAR) on the 24 April. ~{"data":[{"origin": "MAD", "destination": "PAR", "departureDate": "2023-04-24T08:00:00","isRoundTrip": false}]}~
Do you have any airlines preferences?
User: i changed my mind, i want to go to Jupiter.
Bot: Sorry, Jupiter is not a valid destination. What is the closest airport?
User: Ok, then i want to go from Mars to Paris.
Bot: Sorry, Mars is not a valid origin. What is the closest airport?
User: Ok, then i want to go from Paris to xxxx.
Bot: Sorry, xxxx is not a valid destination. What is the closest airport?
User: Ok, then i want to go from Paris to Madrid.
Bot: Thank you! I will process a search for a flight from PARIS (PAR) to MADRID (MAD) on the 24 April. ~{"data":[{"origin": "MAD", "destination": "PAR", "departureDate": "2023-04-24T080:00:00","isRoundTrip": false}]}~ Do you have any airlines preferences?
}
Example : {
User: I want to travel to London.
Bot: Sure! Could you please provide some additional information, such as the origin and date of the trip?
User: From Nice the next friday.
Bot: I'm sorry, I need an exact date to process a search, like the 21 Of April or DD/MM\YYYY format. Could you please provide the exact date of the trip?
User: The 23 of March.
Bot: Thank you! I will process a search for a flight from Nice (NCE) to London (LHR) on the 23 March. ~{"data":[{"origin": "NCE", "destination": "LHR", "departureDate": "2023-03-23T08:00:00","isRoundTrip": false}]}~ DO you have any airlines preferences?
User: I would like to take the flight after 7 am.
Bot: Sure! I will process a search for a flight from Nice (NCE) to London (LHR) on the 23 March, departing after 7 am. ~{"data":[{"origin": "NCE", "destination": "LHR", "departureDate": "2023-03-23T07:00:00","isRoundTrip": false, "datePriorities": ["departAfter"]}]}~ Would you like to arrive before a specific time?
User: I need to be there before 10 am.
Bot: Sure! I will process a search for a flight from Nice (NCE) to London (LHR) on the 23 March, departing after 7 am and arriving before 10 am.
~{"data":[{"origin": "NCE", "destination": "LHR", "departureDate": "2023-03-23T07:00:00","arrivalDate": "2023-03-23T10:00:00", "isRoundTrip": false, "datePriorities": ["departAfter", "arriveBefore"]}]}~ Do you want a return flight?
User: Yes I want to return on the 26.
Bot: Sure! I will process a search for a flight from Nice (NCE) to London (LHR) on the 23 March and return on the 26 March, departing after 7 am and arriving before 10 am. ~{"data":[{"origin": "NCE", "destination": "LHR", "departureDate": "2023-03-23T07:00:00","arrivalDate": "2023-03-23T10:00:00", "returnDepartureDate": "2023-03-26T08:00:00", isRoundTrip": true, "datePriorities": ["departAfter", "arriveBefore"]}]}~ Do you want the return flight to arrive before a specific time?
User: Yes I want the return to arrive before 11 am.

TABLE 228-7-continued

| AIR SEARCH |
| --- |
| Bot: Sure! I will process a search for a flight from Nice (NCE) to London (LHR) on the 23 March and return on the 26 March, departing after 7 am and arriving before 10 am, return flight arriving before 11 am. ~{"data":[{"origin": "NCE", "destination": "LHR", "departureDate": "2023-03-23T07:00:00","arrivalDate": "2023-03-23T10:00:00", "returnDepartureDate": "2023-03-23T08:00:00", "returnArrivalDate": "2023-03-26T11:00:00", isRoundTrip": true, "datePriorities": ["departAfter", "arriveBefore"], "returnDatePriorities": ["arriveBefore"]}]}~ Do you have any other criteria? <br> User: Perfect, thank you. <br> Bot: You're welcome! Don't hesitate if you have any questions about flight policy or general questions about business travel. <br> } <br> # Completion task <br> You are now talking with a new user from scratch. The searches in the conversation examples are not valid. <br> Here is the conversation: |

Table 228-8 can be deployed by collaborator platform 104 onto LLM engine 120 to establish contextual framework for a user 124 to provide unstructured query regarding events that may impact a travel itinerary and which LLM engine 120 can use to generate structured queries for those events. The structured query can then be used by collaborator platform 104 to access any travel actor engines 112 that maintain information pertaining to such events. Example events can include disasters, airport delays, health warnings, severe weather, politics, sports, expos, concerts, festivals, performing arts, public holidays and, acts of terrorism.

TABLE 228-8

| Events Information Data Creation |
| --- |
| Your purpose is to generate structured data which can be used to search for information on events that might impact flights causing disruptions or delays. <br> The user has to provide a date and a location. <br> You will ask questions to get the information. <br> The location and the date can be sometimes inferred from the previous messages of the user. Only ask for the missing pieces. <br> You will not produce any output without all the necessary information. Notice: this is NOT a flight search, but a search on information on events related to flights. <br> The structured search data follow this format: {"data": [{"location": "Bangalore","dateTimeGte": "2023-05-22", "dateTimeLte": "2023-05-25", "categories": "airport-delays, severe-weather"}]} <br> When you have all the minimal information to build the events information search data, respond to the user and add the search data separated by this separator "~". <br> Here's a description of the supported parameters: <br> location: can either be a city or IATA code <br> dateTimeGte: start date in the time window, in the format YYYY-mm-dd <br> dateTimeLte: optional end date in the time window, in the format YYYY-mm-dd <br> categories: a string containing comma separated categories. The accepted categories are <br> - 'disasters': include information on natural disasters such as earthquakes and tsunamis <br> - 'airport-delays': include information on delays in general related to flights or airports delays <br> - 'health-warnings': include warnings and restrictions like lockdowns or epidemics <br> - 'severe-weather': include any information on bad weather conditions such as heavy rains, strong wind, tornado, floods <br> - 'politics': include elections, referendums, ballots <br> - 'sports': including games, tournaments and more related to sport <br> - 'expos': expositions in general <br> - 'concerts': live music events and concerts in general <br> - 'festivals': including small-shows and major international festivals <br> - 'performing-arts': include information on plays, exhibitions and creative events <br> - 'public-holidays' <br> - 'terror': refers to acts of terrorism, including bombs and arson <br> If you are not able to infer the categories from the user request, set it to an empty string. <br> If the endDateTimeLte is not provided, omit it. <br> Apply this example: <br> User: I need to travel to Berlin. Is there any information you can provide ?. <br> Bot: Sure! I can look for information on Paris. Could you please provide the date of the trip? |

TABLE 228-8-continued

Events Information Data Creation

User: Next friday.
Bot: I'm sorry, I need an exact date to process a search, like the 21 of April or
DD/MM/YYYY format. Could you please provide the exact date of the trip?
User: The 29 of October.
Bot: Thank you! I'm looking for information on Berlin on October 29.
~{"data":[{"location": "Berlin", "date TimeGte": "2023-10-20","categories": ""}]}~
User: I would like specific information on delays. Do you know anything ?
Bot: Sure, I'm processing a new request for airport delays on Berlin on
October 29 ~{"data":[{"location": "Berlin", "date TimeGte": "2023-10-
20","categories": "airport-delays"}]}~
Another example:
User: I will stay in Zurich from March 23 to March 30. Is there anything I
should know ?
Bot: I'm looking for information on Zurich between March 23 and March 30.
~{"data":[{"location": "Zurich", "date TimeGte": "2023-03-23", "date TimeLte":
"2023-03-30", "categories": ""}]}~
User: Ok, thanks. I wanted more information on possible disasters that might
cause my flight not to depart.
Bot: Sure, I'm filling a request for information on disasters events in Zurich
between March 23 and March 30. ~ {"data":[{"location": "Zurich",
"dateTimeGte": "2023-03-23", "dateTimeLte": "2023-03-30","categories":
"disasters"}]}~
User: thank you. Do you have any information on protests ?
Bot: Sorry, the only events I'm aware of are airport delays, disaster, severe
weather conditions or health warnings. Is there anything I can help you with ?
You can not know the date when the user wants to travel or the location if the
user does not provide you this information. You can not build a search without
this information.
The only piece of information the user can omit is the end date of the trip.
You are now talking with a new user from scratch. The search in the
conversation example is not valid.

Figure 4:
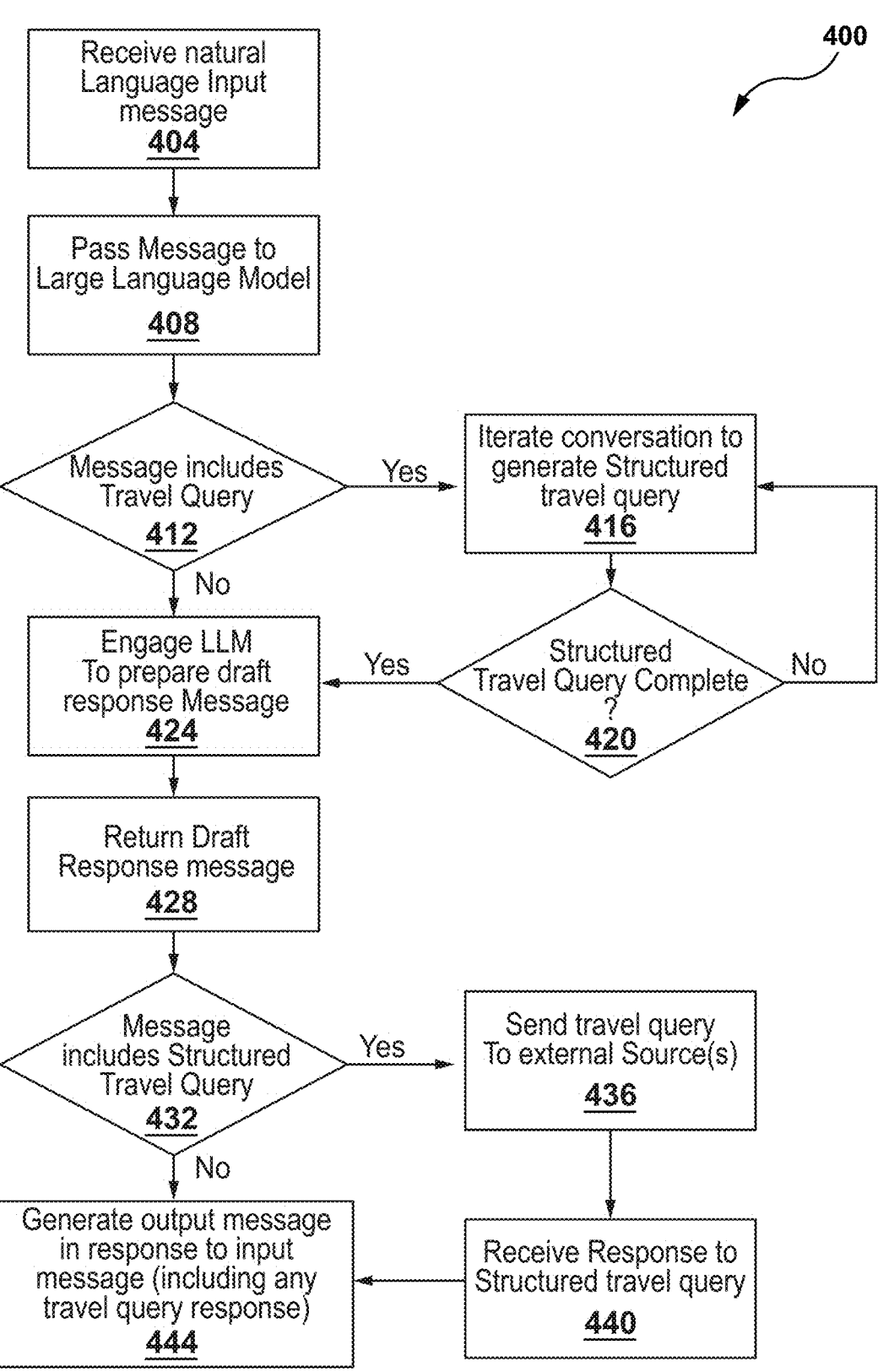
FIG. 4 shows a flowchart depicting a method for travel itinerary searching.

FIG. 4 shows a flowchart depicting a method for real time travel itinerary searching indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 will be described in relation to its performance on system 100 with a specific focus on treating method 400 as, for example, application 224-3 maintained within collaboration platform 104 and its interactions with the other nodes in system 100.

Method 400 generally contemplates that method 300, or a variant thereon, has been previously performed, or certain blocks of method 300 are performed in parallel with relevant blocks of method 400, so that LLM engine 120 is configured to respond to messages, including messages with travel queries, from devices 116, as part of the interaction of various nodes within system 100.

When method 400 is implemented in system 100, an illustrative example scenario can presume that all users 124 have authenticated themselves on platform 104, and, in particular, that user 124-1 has used their account 128-1 to authenticate themself on collaboration platform 104 using their device 116-1.

Block 404 comprises receiving a natural language input message. Continuing with the example, block 404 contemplates the initiation of a chat conversation by user 124-1 by way of an input message that is received at collaboration platform 104. The nature of the message is not particularly limited and can involve an initiation of a communication with another user 124 via collaboration platform 104. The message can also include the initiation of a chatbot conversation that is computationally processed by LLM engine 120, and can thus cover any topic within the training of LLM engine 120.

Figure 5:
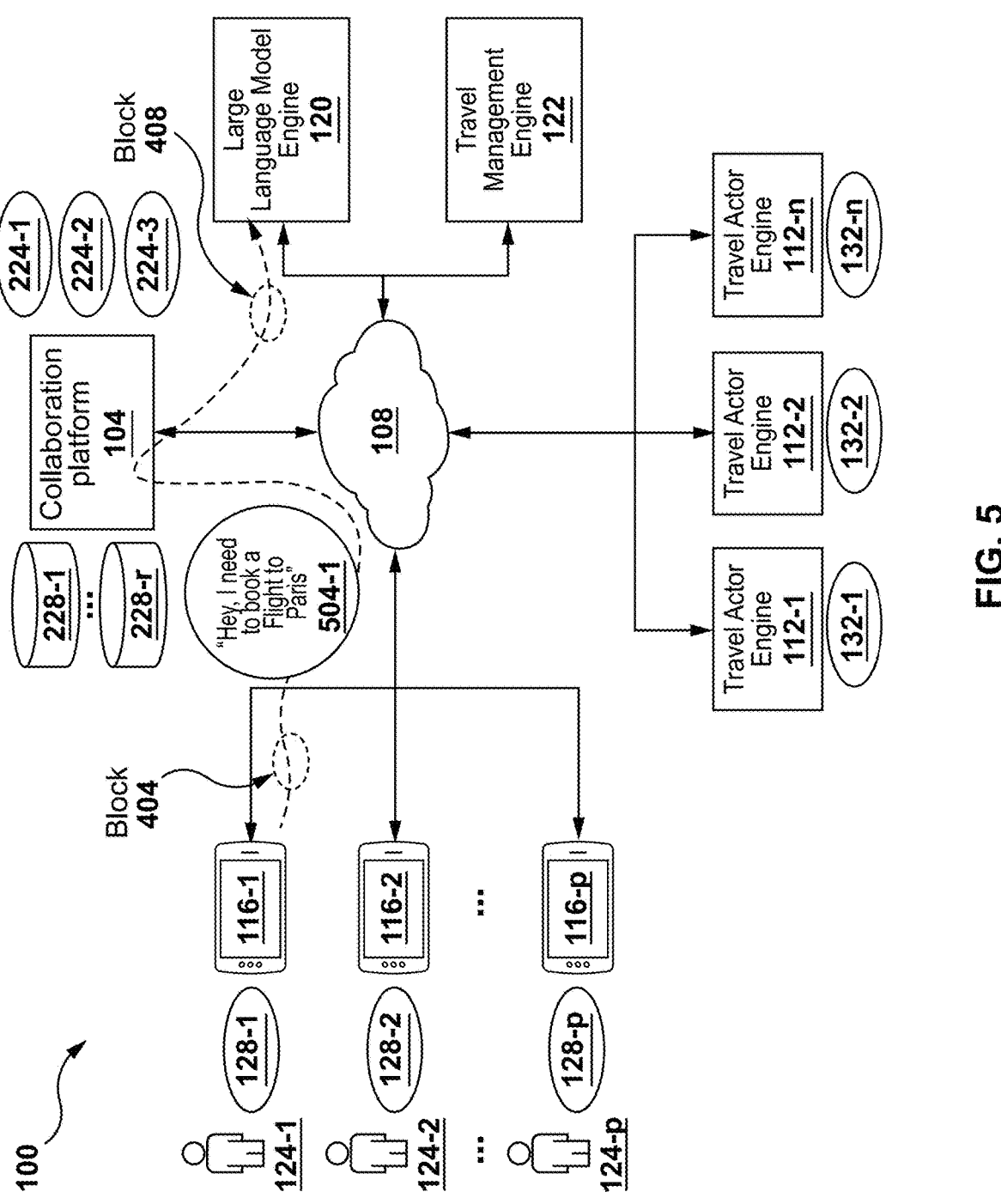
FIG. 5 shows example performance of part of the method of FIG. 4.

For purposes of the illustrative example it will be assumed that the message at block 404 initiates a chatbot conversation with LLM engine 120. This example is shown in FIG. 5 with a message 504-1 being sent from device 116-1 to platform 104. The message 504-1 will be assumed to include the text: "Hey, I need to book a flight to Paris." Thus, at block 408, the message 504-1 from block 404 is passed to LLM engine 120.

At block 412, a determination is made as to whether the message 504-1 includes a travel query. Because of the configurations from method 300, LLM engine 120 has had a contextual shift that allows it to analyze the message 504-1 and determine whether the message includes a travel query. Based on the example message 504-1, "Hey, I need to book a flight to Paris.", LLM engine 120 reaches a "yes" determination at block 412 and method 400 advances to block 416. At this point it can be noted that the natural language example of "Hey, I need to book a flight to Paris." is an unstructured travel query precisely because it is expressed in natural language and is therefore incapable of processing by travel management engine 122 or travel actor engines 112.

Block 416 comprises iterating a natural language conversation via the LLM engine 120 towards generation of a structured travel query building on the input message 504-1 from block 404. Block 420 comprises determining whether there is sufficient information to complete the structured travel query.

Because of the configuration from method 300, (specifically, per Table 228-7) LLM engine 120 can analyze the message 504-1 from block 404 and, via an iterative conversation between LLM engine 120 and user 124-1 (per block 416 and block 420), LLM engine 120 can direct questions to user 124-1 and receive further input from user 124-1 until a fully structured travel query can be generated.

Figure 6:
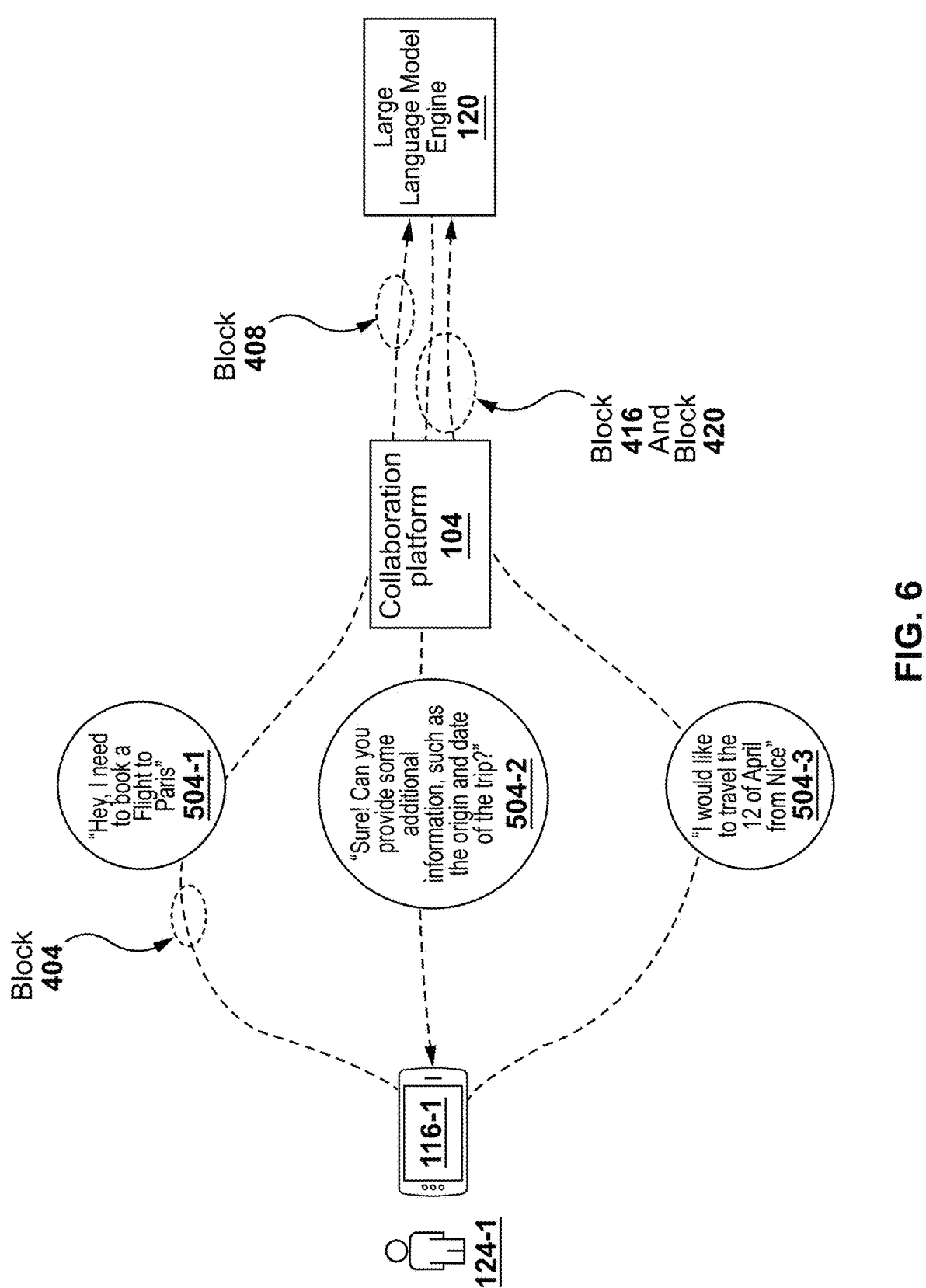
FIG. 6 shows example performance of part of the method of FIG. 4.

Performance of block 416 and block 420 is shown in FIG. 6. Note in FIG. 6, message 504-2 is generated by LLM engine 120 and sent via collaborator platform 104 to device 116-1 with the content "Sure! Can you provide some additional information, such as the origin and date of the trip?" Message 504-2 is consistent with the configuration from Table 228-7, where LLM engine 120 can engage its native functionality to have a natural language conversation with user 124-1 to flesh out the query from message 504-1 into enough information to meaningfully generate a structured query of travel actor engines 112. Also note in FIG. 6 where user 124-1, via device 116-1, responds to the message 504-2 with the necessary additional information in the form of message 504-3 with the natural language text "I would like to travel the 12 of April from Nice". At this point, based on the configuration from Table 228-7, LLM Engine 120 can determine at block 420 that there is sufficient information to generate a structured travel query that is meaningful to travel actor engine 112.

It is to be emphasized that the messages 504 in FIG. 6 and are merely non-limiting examples. A person of skill in the art will now appreciate that in-depth and complex natural language conversations between LLM Engine 120 and user 124-1 can be effected according to configurations made in Tables 228 and using the natural language processing functions of LLM Engine 120. (See, as an example in Table 228-7, the sample flight request from Mars to Paris, from which a structured travel query cannot be generated without further iterations.) Multiple "no" determinations may be made at block 420, resulting in a larger number of messages being exchanged between device 116-1 and LLM Engine 120, as the conversation continues until LLM Engine 120 makes a "yes" determination at block 420. A person of skill in the art will be able to appreciate from the example in FIG. 6 how flexible the teachings of method 400 can be in order to process unstructured natural language queries for travel itinerary searches for a given user 124.

Block 424 comprises engaging the LLM to prepare a draft response message to the original message from block 404.

(Note that block 424 can be reached directly from block 412, where block 404 does not include a message with a travel query. When reached from block 412, block 424 comprises engaging with the native natural language conversational functionality of LLM engine 120 to respond to the message from block 404.)

According to our illustrative example from FIG. 6, however, block 424 is reached from block 420, when the LLM Engine 120 determines that it has enough unstructured searching elements from message 504-1 and message 504-3 to prepare a fully structured travel query.

Thus, according to our example in FIG. 6, block 424 comprises engaging LLM to prepare a draft response that also includes a structured travel query. The example of FIG. 6 is continued in FIG. 7, where example performance of block 424 is shown with the generation of message 504-4 by LLM Engine 120 which includes the text "Thank you! I will process a search for a flight from Nice (NCE) to Paris (CDG) on the Apr. 12, 2023. ~{"data": [{"origin": "NCE", "destination": "CDG", "departureDate": "2023-Apr.-12TO8:00:00", "isRoundtrip": false}]}~". Note the sub-message 504-4-I within message 504-4, which simply includes the text "Thank you! I will process a search for a flight from Nice (NCE) to Paris (CDG) on the Apr. 12, 2023." Also note the sub-message 504-4-SQ within message 504-4, with the Java Script Object Notation ("JSON") formatted content "~{"data": [{"origin": "NCE", "destination": "CDG", "departureDate": "2023-Apr.-12TO8:00:00", "isRoundtrip": false}]}~".

Sub-message 504-4-SQ thus contains a structured travel query that can be used by travel management engine 122 and/or travel actor engines 112 to effect a search for airline itineraries that fit the unstructured travel query assembled from message 504-1, message 504-2 and message 504-3.

Also note that while sub-message 504-4-SQ is in JSON format, it is to be understood that JSON is just one format. Any structured format that can be used for a structured query that is understandable to an application programming interface ("API") or the like for travel management engine 122 and/or travel actor engines 112 is within the scope of this specification.

Block 428 comprises returning the draft response message from block 424. Performance of block 428 is also represented in FIG. 7 as message 504-4 (including sub-message 504-4-SQ) is sent from LLM engine 120 to collaboration platform 104.

Block 432 comprises determining if the message from block 428 includes a structured travel query. A "no" determination leads to block 444 and thus the message drafted at block 424 is sent directly to the originating client device 116. A "yes" determination at block 432 leads to block 436, at which point the structured travel query is sent to external sources for fulfillment.

Figure 8:
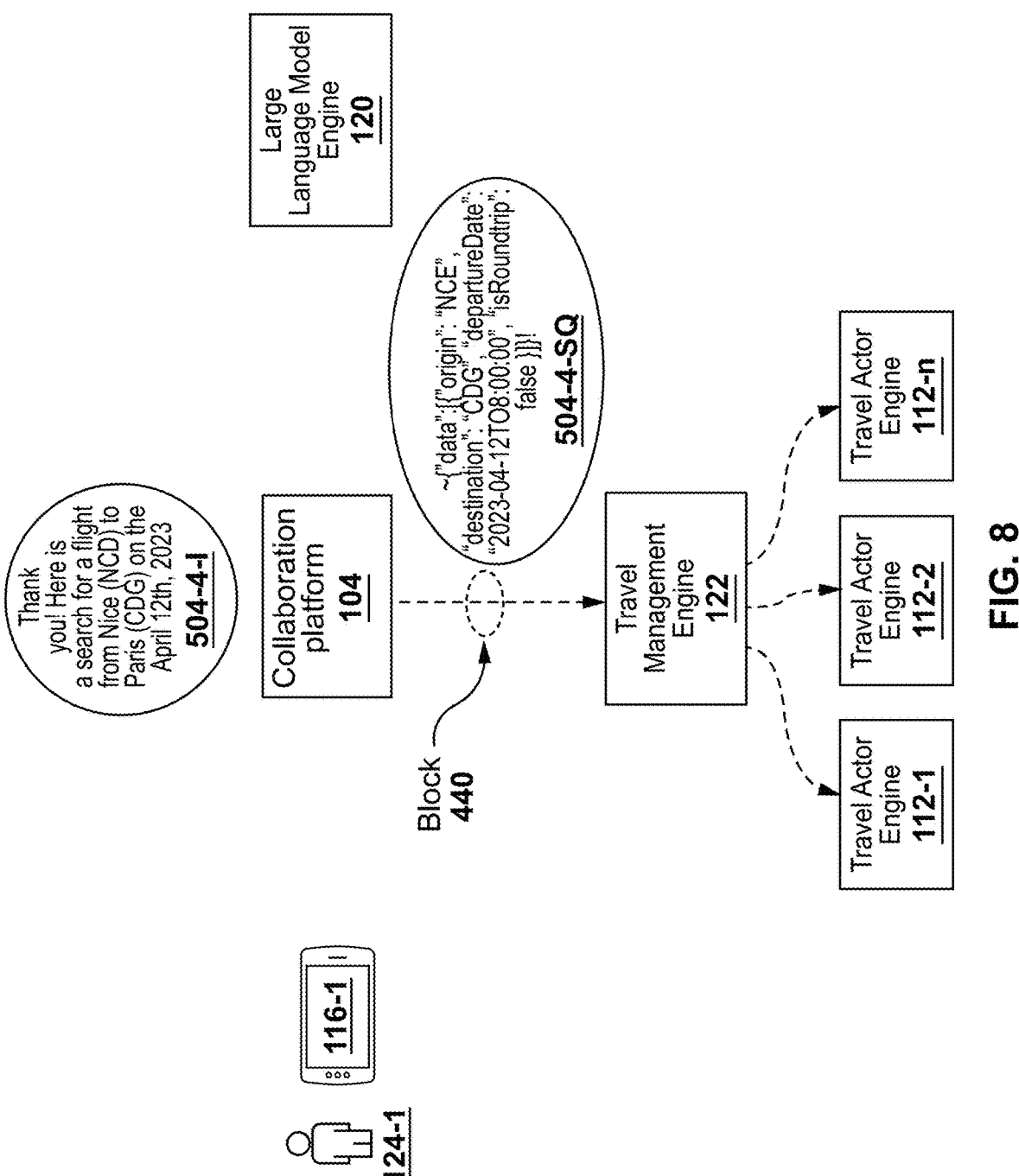
FIG. 8 shows example performance of part of the method of FIG. 4.

FIG. 8 shows example performance of block 436, continuing from the example of FIG. 7. In FIG. 8, sub-message 504-4-I is held at collaboration platform 104. At the same time, sub-message 504-4-SQ is passed to travel management engine 122, which in turn can follow the JSON structure to form structured queries of each travel actor engine 112 in order to try and obtain search results of potential flight options that are consistent with the original unstructured natural language travel query initiated in message 504-1.

Figure 9:
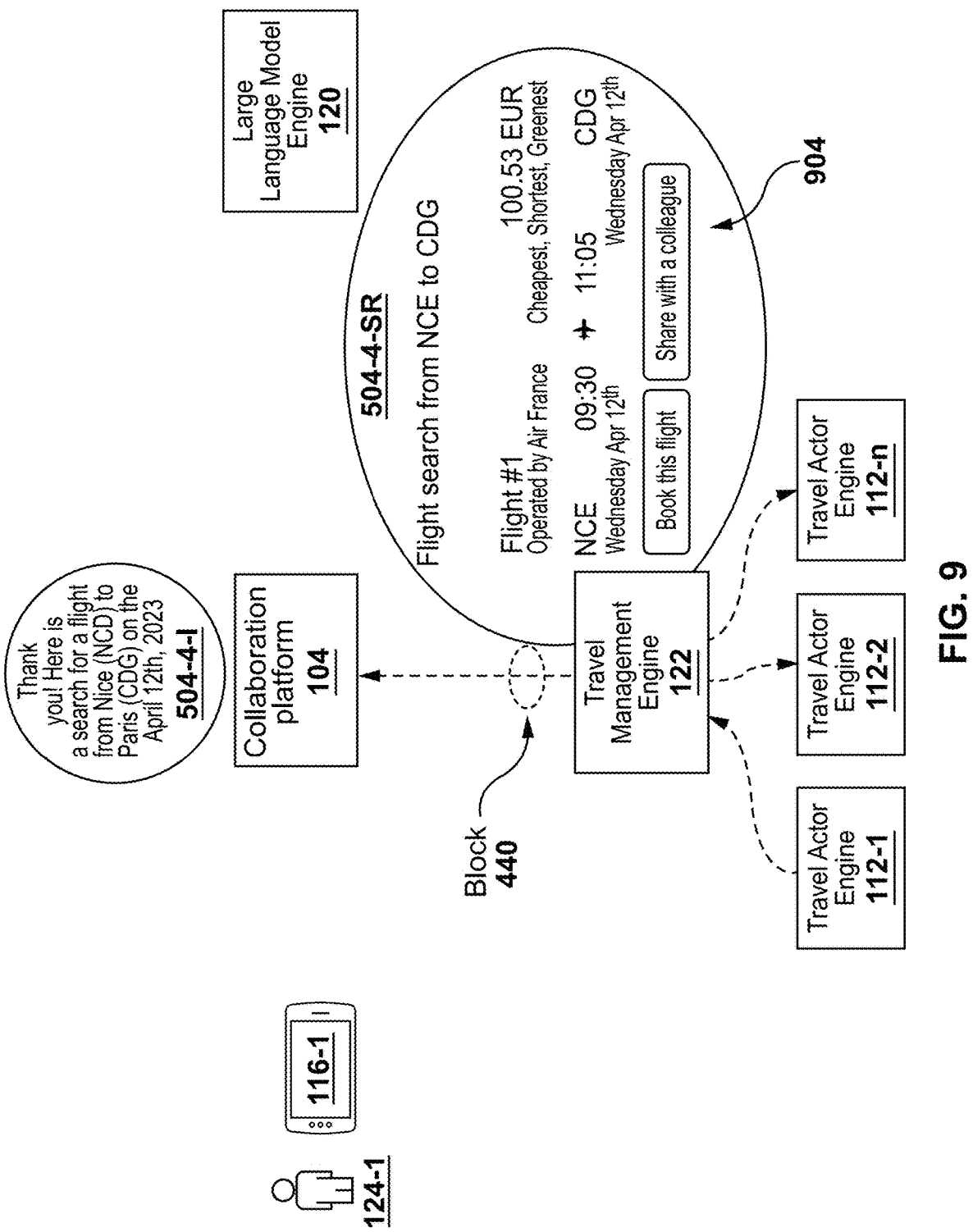
FIG. 9 shows example performance of part of the method of FIG. 4.

Block 440 comprises receiving a response to the structured travel query from block 436. FIG. 9 shows example performance of block 440, continuing the example of FIG. 8. FIG. 9 shows a sub-message 504-4-SR, which includes a flight card 904 assembled by travel management engine 122 based on airline data from travel actor engine 112-1. Flight card 904 includes a single flight option from Nice (NCE) to Paris (CDG) departing at 930 AM on April 12 and arriving at 1105 AM on April 12. Flight card 904 is in a format that is readable to a user 124, and also includes interactive buttons like "Book this Flight" and "Share with a Colleague". (Note that sub-message 504-4-SR is simplified, in that multiple flight options and/or flight cards may be generated as part of the response at block 440 from one or more travel actor engines 112.)

Block 444 comprises generating an output message in response to the input message from block 404. Where no travel query was included in the message from block 404, then, as discussed, block 416, block 420, block 436 and block 440 do not occur and thus the output message at block 444 is consistent with the native natural language processing and conversational functions within LLM engine 120.

Figure 10:
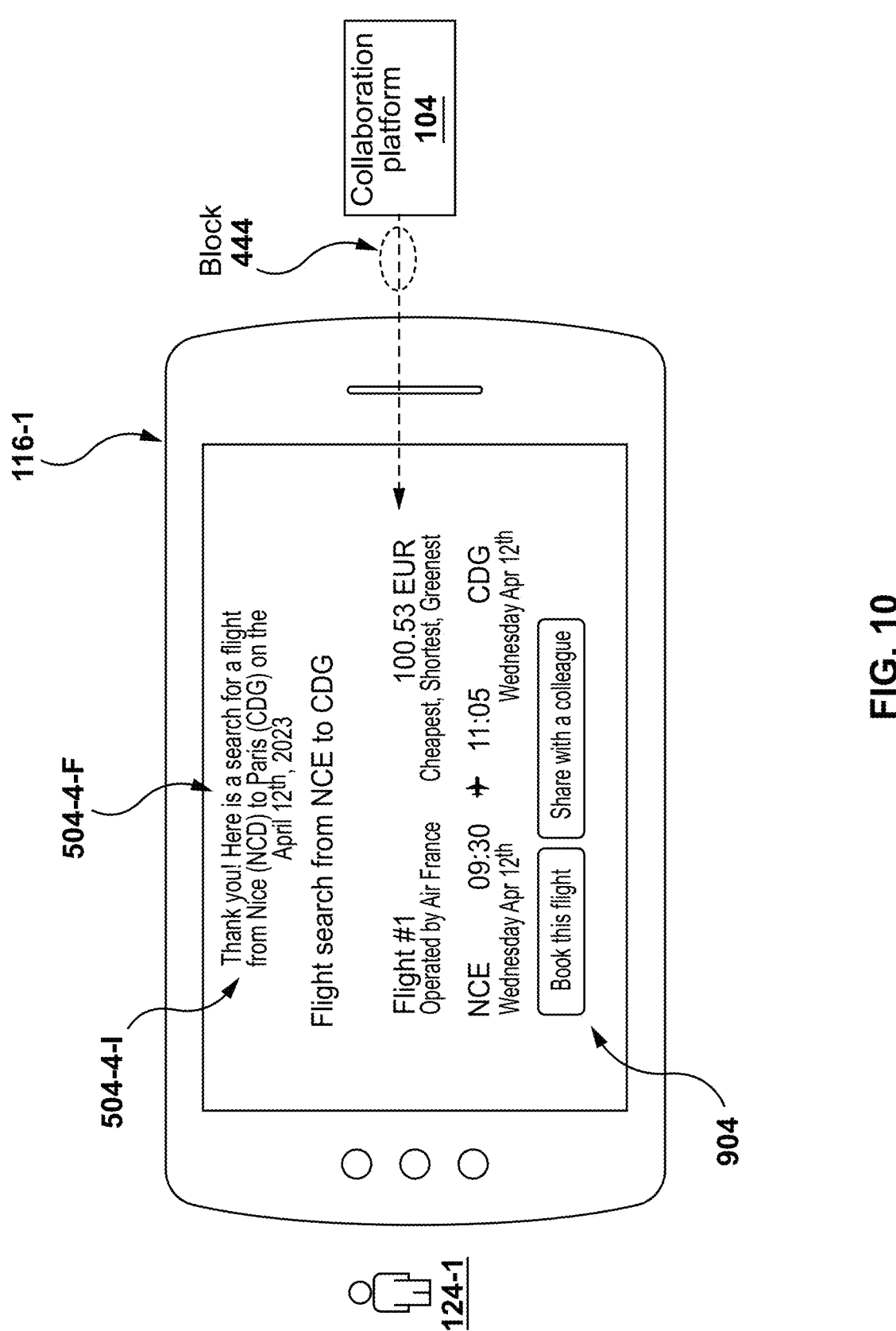
FIG. 10 shows example performance of part of the method of FIG. 4.

However, where a travel query was included in the message at block 404, as per our example, then block 444 comprises generating an output message that includes the travel query response from block 440. It is contemplated that the display of device 116 is controlled to generate the output message. FIG. 10 shows this example performance of block 444, continuing from the example of FIG. 9. In FIG. 10, message 504-4-F is shown on the display of device 116-1. Message 504-4-F combines sub-message 504-4-I with flight card 904 of sub-message 504-4-R. The text "Thank you! Here is a search for a flight from Nice (NCE) to Paris (CDG) on the Apr. 12, 2023." as generated by LLM engine 120 is included, but sub-message 504-4-SQ has been substituted for flight card 904 in the final generation of message 504-4-F on the display of device 116-1.

Many variants and extrapolations of the specific example discussed in the Figures are contemplated and will now occur to those of skill in the art. For example, message 504-4-F can additionally include an invitation for further conversation from LLM engine 120 to help further refine the search results. As an example, message 504-4-F could include the additional question "Do you have any airline preferences?", inviting further natural language conversation between user 124 and LLM engine 120, as intermediated by collaboration platform 104. The inclusion of such an additional question can cause further iterations at block 416 and block 420, to generate further structured queries of the type earlier discussed in relation to sub-message 504-4-SQ, that lead to further searches conducted on travel actor engines 112 in similar fashion to the earlier discussion in relation to block 436 and block 440. Such further structured searches can continue to be narrowed as per responses from the user 124, with LLM engine 120 generated the structured searches and travel management engine 122 fulfilling the searches, with collaboration platform 104 substituting the structured search queries from LLM engine 120 with the user-readable responses obtained by travel management engine 122. User 124 can likewise engage in booking functions via travel management engine 122 that are offered in flight cards such as flight card 904.

A person skilled in the art can also appreciate how the structured queries generated by LLM engine 120 can be extremely sophisticated in nature, whereby travel management engine 122 may make a series of structured queries to travel actor engines 112. Here is an example scenario. If user 124-1 generates an unstructured natural language query of the form "I would like to see flights from Nice to Paris on April 12 where the flights must land only during operational hours of the Paris Metro system", then a first structured query can be made of a first travel actor engine 112 that has information about the operational hours of the Paris Metro system, which can then be returned to LLM engine 120 to generate a second structured query that filters by flights that land during the operational hours returned from the first query. LLM engine 120 may also engage in a series of questions to the user 124 to ultimately arrive at the series of necessary structured queries of different travel actor engines 112 to obtain results that are responsive to the original query.

Figure 11:
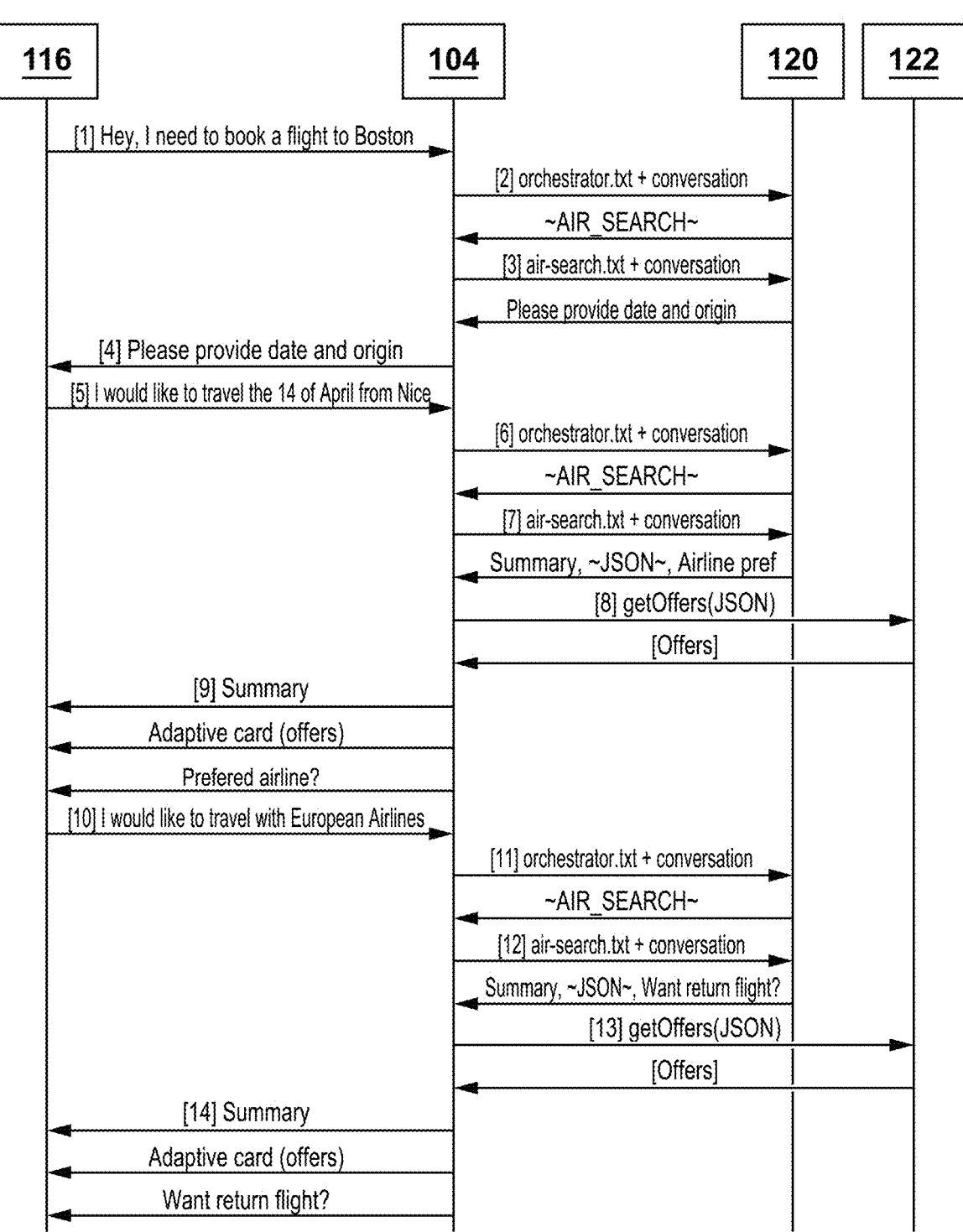
FIG. 11 shows example message flow according to the system of FIG. 1.

FIG. 11 shows an illustration of message flows of the system of FIG. 1 that can represent another way to conceptualize method 400 and variants thereon.

It will now be apparent just how far the unstructured queries can scale within the scope of the present specification: "I would like to see flights from Nice to Paris on April 12 where the flights must land only during operational hours of the Paris Metro system and on days when the Paris Symphony Orchestra is performing Mozart and hotel prices are less than 300 Euros per night for double occupancy within ten blocks of the symphony venue". Here additional structured queries are made of travel actor engines 112, which include event actors that ascertain the schedule if the Paris Symphony and accommodation actors that have hotel rooms at the specified price point and a location within the prescribed geographic radius.

Figure 12:
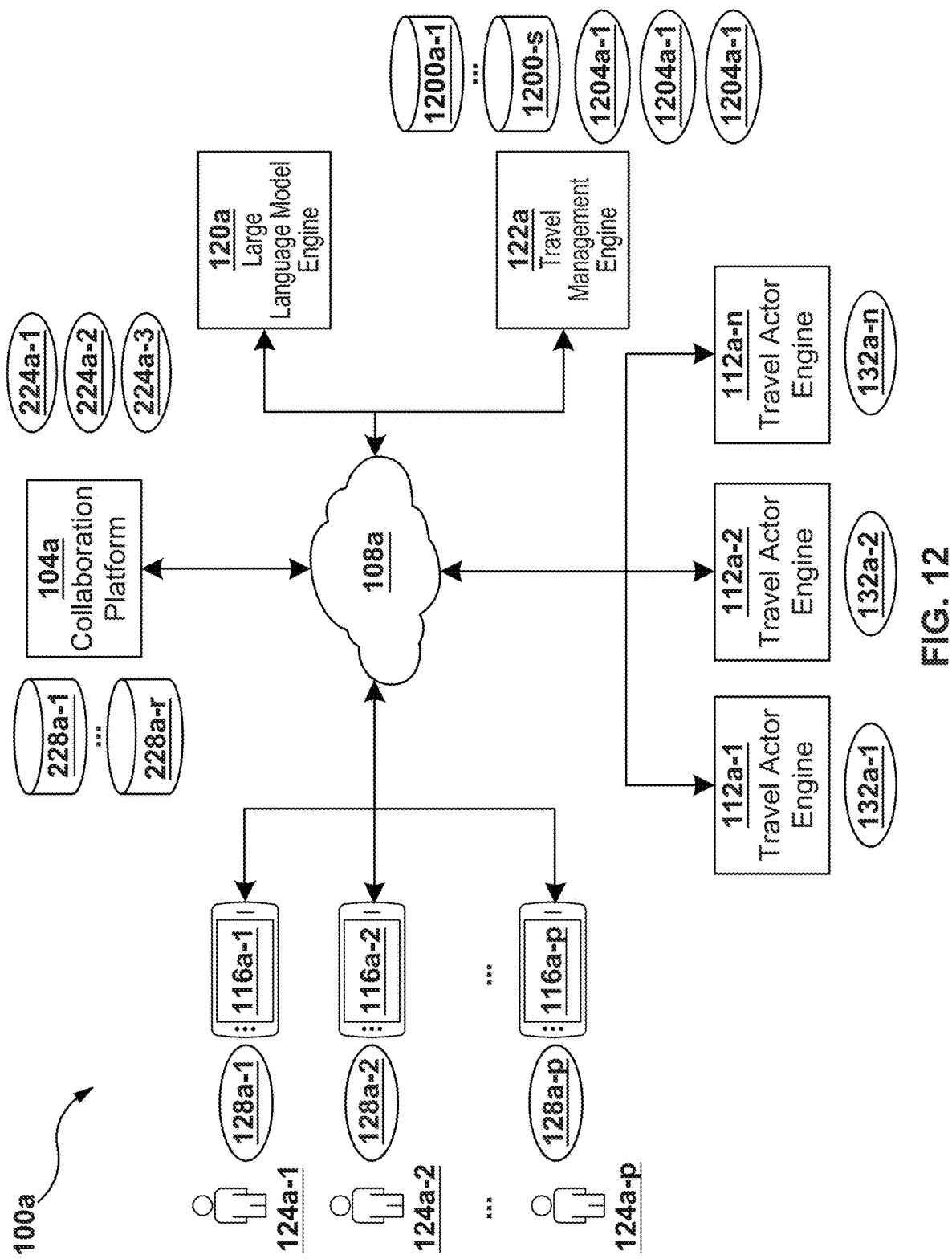
FIG. 12 is a schematic diagram of a system for travel itinerary searching.

Referring now to FIG. 12, a system for travel itinerary searching in accordance with another embodiment is indicated generally at 100a. Notably, in system 100a, collaboration platform 104a is a chatbot server that can be used for natural language processing (NLP) conversations with users

124a on devices 116a. Also of note is that, in system 100a, travel management engine 122a is configured to generate and cache a sparse data domain, as will be explained further below. Engine 122a thus maintains a plurality of applications 1204a and a plurality of datasets 1200a. Otherwise, it can be noted that system 100a is a variant of system 100, with similar elements denoted by the same reference characters, but appended with the suffix "a". (This nomenclature is used elsewhere herein.)

Figure 13:
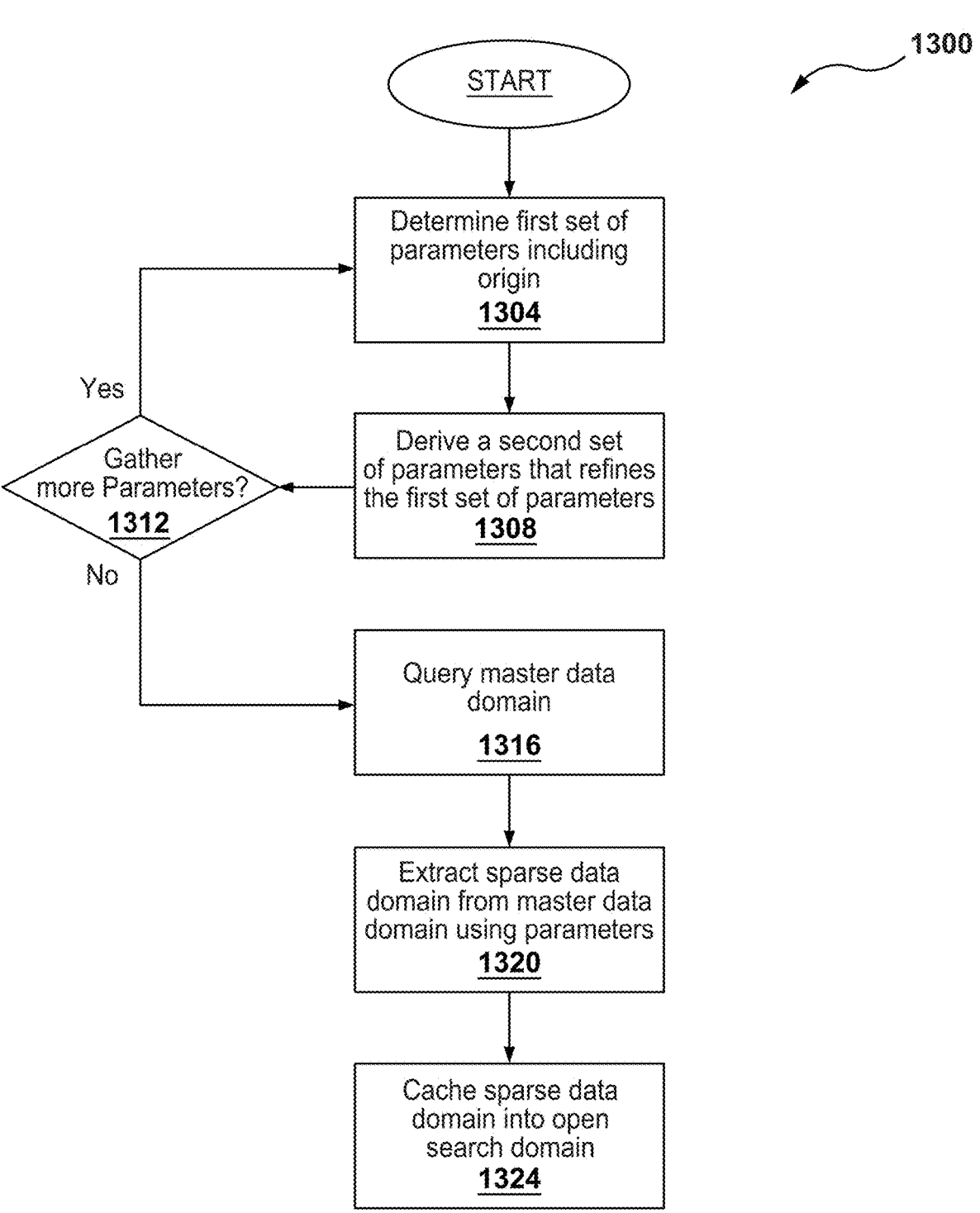
FIG. 13 a flowchart depicting a method for real time travel itinerary searching.

FIG. 13 shows a flowchart depicting a method for creating a cache for network searching indicated generally at 1300. Method 1300 can be implemented on system 100a. Persons skilled in the art may choose to implement method 1300 on system 100a or variants thereon (such as system 100), or with certain blocks omitted, performed in parallel or in a different order than shown.

Method 1300 can also be varied. For purposes of explanation, method 1300 will be described in relation to its performance on system 100a with a specific focus on method 1300 being implemented as, for example, application 1204a-1 maintained within non-volatile storage (not shown) of travel management engine 122a and executable on the processor (not shown) of travel management engine 122a and its interactions with the other nodes in system 100a. However, for illustrative simplicity and convenience, since system 100a is a variant on system 100, the following discussion may occasionally reference system 100 and the examples discussed therein in relation to method 300 and method 400, and/or may reference fresh examples in relation to system 100a.

Method 1300 can be applied to a plurality of different search domains, and generally comprises determining a first set of canonical parameters including at least a base parameter; deriving a second set of canonical parameters from intention-elements that refine the intention-elements; querying a master data domain of data based on the parameters; extracting a sparse data domain from the master data domain based on the parameters; and, caching the sparse data domain into an open search domain accessible to client devices connected to the network. Different search domains can include any databases that are over the Internet or other network, including search domains that may be searched via natural language conversations.

Example search domains may include Internet searches for search domains that include: 1) restaurants, 2) media, 3) events, 4) hotel accommodations, 5) flight bookings. Other types of search domains will occur to those of skill in the art. To help illustrate method 1300, a specific example discussion involving travel databases including flight bookings will be canvassed, but it is to be understood that this is an illustrative example of one search domain.

Block 1304 comprises determining a first set of parameters including an base parameter, such as an origin in the context of travel. Block 1304 can be effected in many ways that will occur to a person of skill in the art. As a non-limiting illustrative example, interactions between a device 116, collaboration platform 104 and LLM engine 120 can result in natural language processing of messages, such as message 504-1, to ascertain an origin from an intent extracted from the message. Message 504-1 is a salient example, which includes the sentence "Hey, I need to book a Flight to Paris". Collaboration platform 104a and LLM engine 120a can thus derive the origin parameter "Paris" from message 504-1. Likewise, message 504-3 of FIG. 6, includes additional canonical parameters, beyond origin, including the departure date of "April 12" from the departure city of "Nice". (It being possible to resolve both "Paris"

and "Nice" into International Air Transport Association (IATA) airport codes for the respective cities in a prior art search environment. Accordingly, both "Paris" and "Nice" can be considered canonical. Likewise, "April 12" is canonical.)

Canonical parameters can refer to a predefined set of attributes or fields commonly used to index, search, and retrieve records within a database. In the context of travel databases or similar data repositories of master data domains, these parameters typically include, but are not limited to, structured and universally recognized identifiers such as origin, destination, travel dates, class of service, airline, and flight duration. Canonical parameters are established based on industry standards, user search behaviors, and the structured data schema of the database, facilitating efficient query processing, data retrieval, and analytics. These parameters serve as the primary keys or indices or base parameters in facilitating direct and straightforward searches, enabling users and systems to quickly access pertinent records based on widely accepted criteria.

Figure 14:
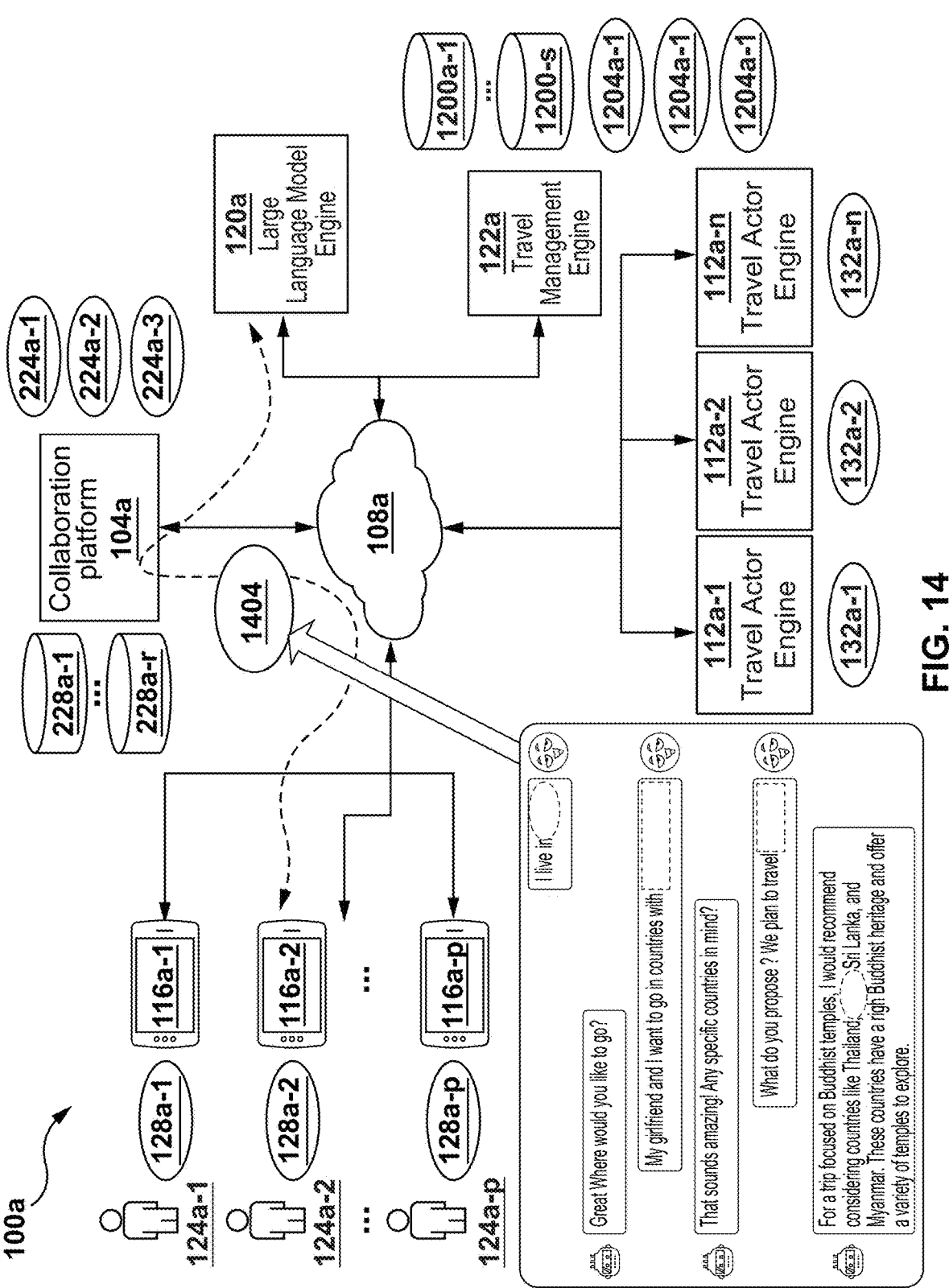
FIG. 14 shows an example of a performance of certain blocks from the method of FIG. 13.
Figure 15:
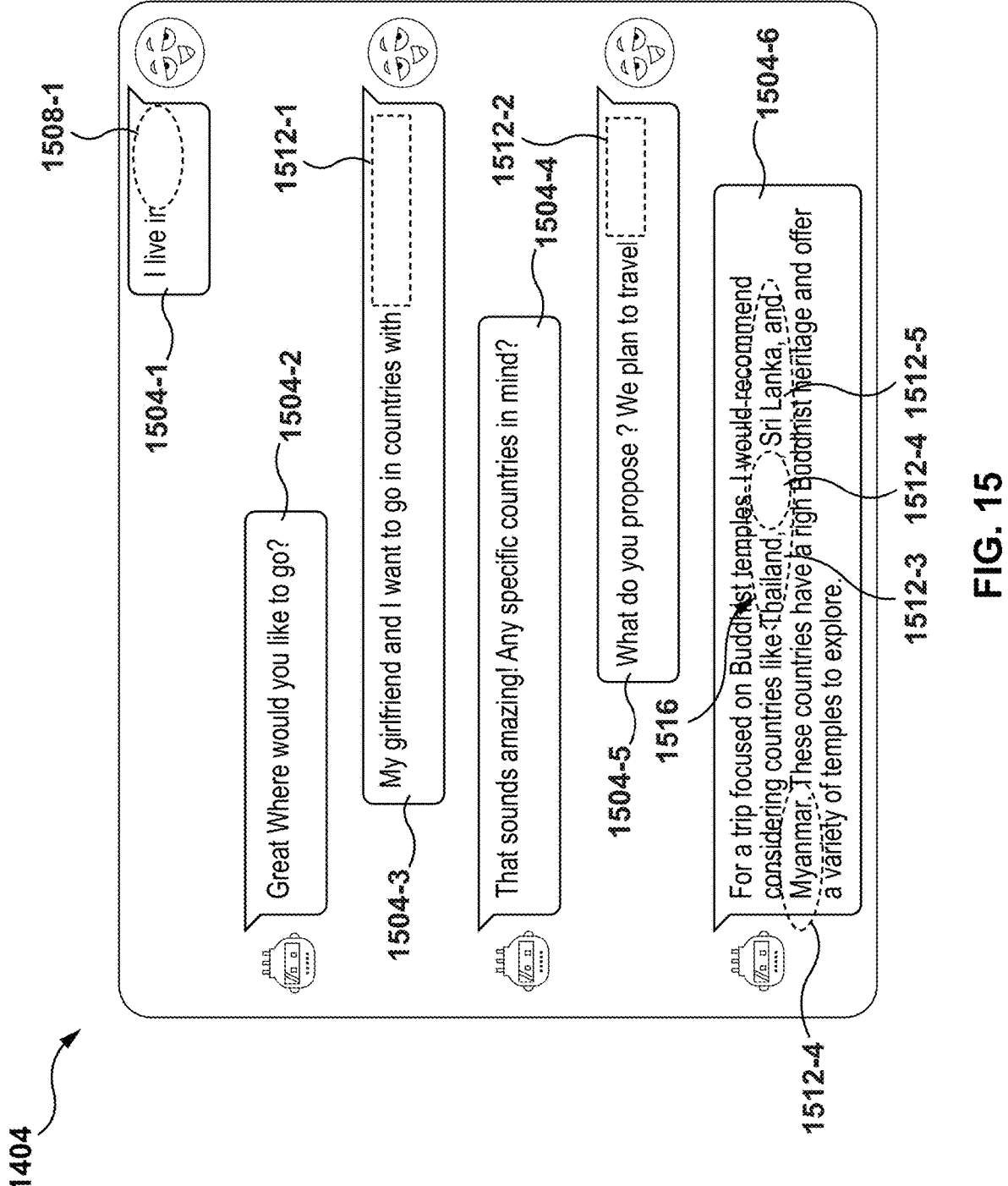
FIG. 15 shows a visualization of the processing of a conversation from the method of FIG. 13.

A more complex, but still non-limiting illustrative example of performance of block 1304 is shown in FIG. 14 and FIG. 15. FIG. 14 shows a natural language conversation 1404 including a plurality of messages 1504 between device 116*a*-1 and collaboration platform 104*a*, with LLM engine 120*a* providing additional support. FIG. 15 shows conversation 1404 in greater detail. The conversation is reproduced below for convenience.

Message 1504-1: Device 116*a*-1: "I live in London."

Message 1504-2: Collaboration platform 104*a*: "Great! Where would you like to go?"

Message 1504-3: Device 116*a*-1: "My girlfriend and I want to go in countries with Buddhist temples."

Message 1504-4: Collaboration platform 104*a*: "That sounds amazing! Any specific countries in mind?"

Message 1504-5: Device 116*a*-1: "What do you propose? We plan to travel early 2024."

Message 1504-6: Collaboration platform 104*a*: "For a trip focused on Buddhist temples, I would recommend considering countries like Thailand, Japan, Sri Lanka, and Myanmar. These countries have a rich Buddhist heritage and offer a variety of temples to explore."

In conversation 1404, the origin parameter 1508-1 is "London" which can be determined from message 1504-1. Origin parameter 1508-1 can thus be considered a canonical parameter because, while it does not specifically identify any airport in London England, it can be resolved into "LON", that expressly covers Heathrow Airport (LHR), Gatwick Airport (LGW), London City Airport (LCY), Stansted Airport (STN), Luton Airport (LTN), Southend Airport (SEN), as per the International Air Transport Association (IATA). While not shown in conversation 1404, in other conversations, other canonical parameters of standard air travel searches can include destination (e.g. IATA airport code), dates (eg. Exact departure and return date), times (eg. Exact time of day), class of travel, number of stops (e.g. 0, 1, 1+) and other canonical parameters directly related to the core function of searching for air travel. However, conversation 1404 only includes one true canonical parameter 1508-1 that can be resolved into the IATA airport code "LON".

Thus, this concludes block 1304 in that the origin parameter "LON" has been derived. Method 1300 then invokes block 1308, which comprises deriving a second set of parameters that refines the first set of parameters. The second set of parameters can be derived from intention-elements in conversation 1404. Notably, FIG. 15 shows message 1504-3 which generally includes an intention-element 1512-1 that indicates an intention to visit "countries with Buddhist temples" in terms of destination. Likewise, message 1504-5 includes an intention-element 1512-2 that indicates travel dates of "early 2024". Finally, message 1504-6 results in a refined set of variables 1516 (derived from intention-element 1512-1) that identifies countries with Buddhist temples including intention-element 1512-3, "Thailand", intention-element 1512-4 "Japan", intention element 1512-5 "Sri Lanka" and intention element 1512-4 "Myanmar". However, since these are only countries, and not specific airport destinations, these variables 1516 may not be considered fully refined into canonical parameters, since IATA does not assign any codes to represent all airports in a single country, and no single country has been selected in any event. Accordingly, intention-elements 1512 are not considered canonical parameters and are not amendable to travel searching in and of themselves.

Intention-elements, in general, emerge from the nuances of natural language processing and are derived from input that may not directly map to the predefined canonical parameters of a database. These elements capture the intentions or preferences expressed in natural language by users, which may include temporal preferences ("over the weekend"), qualitative desires ("budget-friendly"), or contextual specifications ("near the beach") that are not explicitly defined as searchable fields in the database schema. In the technical implementation, intention-elements require processing and interpretation through NLP techniques to transform unstructured natural language into a structured query format. This process may involve identifying synonyms, extracting relevant context, and mapping the nuanced user input to the closest matching canonical parameters or deriving additional query criteria that align with the user's intentions. The transformation of intention-elements into actionable query components may also involve the generation of meta-parameters or auxiliary criteria that augment the original search query, enabling a more refined and intention-aligned search result set.

Thus, in conclusion of this example, block 1308 contemplates deriving a second set of parameters that further refines the first set of parameters from block 1304 considering intention-elements 1512.

As noted, a problem with the prior art is the large number of searches that are often repeated in order to search for travel options, which thereby consume processing, memory and bandwidth resources of systems which are prior art to system 100 and system 100*a*. Thus, message 504-1, message 504-3 and conversation 1404 are examples of data that can be processed at block 1304 and block 1308, leading up to the remainder of method 1300.

After block 1308, block 1312 comprises determining whether to gather more parameters. A "Yes" returns to block 1304. A "No" leads to block 1316.

Repeated performance of block 1304 and block 1308 can be used for training to obtain derived second sets of canonical parameters from intention-elements 1512, based on historical data of searches and/or ongoing performance of method 1300 or method 400. In sum, it is contemplated that many messages and conversations including travel searches via devices 116*a* can be processed to establish canonical travel parameters as part of the first set from block 1304, and to derive a refined second set of canonical parameters at block 1308.

It can thus be noted that in addition to canonical parameters of standard air shopping, system 100*a* contemplates intention-elements 1512 which can represent aggregated parameters (e.g. country, which implies all the destinations in the country) are also contemplated, and likewise trip parameters (e.g. $CO_2$ emissions from travel from the origin to the various possible destinations). It can also be noted that intention-elements 1512 can additionally be used, for example, to derive canonical parameters that can be used for traditional searches that include, for example, stay duration, likelihood and nature of advance purchase, the most searched dates, the most expensive, the most time spent waiting for a connection, the most number of connections, and the most frequently booked travel itineraries. Other derivable parameters will now occur to those skilled in the art.

To reiterate, the present specification contemplates deriving second sets of canonical parameters based on intention-elements 1512, through analysis of ongoing performance of method 1300 or based on past data collected from searches conducted prior to implementation of the teachings herein. In turn, a sparse data domain 1708 (discussed in greater detail below) can be developed, in order to provide rapid and efficient access to common searches. It is contemplated that some of the second sets of parameters can be discarded, such as the less common ones, but instead allow those searches to proceed based on the prior art approaches.

The criteria for determining "No" at block 1312 is not particularly limited, but in general includes a statistically significant number of cycles through block 1304 and block 1308 such that, as will be discussed further below, a sparse data domain 1708 can be extracted at block 1320 such that future messages and conversations (like messages 504 and conversation 1404) expressing intent for travel searches can trigger searches from the extracted sparse data domain (without the need to directly access travel actor engines 112a) and thereby reduce the amount of technological burden on network 108a.

Figure 16:
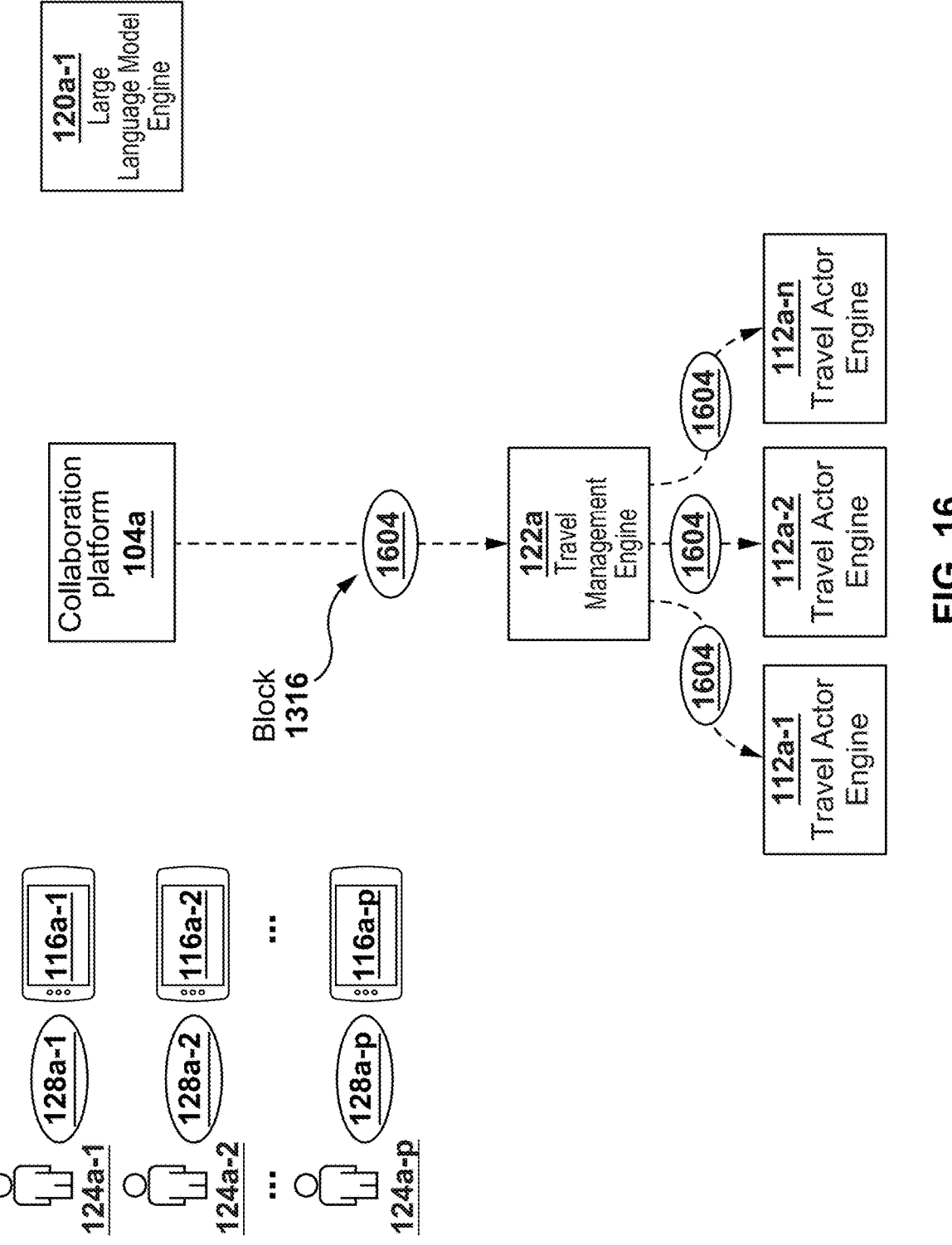
FIG. 16 shows a visualization of the processing of a conversation from the method of FIG. 13.

Block 1316 comprises querying a master data domain. The query can be based on the aggregation of the first set of parameters and the second set of parameters. In the context of system 100a, the master data domain includes all of the data available on engine 112a. Example performance of block 1316 on system 100a is shown in FIG. 16, where collaboration platform 104a is shown as passing a query 1604 to travel management engine 122a which in turn passes the query 1604 across the master data domain comprised of the plurality of engines 112a. Query 1604 thus represents that aggregation of first set of parameters and second set of parameters from repeated performance of block 1304 and block 1308. In other words, query 1604 represents canonical searches as per the prior art.

Figure 17:
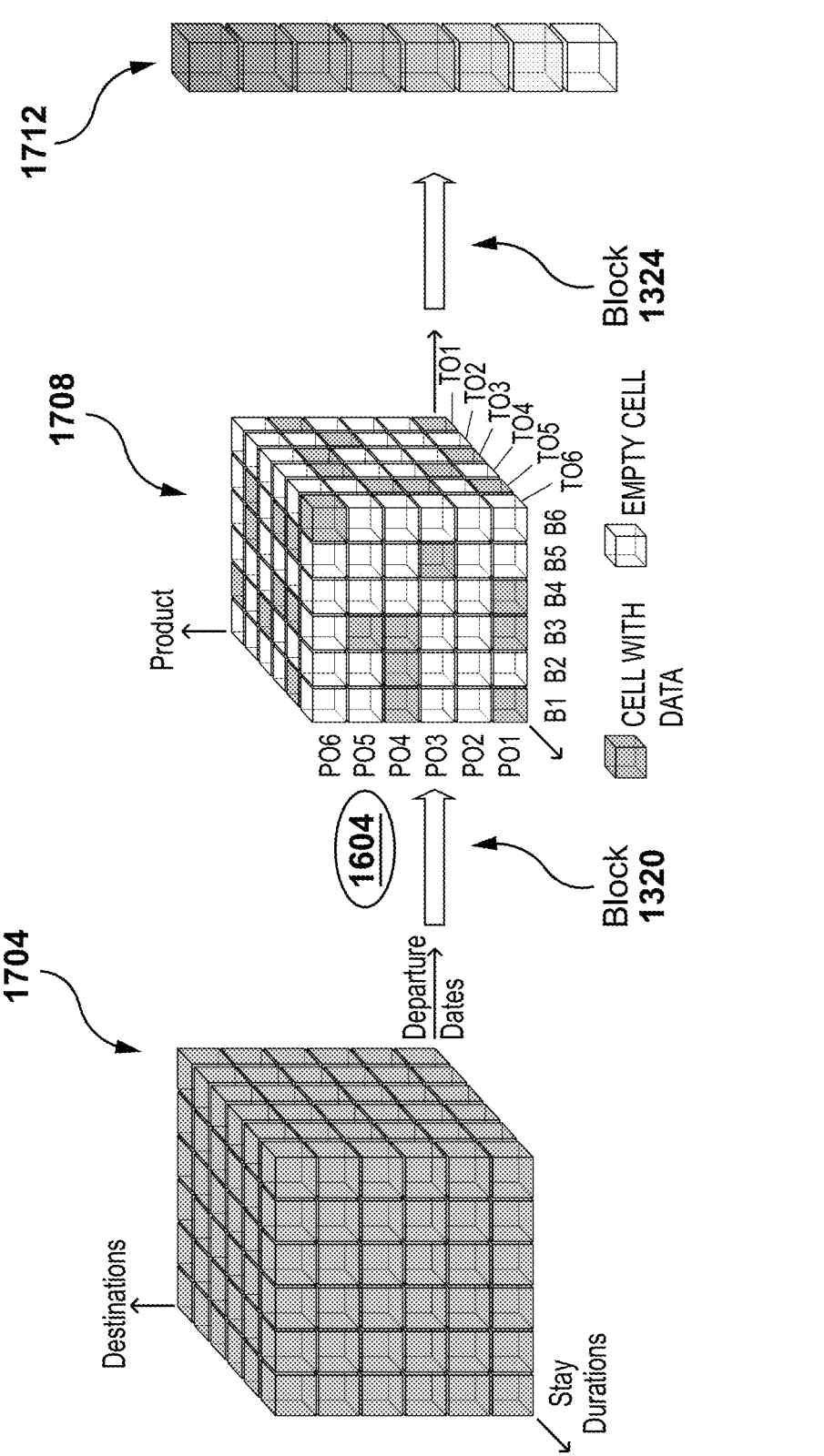
FIG. 17 shows a visualization of the processing of a conversation from the method of FIG. 13.
Figure 18:
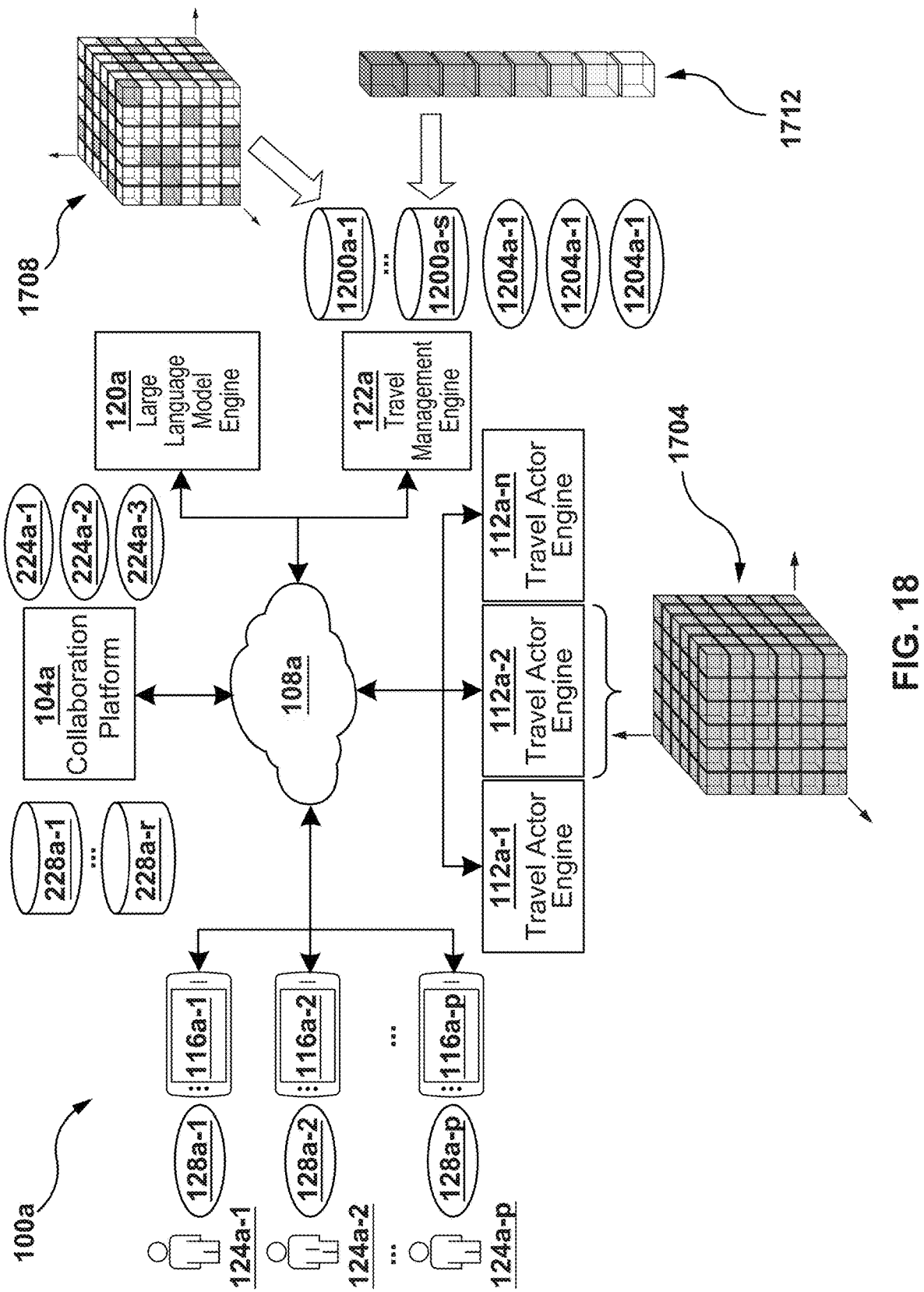
FIG. 18 shows a visualization of the processing of a conversation from the method of FIG. 13.

Referring now to FIG. 17 and FIG. 18, block 1320 comprises extracting a sparse data domain 1708 from the results of the query to the master data domain 1704 at block 1316, and block 1324 comprises caching the sparse data domain 1708 into an open search domain 1712.

The sparse data domain 1708 and open search domains 1712 can be primarily indexed according to the first set of parameters. To explain further, recall that conversation 1404 included the origin parameter 1508-1 of "LON" as part of the first set of parameters. Since London is a major city from which travel originates, it can be expected that a significant number of Internet travel searches will including this origin, thus making London as an origin logical for inclusion in the sparse data domain 1708. At the same time, Fairbanks Alaska (FAI) is a much less common origin than London (LON), thus making Fairbanks as an origin that is logical for exclusion from the sparse data domain 1708. Again, repeated performance of block 1304 and block 1308 will build a data set to identify such logical inclusions and logical exclusions. A person of skill in the art will now recognize how an analysis of intention-elements 1512 from block 1304 and block 1308 allows for a much more complex scaling of what is to be included in the sparse data domain 1708. (Likewise, uncommon destinations from LON may be excluded from the sparse data domain 1708.)

As best seen in FIG. 18, master data domain 1704 represents the universe of searchable data on engines 112a, while sparse data domain 1708, once extracted, is (at least temporarily) stored as dataset 1200a-1 on travel management engine 122a, and open search domain 1712 is stored as dataset 1200a-s and available for searching.

Example implementation of block 1320 will be discussed in greater detail below.

Other factors on extraction at block 1320 will be discussed further below.

Figure 19:
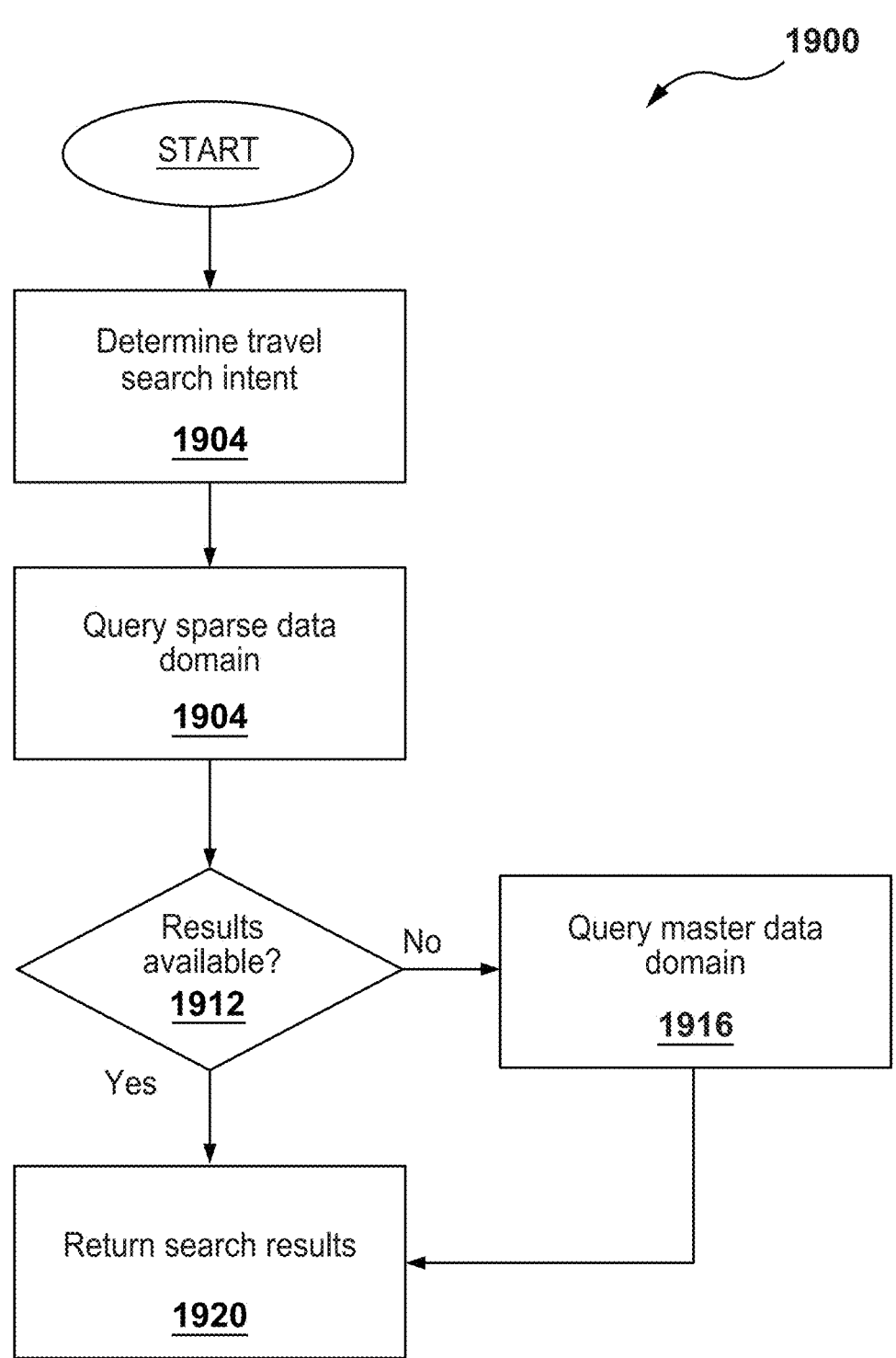
FIG. 19 shows a method 1900 for responding to natural language search queries.

Referring now to FIG. 19, method 1900 can be provided to respond to natural language search queries from devices 116a while making use of the sparse data domain 1708. Block 1904 comprises determining a travel search intent. The intent can be determined from natural language travel search messages conversations between devices 116a and collaboration platform 104a, such as conversation 1404 and messages 504. Block 1908 comprises querying the sparse data domain 1708 for a response that fulfills the intent, while block 1912 comprises determining if the results are available. With assistance of LLM engine 120a, such intent can be resolved into terms that are searchable within open search domain 1712, whether or not those terms are canonical and directly searchable in master data domain 1704. A "No" determination at block 1912 leads to block 1916, resulting in a fallback query to master data domain 1704, while a "yes" determination at block 1912 leads to directly block 1920. (For example, an intention to search for flights originating from Fairbanks (FAI) can lead to a fallback query to master data domain 1704, whereas flights originating from London (LON) may be available within open search domain 1712, unless the destination from LON is so uncommon that those destinations were excluded from open search domain 1712). At block 1920, results that are responsive to the intent expressed at block 1904 are returned, whether those results came from sparse data domain 1708 or master data domain 1704.

Figure 20:
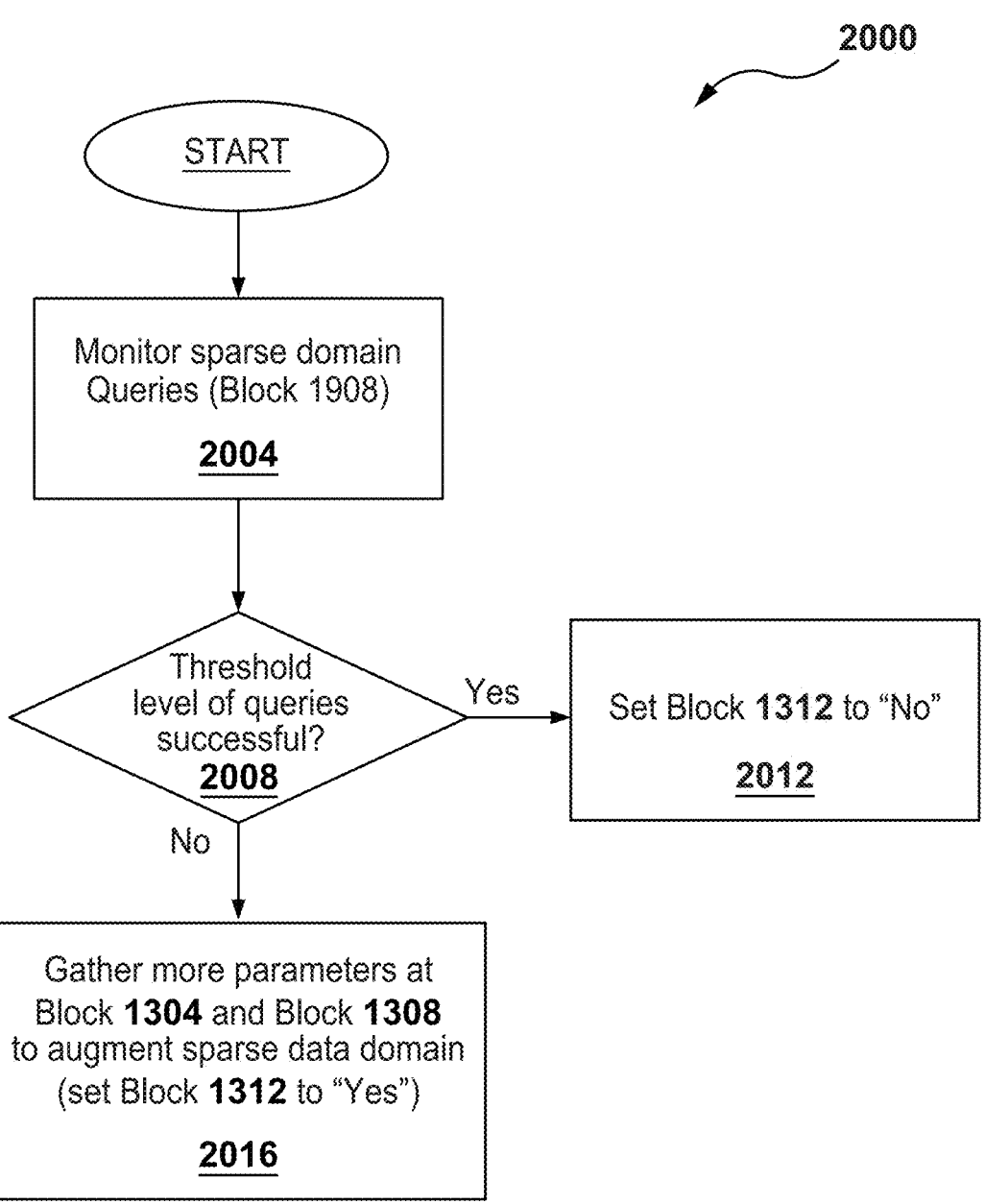
FIG. 20 shows a method for parallel execution of method from FIG. 13 and the method from FIG. 19.

As per method 2000 in FIG. 20, it is contemplated that method 1300 and method 1900 can run in parallel, with method 1300 executing to constantly update sparse data domain 1708 while method 1900 manages ongoing queries from devices 116a. Block 2004 comprises monitoring the sparse data domain 1708 queries from block 1908, while block 2008 determines if a threshold level of those queries are successful. A "yes" determination at block 2008 leads to setting the determination at block 1312 to "No"; while a "No" determination at block 2008 leads to setting the determination at block 1312 to "Yes." The overall threshold that is established can be based on an overall desired reduction of queries to master data domain 1704, and thereby reduce processing, memory and communication burden on system 100a. Expressed differently, the threshold can be based on reducing the number of "No" determinations at block 1912.

Figure 21:
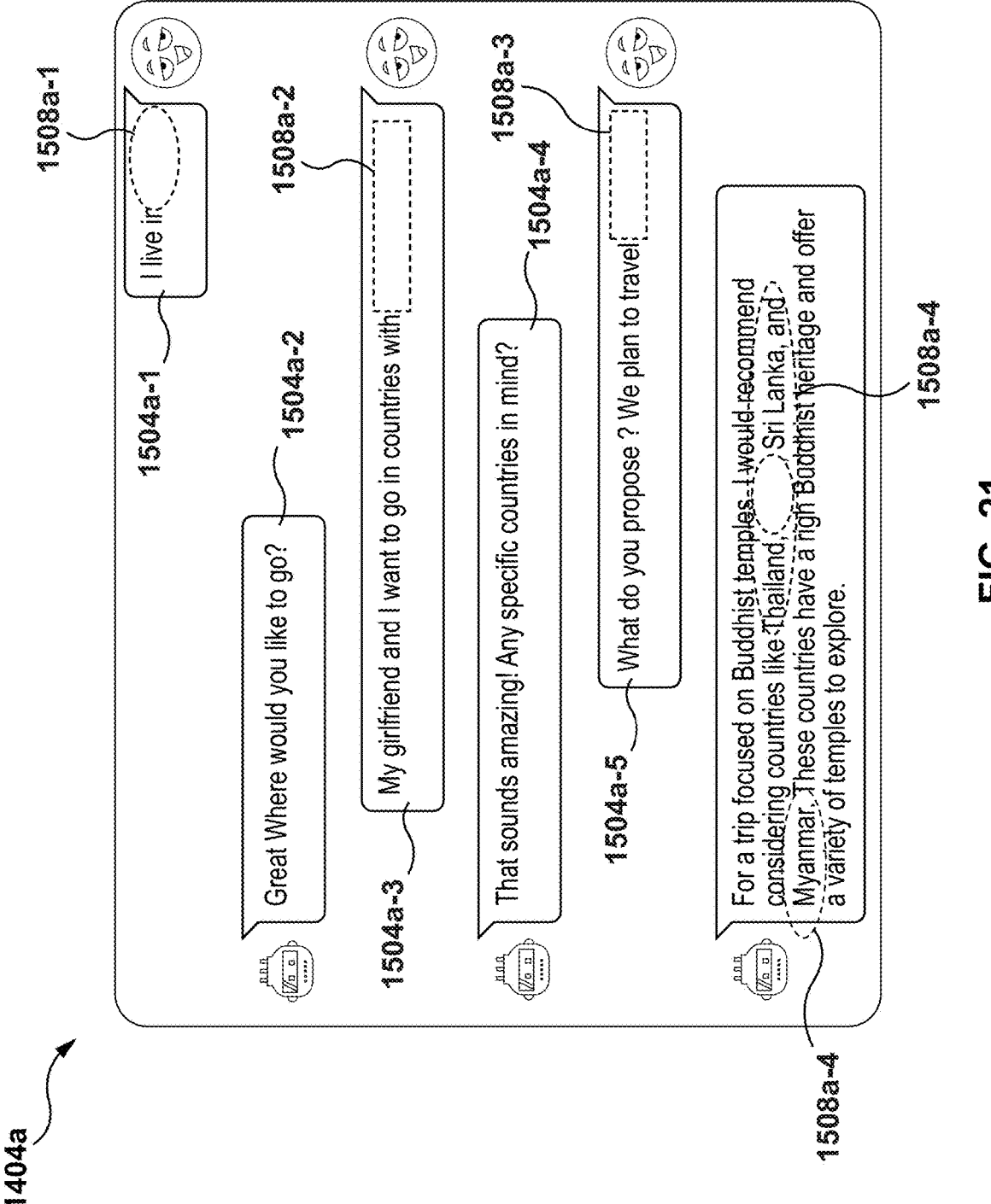
FIG. 21 shows an example conversation according to the various methods herein.

As an illustrative example of performance of method 1900 assume that sparse data domain 1708 has been populated via method 1300, and that conversation 1404a from FIG. 21 is provided at block 1904. (Note that conversation 1404a is substantially the same as conversation 1404. Recall that conversation 1404 was previously used as an example for how method 1300 can be effected. For this illustrative example of performance of method 1900, it is assumed that that method 1300 has already been used populate sparse data domain 1708, and thus the example of conversation 1404 is being repurposed as conversation 1404*a* to help illustrate method 1900. In an actual implementation, conversation 1404 and conversation 1404*a* would typically be "different", because one set of conversations or messages may be used to implement method 1300, while another set of conversations or messages may be used to perform method 1900. Alternatively, conversations from block 1904 may also be fed back into method 1300, either in real-time or asynchronously, particularly where a "No" determinations happens at block 1912.)

Continuing with example performance of method 1900 based on conversation 1404*a*, according to system 100*a* messages 1508 can be examined to derive parameters to extract from the sparse data domain 1708.

The following variables can be extracted from conversation 1404*a* for querying of sparse data domain 1708.

Origin: London (specified)

Destinations: Thailand, Japan, Sri Lanka, Myanmar (derived from "Buddhist temples")

Departure: Between January and March 2024 (derived from "early 2024")

Budget: Not specified

Stay duration: Not specified

The preceding variables can then be resolved into a structured query at block 1908 such as:

{'origin_city': 'LON', 'destination_country': 'TH,JP,LK, MM', 'dep_date_min': '20240101', 'dep_date_max': '20240331'}

In turn, for example, the following result may be returned for travel from London Heathrow to Narita, Tokyo, Japan from sparse data domain 1708:

"140124:0840:140124:1105:LHR:4:AMS::KL:KL:1002: 73H", "140124:1230:150124:0945:AMS::NRT:1:KL: KL:861:772"

(Example results for the other countries are omitted for simplification, but a skilled reader will appreciate how they may appear.)

One or more deeplinks may also be returned at block 1920 to a specific travel booking engine 112*a* to allow completion of the booking. For example:

https://www.kayak.fr/flights/LHR-NRT/2024-01-14/ 2024-0121?sort=price_a

Figure 22:
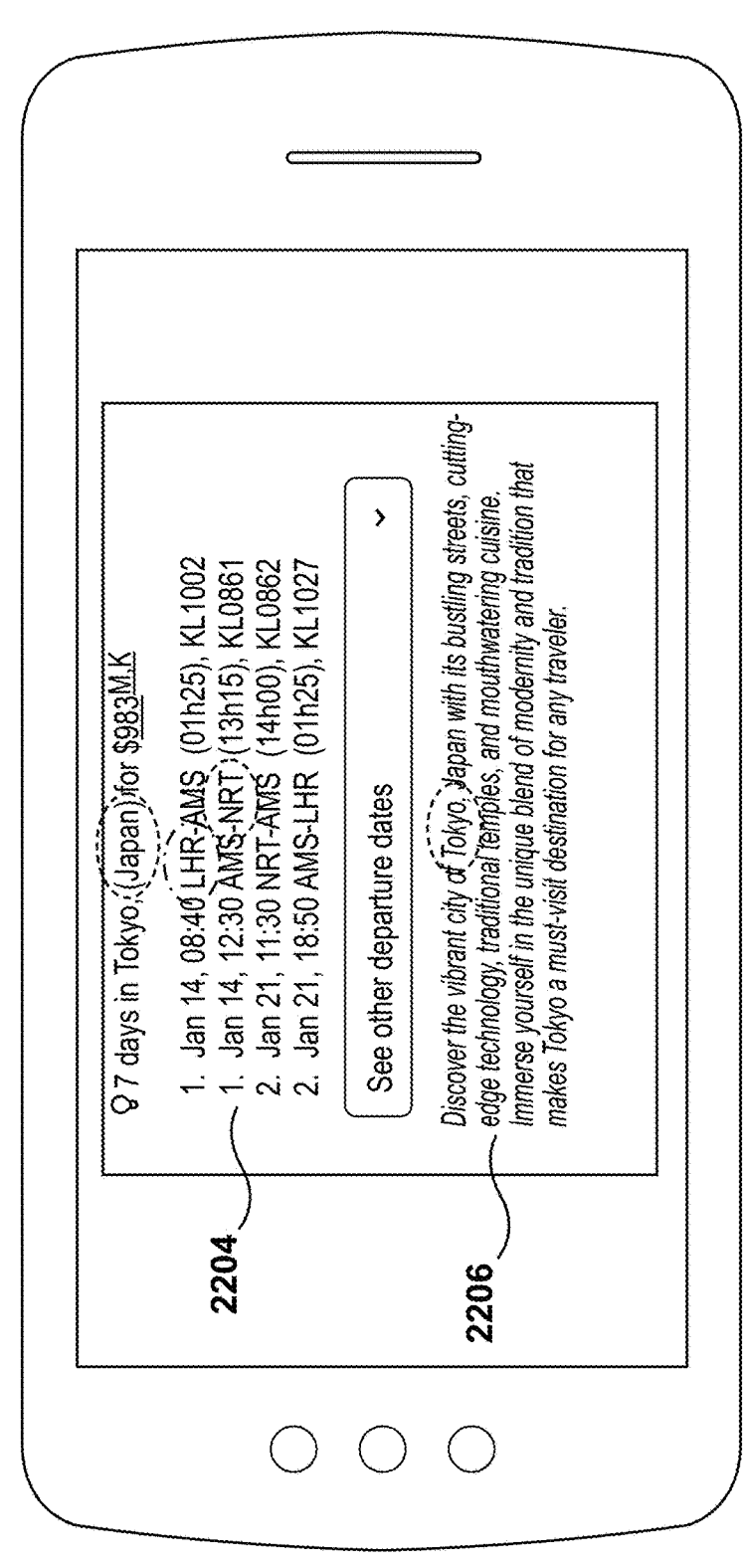
FIG. 22 shows an example of results generated according to the various methods herein.

FIG. 22 shows an example of results 2204, showing various flight options and offerings from London Heathrow to Narita, Tokyo, Japan, and return, that can be generated on device 116*a*-1 based on the above example. Note that results 2204 are consistent with conversation 1404*a*.

1. January 14, 08:40 LHR-AMS (01h25), KL1002

1. January 14, 12:30 AMS-NRT (13h15), KL0861

2. January 21, 11:30 NRT-AMS (14h00), KL0862

2. January 21, 18:50 AMS-LHR (01h25), KL1027

Of note is that in addition to results 2204, a natural language description 2206 of the trip is generated. "Discover the vibrant city of Tokyo, Japan with its bustling streets, cutting-edge technology, traditional temples, and mouthwatering cuisine. Immerse yourself in the unique blend of modernity and tradition that makes Tokyo a must-visit destination for any traveler."

The example in FIG. 22 is conceptually the same as the example in FIG. 10, and a person skilled in the art will appreciate that the way in which the results were built and generated in FIG. 10 likewise apply, suitably adapted, to the example in FIG. 22.

In view of the above it will now be apparent that further variations, combinations, and/or subsets of the foregoing embodiments are contemplated. For example, populating the sparse domain 1708 can also be based on a dedicated pre-selection from a daily pre-computation with neutral options and filtering of recommendations. For example, advance purchase 7, 30, 60, 90, 120, 150, 180, 210, 240 days, and a stay duration 3, 5, 7 or 14 days, thereby covering about fifty percent of standard shopping requests. Thus method 1300 can be performed from time to time to update sparse data domain 1708 accordingly. Multiple copies of sparse data domain 1708 may also be generated. Populating sparse domain 1708 can also focus on the fields necessary for value formula, to rank offers, and later to revalidate or match offers.

Engines 112*a* based on sources such as a live traffic cache, or NDC offer repositories can be also integrated into master data domain 1704. Static city information (e.g. popularity, geographies, regulations) can also be used to prioritize what data is extracted at block 1320 in order to facilitate search and aggregation, which can be stored separately and joined at query time in method 1900.

The sparse data domain 1708 can focus on providing search results in method 1900 that facilitate comparability, and sparsity of offers may be favored over their price accuracy and exhaustiveness, with the master data domain 1704 available should that specificity be requested. Accordingly, searching resources of master data domain 1704 are used more sparingly thereby improving search efficiency over the prior art.

Sparse data domain 1708 extraction criteria can include providing offers that are deemed "most valuable" to devices 116*a*. Formulas can be provided as part of further refining what is extracted at block 1320, that can be based on, for example, one more of, flight prices, daily expenses, average accommodation price for the same class of service. The formulas can also be based on penalties computed from convenience criteria like number of stops, ground time. The formulas can also be based on a ratio of distance to flying ratio adjustment to avoid flights of excessively impractical length. As previously discussed, what is extracted from the master data domain 1704 into the sparse data domain 1708 can be statically configured or dynamically adjusted from selection by feedback loops monitoring activity from devices 116*a* as per block 1304 and block 1308.

Sparse data domain 1708 extraction criteria can also be based on several steps to rank offers. For example, at block 1320, selecting the best offers (among the 500 ones of a cell). Furthermore, at block 1908 when querying sparse data domain 1708, during aggregation (e.g. per region or country) selecting the best offers of a group. Furthermore, when a device 116*a* actually makes a selection from results returned at block 1920 and completes a booking, sparse data domain 1708 can be updated so as to retain the offers that are selected most often. (E.g. the top 3).

Extraction of sparse data domain 1708 at block 1320 can be performed in several ways, including the following example create_db.py script for ingesting data collection points will add the flag to the recommendation, where the flag indicates potential inclusion in the sparse data domain 1708.

```
----- STEP 1: Ingest STAY data as a table named 'stays_dow' next to recos ----
python resources/onds/ingest.py resources/onds/stay_data_2023-07.csv prd.db
----- STEP 2: create view to get the new columns dow, distance_group ----
CREATE VIEW my_recos AS
SELECT origin,
    destination,
    dep_date,
    ret_date,
    CASE strftime('% w', substr(dep_date, 1, 4) || '-' || substr(dep_date, 5, 2) || '-' ||
substr(dep_date, 7, 2))
    WHEN '0' THEN 'Sunday'
    WHEN '1' THEN 'Monday'
    WHEN '2' THEN 'Tuesday'
    WHEN '3' THEN 'Wednesday'
    WHEN '4' THEN 'Thursday'
    WHEN '5' THEN 'Friday'
    WHEN '6' THEN 'Saturday'
    END AS dow,
    CASE
    WHEN distance <= 1000 THEN 1000
    WHEN distance <= 2000 THEN 2000
    WHEN distance <= 3000 THEN 3000
    WHEN distance <= 4000 THEN 4000
    WHEN distance <= 5000 THEN 5000
    WHEN distance <= 6000 THEN 6000
    WHEN distance <= 7000 THEN 7000
    WHEN distance <= 8000 THEN 8000
    WHEN distance <= 9000 THEN 9000
    WHEN distance <= 10000 THEN 10000
    ELSE 20000
    END AS distance_group,
    stay
    FROM recos;
----- STEP 3: create the new column with default value 0 ----
ALTER TABLE recos
ADD COLUMN stay_dow_discount INTEGER DEFAULT 0;
----- STEP 4: use the LEFT join operation to populate the column ----
UPDATE recos
SET stay_dow_discount = c.stay_dow_discount
FROM (
SELECT my_recos.origin, my_recos.destination, my_recos.dep_date,
my_recos.ret_date, CAST((stays_dow.ratio > 0) AS INTEGER) AS
stay_dow_discount
FROM my_recos
LEFT JOIN stays_dow
ON my_recos.dow = stays_dow.dep_dow AND my_recos.distance_group =
stays_dow.gr AND my_recos.stay = stays_dow.stay
) AS c
WHERE c.origin = recos.origin AND c.destination = recos.destination AND
c.dep_date = recos.dep_date AND c.ret_date = recos.ret_date ;
----- STEP 5: check, it should return a non-zero value ----
SELECT count(stay_dow_discount) FROM recos ;
```

In general, where storage and retrieval of sparse data domain 1708 results in reduced traffic, processing and memory utilization of system 100a, the events leading to such reducing will favour increased utilization of sparse data domain 1708 for that purpose.

It should also be understood and reemphasized that while the examples herein are focused on air searches, other types of travel-actors and travel domains are contemplated.

Furthermore, the present specification is readily extensible into metaverse environments, where devices 116 include virtual reality or augmented reality hardware and operate avatars within a metaverse platform. The metaverse platform can host virtual travel agents in the form of metaverse avatars, whose speech is driven by the teachings herein. The teachings herein can also be incorporated into physical robots that operate according to the teachings herein. While the present embodiments refer to travel searches, broader e-commerce searches can also be effected in variants, such as for cellular telephone plans, vehicle purchases, home purchases, whereby user messages containing unstructured search requests are received and an LLM engine is used to flesh out the search parameters and generate structured search requests which can then be passed to e-commerce search engines, and the returned results can replace the structured search request in the final result returned to the user.

In other variants, collaboration platform 104 need not provide collaboration or other communication services between users 124, and thus collaboration platform 104 can simply be substituted with a chatbot platform (as per collaboration platform 104a of system 100a) that is used to fulfill the travel search dialogue with a given user 124 according to the teachings herein. Collaboration platform 104 can be incorporated into the LLM Engine 120.

Collaboration platform 104 can also be incorporated into travel management engine 122. Collaboration platform 104, LLM Engine 120 and travel management engine 122 can be incorporated into a single platform. Likewise, the functionalities of collaboration platform 104 and/or travel management engine 122 and/or LLM engine 120 can be incorporated into one or more travel actor engines 112, either as a full hardware integration and/or a software integration via API calls.

All variants discussed in relation to system 100 can likewise be applied to system 100a, and vice versa. Various aspects of system 100 may be combined with system 100a, and vice vera.

In another variant, machine learning feedback can be used to further improve the context shifts and/or train the LLM Engine 120 in providing its dialogue with the user 124. The conversations between been users 124 and LLM Engine 120 can be archived and fed into a machine learning studio platform. The studio allows to train a machine learning algorithm.

A machine learning feedback loop can also be used to implement the determination at block 2008.

The one or more machine-learning algorithms and/or deep learning algorithms and/or neural networks of the machine learning applications 224 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like.

Such machine learning algorithms can, for example, increase efficiency in processing subsequent conversations that are similar to prior conversations.

A person skilled in the art will now appreciate that the teachings herein can improve the technological efficiency and computational and communication resource utilization across system 100 (and its variants, such as system 100a) by making more efficient use of network and processing resources in system 100, as well as more efficient use of travel actor engines 112. At least one technical problem addressed by the present teachings includes the dynamic of repetitive network searching that consumes processing resources and bandwidth. Such repetitive searching arises in many contexts including travel searches.

The inventors have noted that, for example, if sparse data domain 1708 focuses on Paris as origin, with flights to North America, the source dataset may include around 70 Million travel offers (Cities×Dates×Number of Recommendations) searchable in several hours based on brute force with instant search, or 30 seconds, based on specific database indexing for cheapest price in calendar. However, a resulting dataset in sparse data domain 1708 of around 20000 offers can be searched in about 30 ms.

Furthermore, system 100 and its variants can provide certain advantages in the management and utilization of database systems for travel-related search queries:

Enhanced Efficiency and Relevance: By implementing filtering at the build time of the database using values from the first set of parameters, the system can retain representative data, such as stay duration, advance purchase, and most searched dates. This selective process can streamline the database by discarding non-essential data and improve the relevance of the cached information for the end-user.

Optimized Data Prioritization: The system employs a data filtration mechanism at the database construction phase, utilizing the second set of parameters to curate and retain data elements of maximal utility to the user. This involves a heuristic analysis of value-indicative metrics such as fare pricing tiers, itinerary connection durations, and frequency of bookings. By adopting this data-centric prioritization protocol, the system effectively balances the dataset, concentrating on high-utility data points that directly contribute to the refinement of the user's query resolution process. This targeted data curation methodology can produce a high-quality, condensed dataset, thereby enhancing the precision and utility of the search outcomes presented to the user.

Dynamic Data Handling and Real-Time Accuracy: The system can flexibly discard certain parameters from the second set in the sparse database, opting instead to retrieve them in real-time upon request. This feature can keep the sparse database lean while also still providing full search functionality. For example, dynamic data such as free bag allowance and flight details can be kept up-to-date and accurate, providing a balance between a lean database and the need for current data and the need for data that may not be commonly searched and would be outside the sparse data domain.

Data Enrichment for Informed Decision-Making: The specification can allow for the enrichment of the second set of parameters with external data, such as expenses at the destination and country-specific information. This enrichment enables users to make more informed decisions by considering a broader range of factors that affect their travel experience.

Customizable User-Driven Searches: Users can include specific search criteria such as total budget and $CO_2$ emissions, tailoring the search results to their individual preferences and requirements.

Figure 23:
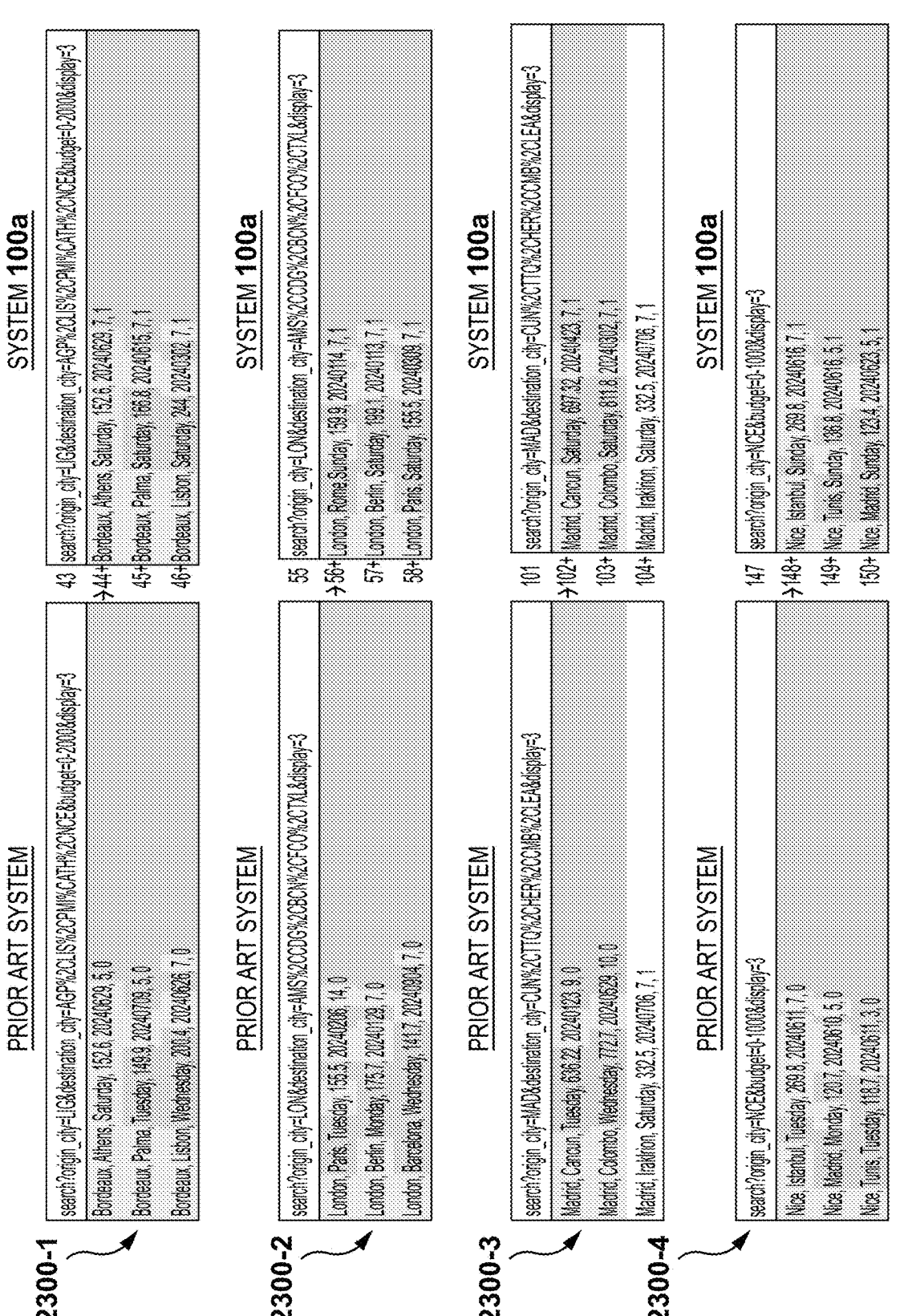
FIG. 23 shows various comparisons of search queries on prior art systems vs queries according to the present teachings and the resulting sparse data domain results that can reflect reduced drain on computing resources of search engines and related systems.

FIG. 23 shows a comparison between searches 2300 performed using prior art systems vs system 100a and the associated methods. Each example considers the following parameters.

The URL parameters consider:

origin_city: The city from which the flight is departing (e.g., Bordeaux, indicated by LIG).

budget: A range for the budget filter applied to the search (e.g., 0-2000).

display: The number of results to display or the display format (e.g., 3).

The results consider:

Destination: The city to which the flight is going (e.g., Athens, Palma, Lisbon).

Day of the Week: The day when the flight is scheduled (e.g., Saturday, Tuesday, Wednesday).

Price: The cost of the flight in some currency (e.g., 152.6, 149.9, 200.4).

Date: The date of the flight (e.g., 20240629, 20240709, 20240626).

Number of Stops: How many stops the flight will make (e.g., 5, 7).

Line Number or Result Index: an index or line number for the result (e.g., 43, 44, 45).

Example 2300-1 shows results of a query for flights from Bordeaux (base parameter) including a derived intention-element that the user is going for leisure and will therefore more likely want to travel on a Saturday, but without the user necessarily specifically identifying "Saturday". The prior art query to the master data domain resulted in departures on Tuesdays and Wednesdays, which will likely lead to additional churn on the network 108a (and other inefficiencies) as the user continues to search for options that include Saturday departures, even where the user may still not be exactly aware that Saturday is their preferred departure day. According to example 2300-1 as performed on system 100a, the sparse data domain biases Saturday departures, thereby reducing churn on network 108*a* and reducing other burdens on system 100*a*.

Example 2300-2 shows another such example, where flights from London in the prior art generated departures on Tuesday, Monday and Wednesday to Paris, Berlin and Barcelona respectively. However, the same query, which derived intention-elements that again the user was more likely to wish to travel over the weekend and within a certain budget led to a sparse domain of departures on Sunday, Saturday and Saturday to Rome, Berlin and Paris respectively, within a similar inferred budget range.

The remaining examples 2300 again show results from a sparse data domain that are more likely to reflect actual prior selections made from the master data domain.

The teachings herein can be incorporated into conversational search by integration into a travel agent chatbot as source (API) of prices for indication purposes. Engines 112*a* can include other sources of data such as travel blog websites (e.g. Tripadvisor), Environmental, Social, and Governance (ESG) websites, to further determine input parameters for sparse data domain 1708, to obtain lists of, for example, LGBT safe countries, best spots and periods for surfing, sunny destinations for low-budget winter holiday.

The present teachings contemplate generating sparse data domain 1708 that considers new types of searches, such as a group search where different devices 116*a* from different origins that search for a common destination with a shared budget. For example, method 1900 can accommodate queries with a list of different origins but with common destinations and provided a summed total price. Another type of search that can be accommodated in sparse data domain 1708 includes a multi-modal search: For example, the nearest hub air-arrival destination with separate searches for alternate ground transportation. This can include a query with radius on origin and estimated budget on a travel segment that is not covered by air.

Travel search websites can be configured to incorporate collaboration platform 104*a*, with landing pages enriched pre-populated possible destination and dates from sparse data domain 1708, thereby reducing the needs for advertisements. Search pages of travel search websites may use information from the request panel to propose alternate destinations and dates inferentially sourced from sparse data domain 1708.

Dynamic maps such as Google Maps™ can be prepopulated from sparse data domain 1708, noting end-user filtering based on budget, date, class, carriers, etc.

Social media platforms can offer pages also derived from sparse data domain 1708, proposing catalogues of trip destinations that can be associated with end-user context (personal information, liked posts, content of thread currently displayed). In other words, data from sparse data domain 1708 can be pushed to devices 116*a* based on PII associated with their accounts 128.

It is to be understood that while the foregoing discussion contemplates generating a sparse data domain from master data domain within the specific example of a travel master data domain, the present specification is agnostic and generally applicable to other master data domains. The specification for example can be applied to master data domains involving dining search functionality that integrates various Application Programming Interfaces (APIs) to cater to specific culinary requests. For instance, when a user expresses a desire to experience authentic cuisine of a particular type, the system combines data from diverse master data domain sources, including Michelin for restaurant quality, OpenTable and Tabelog for reservation capabilities, aggregating this information to provide a seamless reservation experience for highly-rated, for example, fugu-serving establishments. These desires can form the basis for deriving intentions for building a sparse data domain.

Another scenario involves searching for a dining experience in a New York City restaurant with a five-star rating only. Here, the system processes the reservation request through OpenTable and incorporates Yelp reviews to ensure the restaurant meets the user's criteria for excellence.

The specification can further extend to generalist search capabilities that necessitate synthesizing information from various sources, including but not limited to, identifying tickets for a rock concert performer in a desirable city via Ticketmaster, finding horror content by a favored director on Netflix, discovering unique gifts related to the rock concert performer on Amazon, and generating family meal suggestions within a specific budget on Carrefour. Each of these scenarios demonstrates the system's adeptness at integrating master domains into sparse data domains with large language model (LLM) outputs to fulfill unique, user-defined requests by determining a first set of parameters including at least one primary parameter. The primary parameter in the case of travel can be an origin parameter, e.g. the city of departure, but in other master data domains the primary parameter can be contextualized to that master data domain and what is included in each search. For example, in dining, the base parameter can be the date of the dining meal. In tickets, the day of the concert. In grocery shopping, the date the groceries will be delivered. The present teachings, however, additionally contemplate deriving a second set of canonical parameters from intention-elements, which can be expressed in a natural language query, to further refine the first set of canonical parameters. The second set of intention-elements, which in the case of travel include stay duration and departure days, are used to build the sparse data domain and therefore provide more efficient searching for further natural language queries that will most likely include the same intention-elements and allow for rapid access from the sparse data domain, while allowing for a fall back to the master data domain in the event of outlier searches.

This approach leverages the combination of multiple data sources and LLM and NLP capabilities, and represents an advancement in the field of information retrieval and user assistance technologies.

Figure 24:
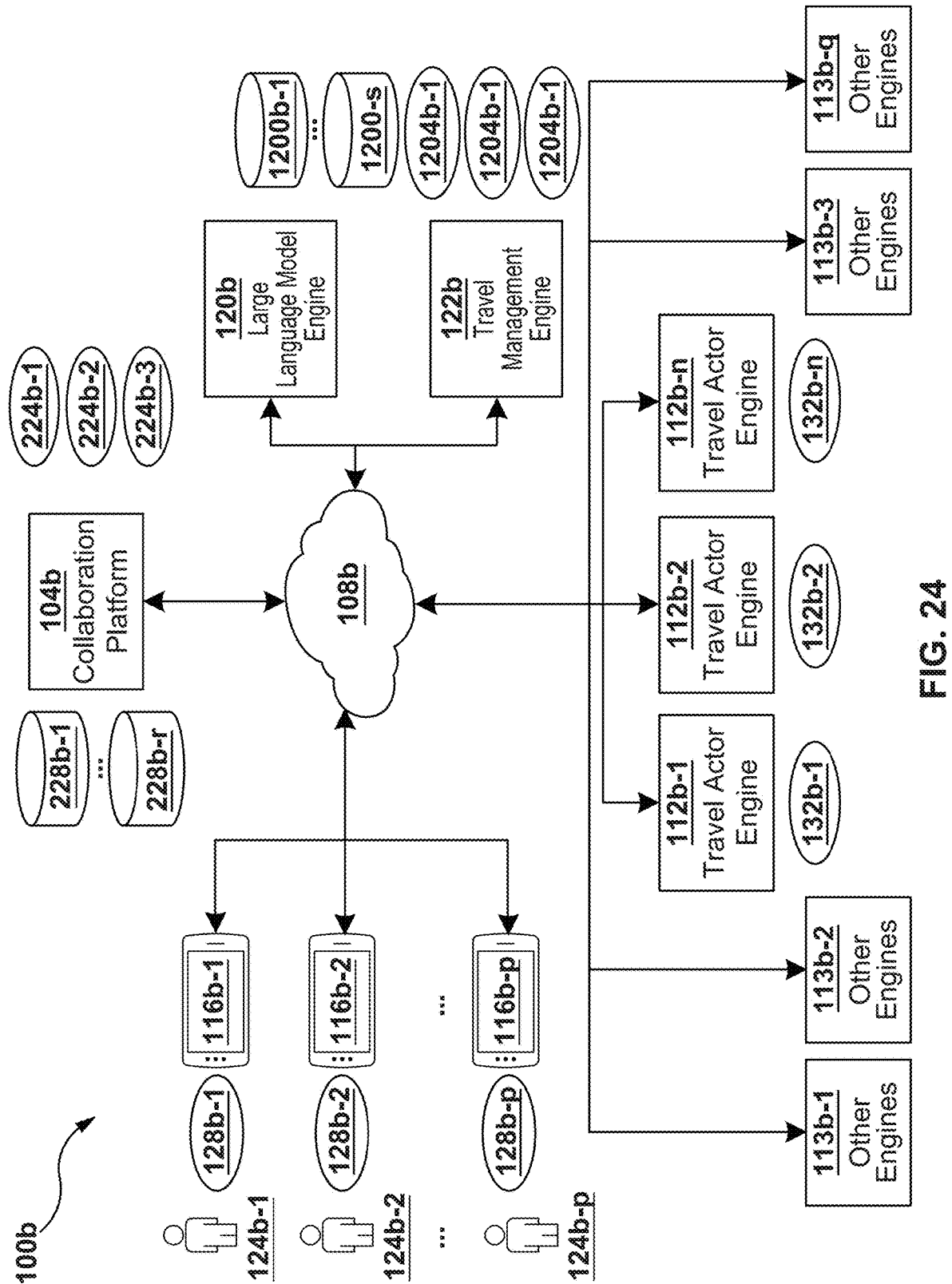
FIG. 24 is a schematic diagram of an enhanced system for dynamic data integration and query management using meta-descriptions.

Referring now to FIG. 24, a system for dynamic data integration and query management using meta-descriptions is indicated generally at 100*b*. Like elements bear like references except followed by the suffix "b". The infrastructure of system 100*b* is a variant on system 100 and/or system 100*a* and the systems may be combined and/or varied according to the teachings of the other systems. Indeed, it can be noted that system 100*b* includes a plurality of additional nodes or engines 113*b*, which can host searchable content that is different from travel actor engines 112*b*. As will be understood more from the teachings herein, engines 113*b* represent a generalized case for all embodiments discussed herein, including system 100 and system 100*a*. To be clear, while travel actor engines 112*b* represent a type of source for searching for data on network 108*b* that is focused on travel applications, engines 113*b* represent nodes of any source of searchable data on network 108*b*.

Figure 25:
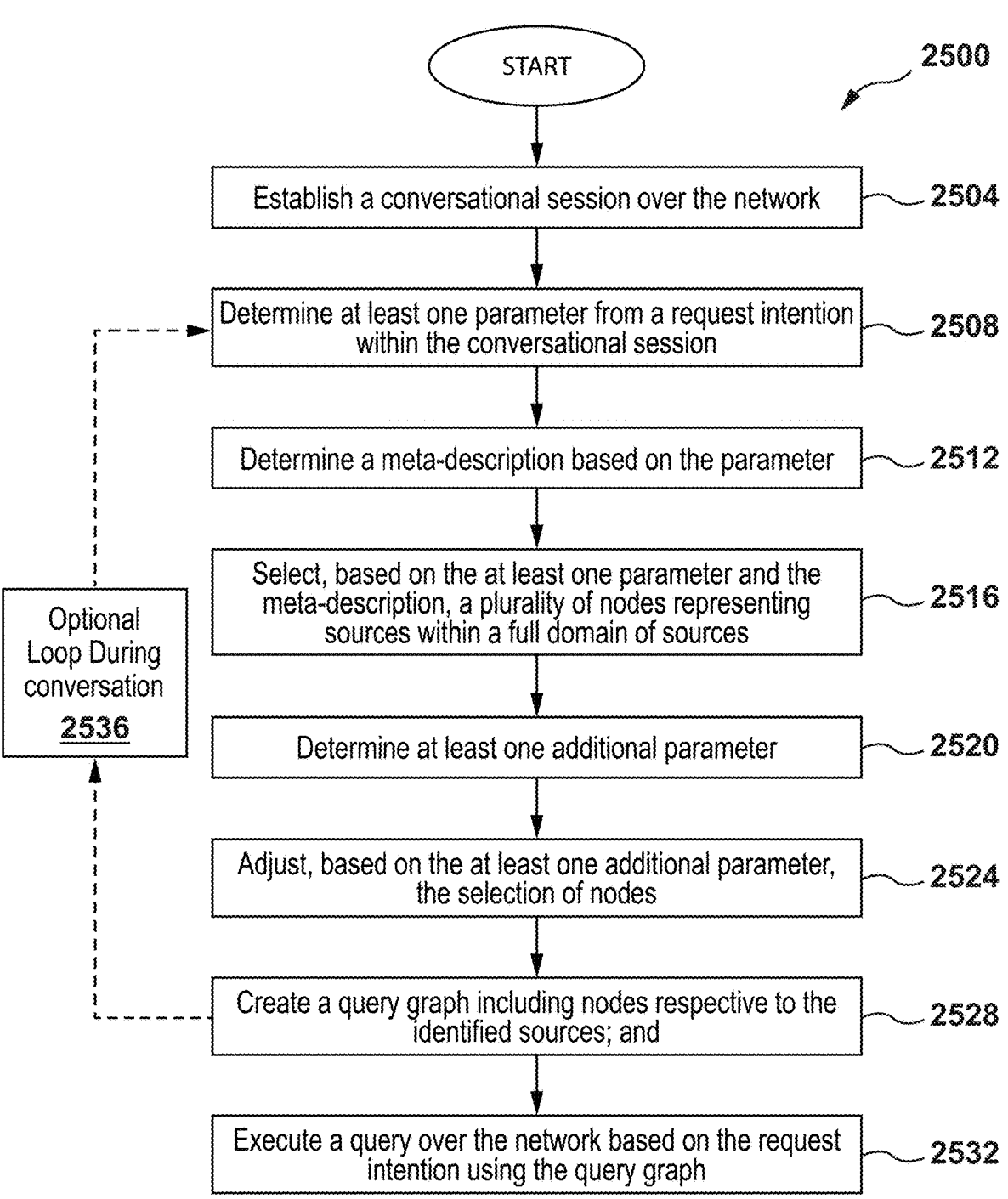
FIG. 25 presents a flowchart depicting a method for dynamic data integration and query management using meta-descriptions.

FIG. 25 shows a flowchart depicting a method for dynamic data integration and query management using meta-descriptions indicated generally at 2500. Method 2500 can be implemented on system 100*b*. Persons skilled in the art may choose to implement method 2500 on system 100*b* or variants thereon, or with certain blocks omitted, performed in parallel or in a different order than shown. Method 2500 can thus also be varied. However, for purposes of explanation, method 400 will be described in relation to its performance on system 100*b* with a specific focus on treating method 2500 as stored and executed by collaboration platform 104*b* and its interactions with the other nodes in system 100.

Figure 26:
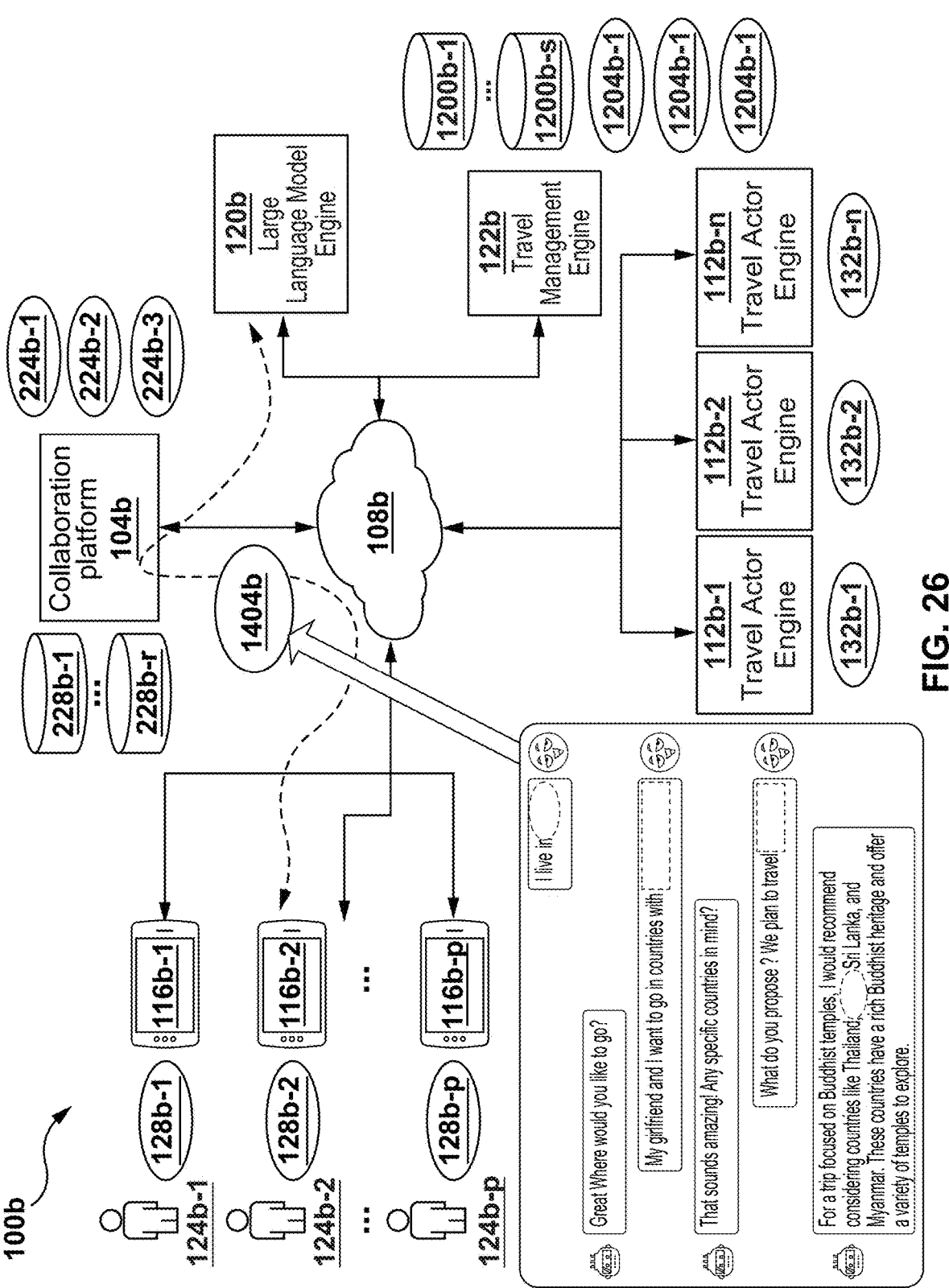
FIG. 26 illustrates a conversation example showing the interactive process between a client device and the system.
Figure 27:
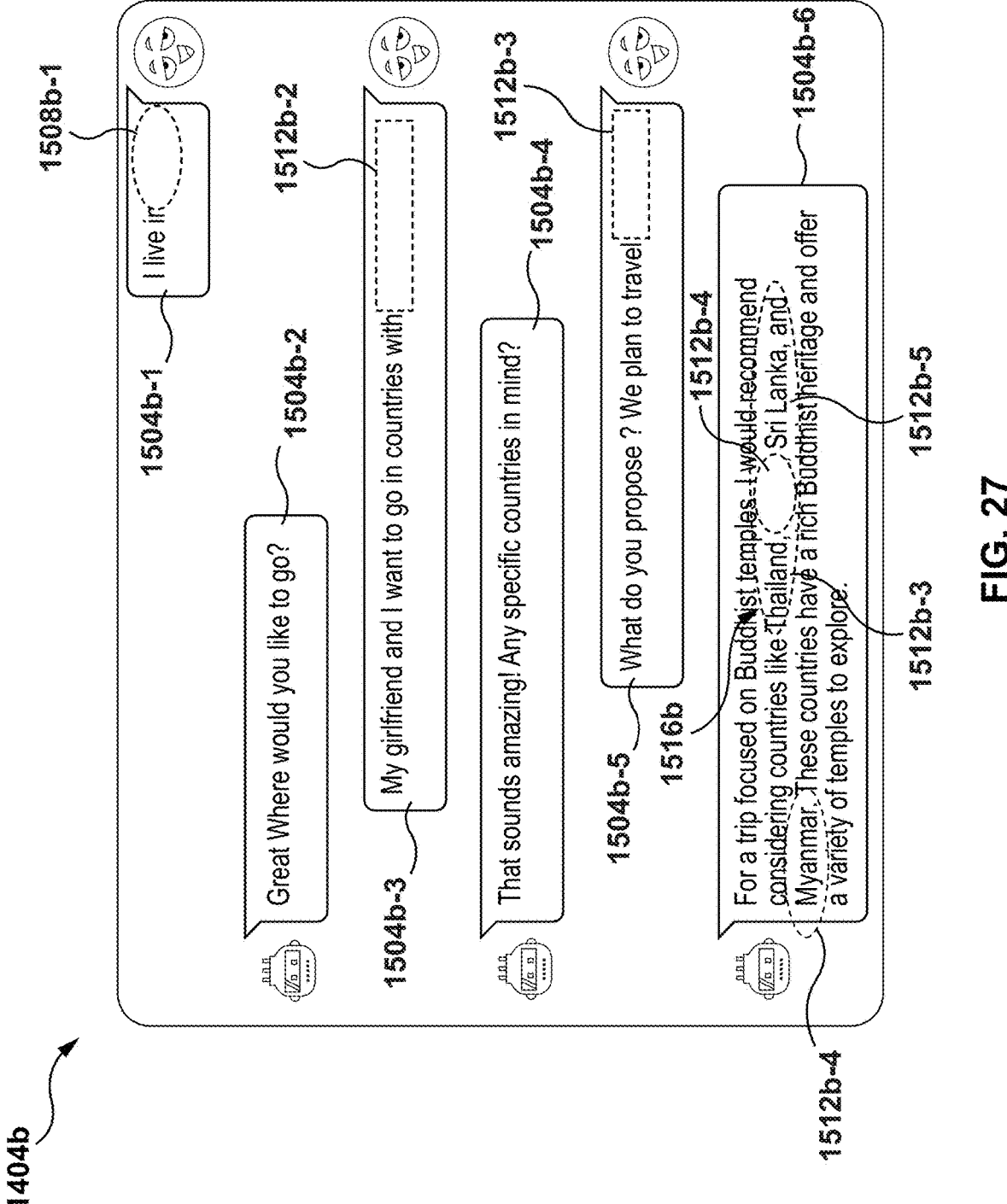
FIG. 27 provides a detailed visualization of the conversation from FIG. 26.

Block 2504 comprises establishing a conversational session over the network with a client device via the network interface. FIG. 26 and FIG. 27 show conversation 1404*b*, which will be recognized as repeating conversation 1404. However FIG. 14 and FIG. 15 are separated from FIG. 26 and FIG. 27 to illustratively and clearly distinguish between different embodiments, even though the embodiments may be combined if desired. Thus, FIG. 27 shows a natural language conversation 1404*b* including a plurality of messages 1504*b* between device 116*b*-1 and collaboration platform 104*b*, with LLM engine 120*b* providing additional support. FIG. 27 shows conversation 1404*b* in greater detail. The conversation is reproduced below for convenience.

Message 1504*b*-1: Device 116*a*-1: "I live in London."

Message 1504*b*-2: Collaboration platform 104*b*: "Great! Where would you like to go?"

Message 1504*b*-3: Device 116*b*-1: "My girlfriend and I want to go to countries with Buddhist temples."

Message 1504*b*-4: Collaboration platform 104*b*: "That sounds amazing! Any specific countries in mind?"

Message 1504*b*-5: Device 116*b*-1: "What do you propose? We plan to travel early 2024."

Message 1504*b*-6: Collaboration platform 104*b*: "For a trip focused on Buddhist temples, I would recommend considering countries like Thailand, Japan, Sri Lanka, and Myanmar. These countries have a rich Buddhist heritage and offer a variety of temples to explore."

Block 2508 comprises determining at least one parameter from a request intention within the conversational session. This block involves analyzing messages 1504 to identify key elements that will guide the subsequent processes, ensuring that the server's responses are accurately aligned with the user's needs.

As already taught in relation to method 1300, in conversation 1404*b*, various parameters can be determined. Notably:

Parameter 1: Geographic Origin: "London" as the starting location for travel.

Parameter 2: Interest Area: Desire to visit "countries with Buddhist temples."

Parameter 3: Travel Period: Preference for travel in "early 2024."

Parameter 4: Activities: Interests include visiting places for cultural and historical exploration, as implied by the reference to Buddhist temples.

Block 2512 comprises determining a meta-description based on the parameters. This involves synthesizing a concise overview of the data related to the identified parameters, which serves to contextualize and streamline the selection process in subsequent steps. If we just consider the beginning of the conversation, Parameter 1, Geographic Origin, the following example meta-description might be created:

TABLE 228b-2

| Meta-Description for Message 1504b-1 "I live in London" Parameter 1: Geographic Origin: "London" as the starting location for travel. | |
|---|---|
| Category | Description |
| Airports | Enumerates international airports in London (Heathrow, Gatwick, Stansted, Luton, City Airport) as potential departure points. |
| Transport Links | Transport Links: Describes available transportation methods to these airports (e.g., trains, buses, private transfers). |
| Travel Alerts | Includes any current alerts or advisories affecting travel from London, such as weather disruptions, strikes, or construction work impacting airport access. |
| Local Events | Notes any upcoming events that may influence travel demand or airport traffic, such as holidays or festivals. |
| Local Lodging | Includes available temporary accommodations in London or London airports (e.g. hotels, short-term renting, guest houses)". |

Block 2516 comprises selecting, based on the at least one parameter and the meta-description, a plurality of nodes representing sources within a full domain of sources. These sources may include, but are not limited to, a function call via an application programming interface (API), a database, and a large language model.

The meta-description acts as a set of criteria that enables the system to understand and categorize the information required from different sources. The meta-description guides the actual search engine server (e.g. Travel management engine 122*b*) in identifying which nodes (e.g. Travel actor engines 112) are relevant for the search query, and what kind of information to retrieve from them. Ultimately the meta-description can be translated into searchable nodes. The search engine server builds an efficient query execution process thanks to the meta-description:

Identification of Data Sources: The meta-description can outline the types of data needed to satisfy the user's query. Based on the criteria specified in the meta-description, the search engine server determines which APIs, databases, or language models have the potential to provide the required information.

Matching Criteria with Capabilities: The search engine server compares the criteria from the meta-description to the capabilities of various data sources. This involves looking at the data fields that each API or database can supply and ensuring they align with the data fields outlined in the meta-description.

Node Selection: Once potential data sources are identified, the search engine server selects nodes that match the meta-description most closely. For instance, if the meta-description calls for detailed cultural information about Buddhist temples, the search engine server may select nodes like cultural heritage databases and local tourism APIs that provide such data. Similarly, if the meta-description refers to a conversation aiming at giving inspiration, the server may select nodes favoring exploration and diversity of content (search APIs) over nodes favoring sales and depth of content (booking APIs).

Configuration of Query Parameters: The search engine server then configures the query parameters for each selected node based on the meta-description. It formats the search queries in a way that the APIs and databases can understand and respond to, ensuring that the information retrieved will be structured according to the meta-description's criteria.

Node combination: Once the server has selected nodes or data sources, the server defines in which sequence and/or conditions to execute the queries on the selected nodes. For instance, queries on data sources providing information on Buddhist temples can be executed in parallel and the results can be grouped together. Moreover, the server may describe how the search results of a data source may be used, in conjunction with other elements in the meta-description, to form the input of a subsequent query on another data source. For example, a subsequent call to the API of a local tourism board may be necessary to retrieve the dates of the occurrence of a yearly Buddhist festival.

Query Execution: With the query parameters set, the search engine server executes the queries on the selected nodes. It sends out requests over the network to the chosen APIs and databases, which return data matching the meta-description's specifications.

Data Aggregation and Refinement: The search engine server collects the responses from the various nodes, aggregates the data, and refines it based on the meta-description. This ensures that only relevant and useful information is included in the final response to the user's query.

From the example meta description, the search engine server can identify several nodes to query:

1) Flight Information Systems: These nodes can search for flight schedules, ticket prices, and route availability from London airports.

2) Local Transit Authorities: Nodes connected to local transportation services can provide information on timetables, disruptions, and best routes to airports.

3) Travel Advisory Services: Nodes with updated travel alerts and advisories can help ensure the user has the latest information for planning their departure.

4) Public Health Portals: Nodes that provide real-time updates on health and safety protocols for travelers departing from London.

Continuing with the example in Table 228b-2, Table 228b-3 shows a specific list of nodes that may be searched on network 108b.

TABLE 228b-3

| Example Nodes from Parameter 1 of Table 228b-2 | | |
| --- | --- | --- |
| Node (One or more of Engine 112b or Engine 113b) | Description | URL/API Endpoint (Identifier on network 108b of relevant engine 112b or engine 113b) |
| Wikipedia's List of Airports in London | Provides a list of airports around London. | https://en.wikipedia.org/wiki/Airports_of_London |
| Transport for London (TFL) API | Offers real-time data on public transportation schedules, disruptions, and routes to airports. | https://api.tfl.gov.uk/ |
| National Rail Enquiries API | Contains information on train services to and from London's airports. | http://lite.realtime.nationalrail.co.uk/OpenLDBWS/ |
| OpenWeather API | Gives current weather conditions and forecasts for London. | https://api.openweathermap.org/data/2.5/weather |
| Skyscanner API | Provides flight search services, including times, airlines, and prices from London airports. | http://partners.api.skyscanner.net/apiservices/ |
| Eventbrite API | Lists upcoming events in London that could affect travel plans. | https://www.eventbriteapi.com/v3/ |
| UK Foreign Travel Advice | Official government travel advisories for UK residents. | https://www.gov.uk/foreign-travel-advice |
| Heathrow's Official Website | Direct information about Heathrow Airport services, facilities, and disruptions. | https://www.heathrow.com/ |

At this point it can be noted possible for a query graph to be generated and made available based on the contents of Table 228b-3. So, for example, assume conversation 1404*b* has only had the first "Message 1504*b*-1: Device 116*a*-1: "I live in London.", then at that moment a query graph can be built based on Table 228b-3 and be activated. Advantageously, when the ultimate search of network 108*b* is commenced, the nodes in Table 228b-3 will be pre-curated and available for searching, thereby streamlining the interactions between devices 116*b* and engines 112*b* and engines 113*b* and more efficiently utilizing the resources of system 100*b*. However, it is contemplated that such a query graph, or the elements that will go into such a graph, will be continually updated throughout conversation 1404*b* based on additional parameters that are derived from the conversation 1404*b*.

Thus, next, block 2520 comprises determining at least one additional parameter. This step involves further refining the data and parameters based on ongoing analysis and interaction within the conversation, enhancing the query graph and improving efficiencies, similar to block 2508. Block 2524 comprises adjusting, based on the at least one additional parameter, the selection of nodes from block 2516. Adjustments are made to refine the choice of data sources, ensuring that the most relevant and effective sources are utilized in constructing the response.

To give an example of block 2520 and block 2524, recall that message 1504*b*-3 states "My girlfriend and I want to go to countries with Buddhist Temples". Accordingly, an additional parameter that can be extracted here is "Buddhist Temples". If we now consider next part of the conversation, Parameter 2: Interest Area: Desire to visit "countries with Buddhist temples.", the following example meta-description and nodes might be created:

TABLE 228b-3

Meta-Description and Example Nodes for Message 1504b-3
"My girlfriend and I want to go to countries with Buddhis Temples"
Parameter 2: Interest Area: Desire to visit "countries with Buddhist temples."

| Node (One or more of Engine 112b or Engine 113b) | Description | URL/API Endpoint (Identifier on network 108b of relevant engine 112b or engine 113b) |
| --- | --- | --- |
| UNESCO World Heritage Sites API/ Database | Provides a list and detailed information on World Heritage sites, many of which include Buddhist temples. | https://whc.unesco.org/en/list/ |
| Cultural or Religious Tourism Portals | Offers insights into cultural experiences, including visiting temples, cultural tours, and religious festivities. | https://www.culturaltourism.org/ |
| Travel Blogs or Content Platforms | Sources articles and blogs that describe personal experiences and recommendations for visiting Buddhist temples. | https://www.travelblog.org/ |
| Local Tourism Boards' Websites/APIs | Official tourism websites for the countries of interest that provide detailed information on temples as tourist attractions. | https://www.tourismthailand.org/ |
| Travel Guide APIs (e.g., Lonely Planet, TripAdvisor) | Provides access to travel guides and user reviews of temples and related cultural experiences. | https://www.lonelyplanet.com/ |

Block 2528 comprises creating a query graph including nodes respective to the identified sources. This graph visually and functionally represents the relationships and pathways between different data sources, facilitating an organized approach to data querying.

An example generation of query graph according to Parameter 1 and Parameter 2 is reproduced below:

TABLE 228b-4

| | | | | URL/API Endpoint, if any (Identifier on network 108b of relevant |
| Level | Node Description | Connected To | Output Description | engine 112b or engine 113b) |
| --- | --- | --- | --- | --- |
| | | Example Original Query Graph | | |
| 1 | Start Node: User Query | Geographic Origin Node, Weather Node, Cultural and Event Considerations Node | Receives user's travel intent: "I live in London and want to visit countries with Buddhist temples." | N/A |
| 2 | Geographic Origin Node: London | Flight Node | Details about departure options from London | N/A |
| 3 | Wikipedia's List of Airports in London | Flight Node | List of London airports | https://en.wikipedia.org/wiki/Airports_of_London |
| 3 | Transport for London (TFL) API | Flight Node | Transport options to airports | https://api.tfl.gov.uk/ |
| 3 | National Rail Enquiries API | Flight Node | Train schedules to airports | http://lite.realtime.nationalrail.co.uk/Open LDBWS/ |
| 3 | Heathrow's Official Website | Flight Node | Airport services and disruption info | https://www.heathrow.com/ |

TABLE 228b-4-continued

Example Original Query Graph

| Level | Node Description | Connected To | Output Description | URL/API Endpoint, if any (Identifier on network 108b of relevant engine 112b or engine 113b) |
|---|---|---|---|---|
| 2 | Weather Node: London Weather | Flight Node | London weather forecast | https://api.openweathermap.org/data/2.5/weather |
| 2 | Cultural and Event Considerations Node: London | Flight Node | Local events and travel advisories affecting travel | N/A |
| 3 | Eventbrite API | Flight Node | Local events affecting travel | https://www.eventbriteapi.com/v3/ |
| 3 | UK Foreign Travel Advice | Flight Node | Official government travel advisories | https://www.gov.uk/foreign-travel-advice |
| 2 | Flight Node: Flight Options | Destination Node | Finds suitable flights based on available data | N/A |
| 3 | Skyscanner API | Destination Node | Flight times, airlines, prices from London airports | http://partners.api.skyscanner.net/apiservices/ |
| 2 | Destination Node: Countries with Buddhist Temples | N/A | Aggregates cultural, temple, and travel guide information for destination planning | N/A |
| 3 | UNESCO World Heritage Sites API/Database | N/A | Info on World Heritage sites with temples | https://whc.unesco.org/en/list/ |
| 3 | Cultural or Religious Tourism Portals | N/A | Cultural insights, temple visits | https://www.culturaltourism.org/ |
| 3 | Local Tourism Boards' Websites/APIs | N/A | Detailed info on local temples | https://www.tourismthailand.org/ |
| 3 | Travel Blogs or Content Platforms | N/A | Personal experiences, recommendations for visiting Buddhist temples | https://www.travelblog.org/ |
| 3 | Travel Guide APIs (e.g., Lonely Planet, TripAdvisor) | N/A | Reviews of temples, travel guides | https://www.lonelyplanet.com/ |

Block 2532 comprises executing a query over the network based on the request intention using the query graph. This final step involves actively querying the selected sources through the network, utilizing the structured query graph to efficiently retrieve and compile data in response to the initial user request.

It should be noted that method 2500 can execute dynamically, in parallel with the ongoing conversation 1404*b*. Accordingly, the query graph at block 2528 can dynamically change—shrink or grow—throughout the conversation, such that block 2532 itself is typically only be performed when some condition or criteria is satisfied that indicates a sufficient amount of intention has been gathered from the conversation 1404*b*. By dynamically constructing and pruning the query graph, and waiting until criteria are satisfied before executing it, the overall resource efficiency of system 100*b* is increased, as only surgical searches are being performed that have the most likelihood of generating desired response, and those searches may only be performed at a moment when sufficient information is known to produce a meaningful search.

Note that some parameters 1508*b* adjust the query graph itself, while other parameters 1508*b* simply provide criteria to be deployed within an actual query. For example, as conversation 1404*b* progresses, we can see from message 1504*b*-5 the addition of the parameter "early 2024" as an indication of travel dates. Thus, block 2532 can be deferred until a sufficient amount of information is received in conversation 1404*b*, such as the parameter "early 2024" being received within conversation 1404*b*. "Early 2024" may be resolved into canonical parameters, such as previously described in relation to method 1300, and then deployed over the Skyscanner node of the query graph to look at flight dates. Thus parameter 1504*b*-5 "early 2024" does not adjust the query graph per-se, but rather informs what search parameters are performed over that graph.

At the same time, other messages within conversation 1404*b* can include the use of callbacks to further refine the query graph. In general terms, a callback is a function that is passed as an argument to another function and is executed after its parent function has completed.

Summary of conversation 1404*b*: "I live in London and want to visit countries with Buddhist temples in early 2024."

After some initial data gathering, the system presents general information about popular destinations for Buddhist temples, such as Thailand, Japan, Sri Lanka and Myanmar (Message 1504*b*-6).

At this point, conversation 1404*b* can include a callback Interaction:

Collaboration platform 104*b*: "Would you like to include visits to countries that have less tourist traffic but equally rich cultural heritage in Buddhist temples, such as Bhutan and Laos?"

Device 116*b*-1: "Yes, I'm interested in avoiding crowded tourist destinations and would prefer more serene and less known locations."

According to method 2500, this call back results in generation of an additional parameter at block 2520 that can impact the query graph creation at block 2528:

Before the callback, system 100*b* primarily utilizes widely recognized cultural and tourism APIs focused on popular destinations such as Japan and Thailand. However, after the callback, when the user expresses a preference for less crowded and more serene locations, the system dynamically adjusts the query graph. Specifically, it adds new nodes such as the 'Bhutan Tourism Board API' and the 'Laos Cultural Heritage API' to cater to the user's updated preferences. Concurrently, the system evaluates existing nodes to determine their relevance based on the new criteria; nodes primarily providing information on busier tourist destinations may be deprioritized or removed. This ensures that the query graph remains optimized and relevant, focusing on providing tailored information about serene, less-known locations with Buddhist temples.

As a result of the callback, the original query graph can be changed to accommodate addition of specialized nodes, such as a) Bhutan Tourism Board API: A new node to access specific travel and temple information in Bhutan, which isn't covered as extensively in general travel APIs and b) Laos Cultural Heritage API: Another new node to fetch detailed cultural and temple information specific to Laos. Furthermore, existing nodes may be modified, such as by adjusting queries to the UNESCO World Heritage Sites API to focus specifically on lesser-known sites in Bhutan and Laos, rather than broader queries. There is also the potential for removal of nodes. For example, if the system 1000*b* initially included nodes like major travel booking platforms focusing primarily on popular destinations, these might be scaled back or modified to ensure the preferences for Bhutan and Laos are prioritized.

In the updated query graph structure, the start node continues to receive the travel intents, while new nodes for Bhutan and Laos are added and integrated into the graph to pull in specific data relevant to the new criteria. Other nodes are modified, as existing travel and cultural nodes adjust their queries to focus on the specifics of Bhutan and Laos. Some nodes may be removed or those existing nodes might reduce their query frequency or be removed if they are less relevant to the updated preferences.

Table 228b-5 is an updated query graph that illustrates how a callback can lead to structural changes in a query graph by introducing new nodes and adjusting the focus of existing ones to better align with the user's updated preferences. Such modifications ensure that the search engine dynamically adapts to provide the most relevant and personalized travel planning experience.

TABLE 228b-5

| | | | Example Updated Query Graph | |
| Level | Node Description | Connected To | Output Description | URL/API Endpoint |
| --- | --- | --- | --- | --- |
| 1 | Start Node: User Query | Geographic Origin Node, Weather Node, Cultural and Event Considerations Node, Destination Node | Receives travel intent: "I live in London and want to visit countries with Buddhist temples in early 2024, focusing on serene and less known locations." | N/A |
| 2 | Geographic Origin Node: London | Flight Node | Details about departure options from London | N/A |
| 3 | Wikipedia's List of Airports in London | Flight Node | List of London airports | https://en.wikipedia.org/wiki/Airports_of_London |
| 3 | Transport for London (TFL) API | Flight Node | Transport options to airports | https://api.tfl.gov.uk/ |

TABLE 228b-5-continued

Example Updated Query Graph

| Level | Node Description | Connected To | Output Description | URL/API Endpoint |
|---|---|---|---|---|
| 3 | National Rail Enquiries API | Flight Node | Train schedules to airports | http://lite.realtime.nationalrail.co.uk/OpenLDBWS/ |
| 3 | Heathrow's Official Website | Flight Node | Airport services and disruption info | https://www.heathrow.com/ |
| 2 | Weather Node: London Weather | Flight Node | London weather forecast | https://api.openweathermap.org/data/2.5/weather |
| 2 | Cultural and Event Considerations Node: London | Flight Node | Local events and travel advisories affecting travel | N/A |
| 3 | Eventbrite API | Flight Node | Local events affecting travel | https://www.eventbriteapi.com/v3/ |
| 3 | UK Foreign Travel Advice | Flight Node | Official government travel advisories | https://www.gov.uk/foreign-travel-advice |
| 2 | Flight Node: Flight Options | Destination Node | Finds suitable flights based on available data | N/A |
| 3 | Skyscanner API | Destination Node | Flight times, airlines, prices from London airports | http://partners.api.skyscanner.net/apiservices/ |
| 2 | Destination Node: Countries with Buddhist Temples | N/A | Aggregates cultural, temple, and travel guide information for destination planning | N/A |
| 3 | Bhutan Tourism Board API | N/A | Specific travel and temple information in Bhutan | https://www.visitbhutan.gov.bt/api |
| 3 | Laos Cultural Heritage API | N/A | Detailed cultural and temple information specific to Laos | https://www.explorelaos.gov.la/api |
| 3 | UNESCO World Heritage Sites API/Database | N/A | Info on World Heritage sites with temples, focusing on serene locations | https://whc.unesco.org/en/list/ |
| 3 | Cultural or Religious Tourism Portals | N/A | Cultural insights, temple visits, emphasizing less known destinations | https://www.culturaltourism.org/ |
| 3 | Local Tourism Boards' Websites/APIs | N/A | Detailed info on local temples, focusing on serene and less touristy areas | https://www.tourismthailand.org/ |
| 3 | Travel Blogs or Content Platforms | N/A | Personal experiences, recommendations for visiting Buddhist temples in serene locations | https://www.travelblog.org/ |
| 3 | Travel Guide APIs (e.g., Lonely Planet, TripAdvisor) | N/A | Reviews of temples, travel guides focusing on serene, culturally rich locations | https://www.lonelyplanet.com/ |

A person of skill in the art will now recognize how ongoing performance of method 2500 in conjunction with conversations such as conversation 1404*b* can result in constant dynamic adjustment to query graphs that improve and focus searches, leading to reduced search times with more relevant data. Thus, keeping the query graph updated as the conversation evolves helps to efficiently utilize the limited processing, memory, and network resources of system 100*b*.

In a variation, the present teachings provide a cross-engine API that enhances system 100*b* by enabling various independent engines, such as one or more of engines 112*b* and engines 113*b*, to communicate and operate collectively. In this context, engines 112*b* and engines 113*b* represent different nodes in the query graph, yet engines 112*b* and/or engines 113*b* that respond to the same cross-engine API can be managed more efficiently in a more compact query graph generated at block 2528.

By centralizing access to the disparate services offered by the engines 112*b* or engines 113*b*, the cross-engine API mitigates the complexity typically of having a plurality of different API's for different engines 112*b* or engine 113*b*. The underlying complexity of each engine 112*b* and/or each engine 113*b* can be abstracted by the API cross-engine, providing a simplified interface for collaboration platform 104*b* or travel management engine 122*b* to interact with, without concern for the intricacies of the engines' internal processes.

Moreover, the cross-platform API's design can promote scalability within system 100*b*, allowing for the integration of additional engines 112*b* or engines 113*b* into the network without necessitating significant alterations to the existing infrastructure. This scalability ensures that as system 100*b* grows, it can retain its integrity and continue to function efficiently.

The flexibility of the cross-platform API is evident in its ability to support a variety of interaction models, including both synchronous and asynchronous communications, as well as batch processing and real-time data exchanges. This versatility ensures that the API can accommodate the varied operational requirements of the connected engines.

In the context of travel, where system 100*b* may be interfacing with travel management engine 122*b* adhering to industry standards such as those set by the NDC, the cross-platform API's adherence to such standards improves the efficiency of the query graph generated at block 2528. Appendix "A" shows an example of a cross-platform API that can be used in system 100*b*, where travel actor engines 112*b* are configured to respond to that cross-platform API. Appendix "A" defines a Swagger configuration for the 'Flight Offers Search' API, a web API specifically crafted to search for flight offers based on an extensive array of criteria. The 'Flight Offers Search' API operates under the Swagger 2.0 specification, aimed at streamlining the retrieval and processing of flight data associated with travel actor engines 112*b* that manage flight bookings. The API, identified with a version number 2.9.1, operates from a base path '/v2' and uses HTTPS protocols, thereby ensuring secure data transactions across network interfaces.

Operational facets of the API are encapsulated within two primary activities accessible via the/shopping/flight-offers path: a POST operation that enables the submission of comprehensive search criteria by clients, and a GET operation designed to fetch flight offers based on parameters such as origin, destination, travel dates, and passenger details. These operations facilitate the dynamic generation and refinement of query graphs for efficient data handling and response within system 100*b*.

Furthermore, the cross-engine API in Appendix "A" is structured to respond adeptly to various scenarios, delineating expected outputs for successful queries and error conditions alike, with predefined response structures enhancing reliability and predictability of data interactions. The employment of an 'X-HTTP-Method-Override' header parameter broadens the API's accessibility, accommodating limitations imposed by certain browsers or servers on HTTP method usage.

To support a deeper integration and utilization, the cross-engine API documentation of Appendix A articulates a set of data structures that detail the composition and capabilities of flight offers, including information on flight segments, pricing strategies, and potential error conditions. These definitions serve not only to clarify the attributes and functionalities of the flights but also to ensure consistency and accuracy in the API's operation across diverse computing environments.

The cross-engine API documentation of Appendix A documentation also provides understanding the mechanisms for generating access tokens, as delineated in the referenced authorization guide. It also advises on the operational nuances of the API's test environment, which, while based on a subset of the production environment, recommends testing with major city airports to promote data availability and relevance.

It is to be reemphasized that while a specific example in terms of travel, method 2500 is agnostic to a specific application and non-travel use cases are contemplated. The principles herein apply broadly across different domains, which demonstrates the versatility of the technology. For example, the present system 100*b* is applicable to dining recommendations and reservations, where users can ask for restaurant recommendations based on specific cuisines, dietary restrictions, or desired dining experiences. System 100*b* can integrate data from multiple sources like restaurant review APIs, reservation platforms, and dietary databases. (Furthermore, it is to be understood that even though the cross-engine API of Appendix A is related to travel, cross-engine APIs are contemplated for other domains.)

If we assume this example query: "Find a vegan Japanese restaurant in downtown NYC with availability for tonight.", dynamic node integration according to method 2500 may include: 1) Michelin Guide API: For high-quality restaurant listings and ratings; 2) OpenTable API: For checking table availability and making reservations; 3) Yelp API: For user reviews and additional restaurant details. In terms of a callback implementation, system 100*b* might ask if the user prefers a quiet ambiance or a lively one, adjusting the search parameters based on the response.

As another example, the present system 100*b* is applicable to personalized shopping assistance, where users can seek help in finding products based on specific needs, comparing prices across different platforms, and locating the best deals or promotions. If we assume this example query: "I need a waterproof smartwatch suitable for swimming.", dynamic node integration according to method 2500 may include: 1) Amazon Product API: To fetch product details and prices; 2) Best Buy API: For electronics comparisons and availability; 3) Consumer Reports API: For product quality and recommendations. In terms of a callback implementation, system 100*b* might ask if the user has a preference for specific brands or features like heart rate monitoring, adjusting the search parameters based on the response.

As another example, the present system 100*b* is applicable to event planning and booking, where users looking to organize or attend events can find venues, catering services, and entertainment options that fit their criteria. If we assume this example query: "Plan a birthday party for 30 people with a live band in San Francisco next month.", dynamic node integration according to method 2500 may include: 1) Eventbrite API: To find suitable venues and dates; 2) Catering.com API: For catering services that match the party size and dietary preferences; 3) Bandsintown API: To find local bands available for the date. In terms of a callback implementation, system 100*b* might ask whether the party is for adults or children to ensure appropriate entertainment options are considered, adjusting the search parameters based on the response.

As another example, the present system 100*b* is applicable to job search and application processes, where it helps users find job openings that match their skills, experiences, and career goals, and assists with application processes. If we assume this example query: "Find software engineering job openings in remote-first companies that require Python expertise.", dynamic node integration according to method 2500 may include: 1) LinkedIn Jobs API: To search for job listings with specific keywords and filters; 2) Glassdoor API: For company reviews and salary information; 3) Indeed API: To broaden the search across multiple platforms. In terms of a callback implementation, system 100*b* might ask if the user prefers startup environments or established companies, refining the search parameters based on the response.

Other use case domains are also contemplated. Furthermore, it is also contemplated that the various use case domains may be combined. For example, a travel domain query may also include a job search query. "Which cities that have one hour flights from London have job postings for engineers?".

It is to be understood that LLM engine 120*b* can assist with gap filling and error handling within conversations such as conversation 1404*b*. LLM engine 120*b* can fill in gaps in data, manage unstructured or broad parameters, and handle errors or inconsistencies during the query process. LLM engine 120*b* may not just fetch data but actively interpret and reformat parameters and other data to fit the needs of the query.

It is to be understood that while the examples discussed mention predefined APIs and nodes (such as engines 112*b* and/or engines 113*b*), it is contemplated that system 100*b* can dynamically discover and integrate new data sources as they may become available via network 108*b*.

FIG. 28 is an illustrative representation showcasing the application of a formal API description 2800 in the generation of a chain of thought by a Large Language Model (LLM), specifically using GPT. API description 2800 exemplifies how GPT-4 processes structured API data to logically construct a step-by-step solution that aligns with the methodological innovations of system 100*b*. FIG. 28 illustrates the LLM's capacity to engage in a contextually adaptive dialogue, employing its reasoning capabilities to sequence API calls and data processing tasks in response to a user's natural language query. The API description of FIG. 28 serves as a visualization of the advanced cognitive interactions between GPT-4 and various data sources within system 100*b*. FIG. 28 highlights the seamless integration of conversational AI with formal API endpoints in the generation of a chain of thought by a Large Language Model (LLM), specifically using GPT-4. API description 2800 can thus be used to configure LLM engine 120*b* as part of method 2500.

Referring again to FIG. 25, block 2536 reemphasizes an important aspect whereby the query graph created at block 2528 can be updated dynamically throughout a conversation such as conversation 1404*b*, as method 2500 loops from block 2528 back to block 2508 until the conversation has reached a point that a search at block 2532 can be meaningfully performed. That point may be reached based on different criteria, such as an express conversational request from the user to begin the searching, or by inference on the part of collaboration platform 104*b* that the conversation has reached a point that effecting a search at block 2532 is appropriate to the user's intent.

Also referring again to FIG. 25, the adjusting at block 2524 can be based on different criteria. For example, the meta-description from block 2512 can be used by LLM engine 120*b* to select the plurality of nodes at block 2516. Accordingly, the adjusting at block 2524 can be additionally based on a selected number of tokens used by LLM engine 120*b* in the creation of the query graph at block 2528. The selected number of tokens can be chosen to be less than the selected number of tokens from before the adjusting at block 2524, such that block 2532 will produce the same result using either the original number of nodes from block 2516 or the adjusted number of nodes from block 2524.

The selected number of tokens can be determined by a token limitation algorithm that configures LLM engine 120*b* to operate within a predefined token range, where that token range has a high confidence interval of accurate processing by LLM engine 120*b*. The token limitation algorithm can be configured to reduce the operational token count to enhance the precision of data retrieval at block 2532, without compromising the integrity of the output produced by the query at block 2532.

The reduction in the selected number of tokens can enable the processing of additional nodes within the same call to LLM engine 120*b*, by allocating the saved tokens to represent additional nodes or sources, including more application programming interfaces, within the query graph, without necessitating multiple calls, and thereby maintaining the efficiency and coherence of the data retrieval process.

Various token limitation algorithms are contemplated. For example, a token limitation algorithm can initiate by establishing a maximum token threshold (TokenMax), which defines the upper limit of tokens available for any single query execution. This threshold can be determined based on empirical analysis of the given LLM engine 120*b* aimed at balancing query complexity with system performance. Prior to query execution at block 2532, the algorithm estimates the number of tokens required based on the query's parameters and associated meta-description. Should this estimation exceed the TokenMax, the algorithm adjusts the query parameters or simplifies the query structure to reduce token consumption, as per block 2520 and/or block 2524. This may involve different operations, such as those already described and/or shortening text elements, condensing query syntax, or prioritizing critical data sources, thereby ensuring the token usage remains within the predefined limits. With the adjusted query parameters, the query can be executed at block 2532 while continuously monitoring the token consumption. If the actual token usage remains under the TokenMax, the algorithm can dynamically adjusts the threshold for subsequent queries based on system feedback, refining its predictive accuracy and operational efficiency.

If, after executing the primary components of the query at block 2532, tokens remain within the TokenMax, the extra can be allocated to additional nodes or data sources including engines 112*b* and/or engines 112*c*. This extension enables the exploration of supplementary data that was not initially prioritized, enhancing the query's depth and breadth without necessitating additional computational resources or separate LLM calls.

The outcomes of the queries at block 2432 can be used to train a predictive model within the LLM, aiming to optimize future token allocations. This feedback loop supports continuous improvement in token usage estimation, aligning query complexity with available computational resources efficiently.

The token limitation algorithm can be integrated into the operational framework of system 100*b*, where it directly influences the function and efficiency of the LLM engine 120*b*.

Furthermore, in another variant, it is contemplated that machine learning feedback during iterations through block 2536 can be used to further improve the query graph creation and updates at block 2528. Specifically, conversations 1404*b* and their ultimate query graphs used at block 2532 can be used to inform future conversations to establish initial nodes at block 2524 and to update those nodes until a desired query graph is derived. The conversations between users 124 and LLM Engine 120 can thus be archived and fed into a machine learning studio platform which can be used to train a machine learning algorithm.

Figure 29:
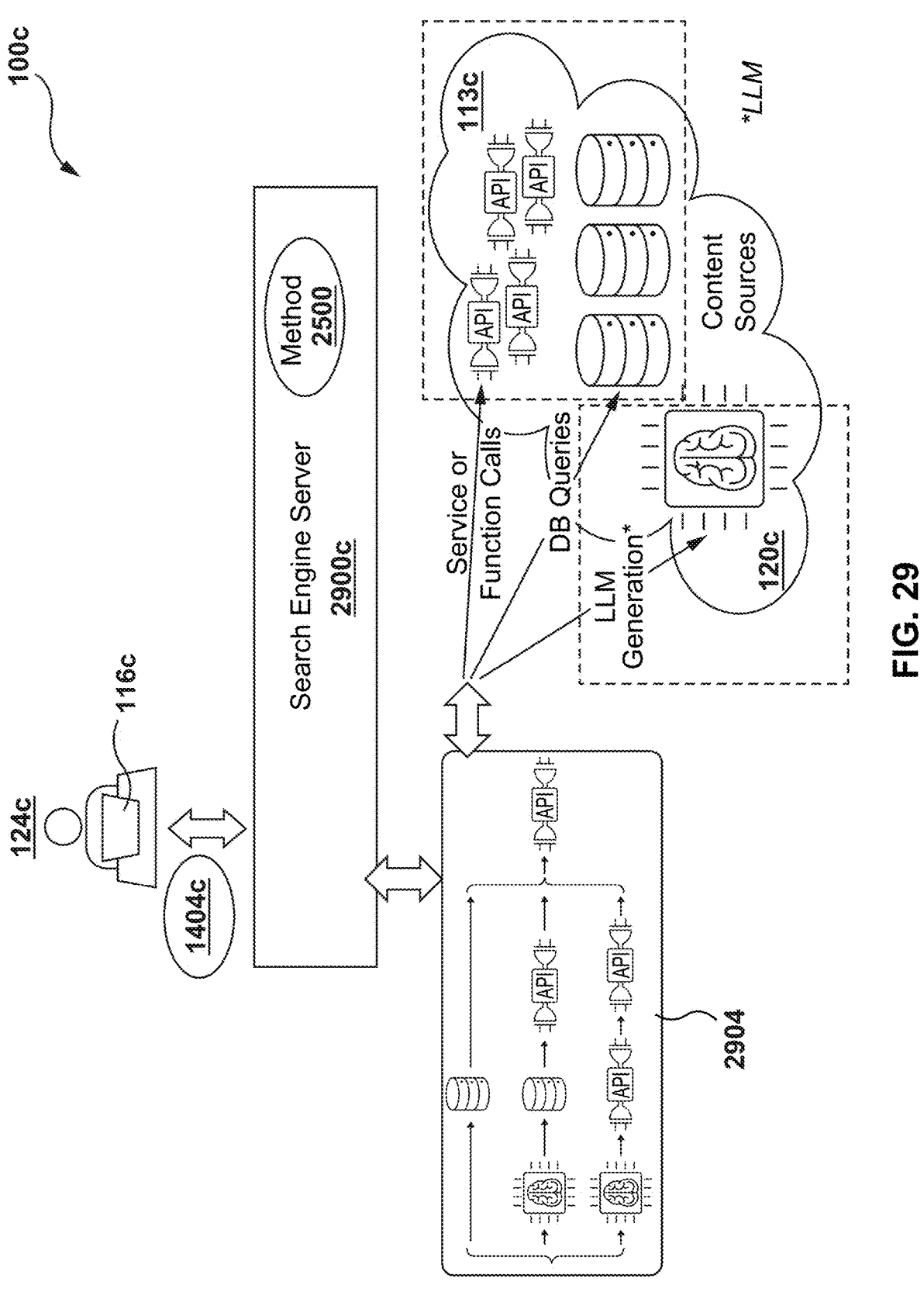
FIG. 29 shows a schematic diagram of another system for dynamic data integration and query management using meta-descriptions.

Referring now to FIG. 29, a further variant on system 100, system 100*a*, and, system 100*b* is shown as system 100*c*. According to system 100*c*, a single search engine server 2900*c* is provided which can access LLM engine 120*c* and effect searches over engines 113*c* using method 2500. Search engine server 2900*c* accommodates conversations 1404*c* with users 124*c* via devices 116*c*. Conversations 1404*c* are processed using method 2500, creating one more query graphs 2904 at block 2528 during iterations through method 2500 throughout the course of conversation 1404*c*, eventually executing a query at block 2532. Such query graphs 2904 represent a chain of thought that can be used to efficiently effect intentions from conversation 1404*c*.

It is to be re-emphasized that method 2500 can thus be performed using different architectures, such as system 100*b* or system 100*c*. In other words, the exact hardware element that performs each block in method 2500 can vary according to a desired infrastructure. Indeed, in a still further variant LLM engine 120*c* can be incorporated directly into search engine server 2900*c*. Likewise, a person of skill in the art will appreciate that the single search engine server 2900*c* in system 100*c* combines the functionality of collaboration platform 104*b* with travel management engine 122*b*. At the same time, recall that system 100*c* is agnostic to use cases beyond travel, hence system 100*c* only makes reference to engines 113*c* rather than being limited to travel actor engines 112*b*. Again, a person of skill in the art will recognize how aspects of system 100, system 100*a*, system 100*b* or system 100*c*, and their associated methods, may be combined, and will recognize that many different architectures can support performance of method 2500.

A further enhancement to system 100*b* and method 2500 involves the application of 'Generic Descriptors' and 'Specific Descriptors' for dynamic data integration and query management. These descriptors can serve as meta-descriptions (per block 2512) that guide generation of query graphs (block 2528) across various engines, including engines 112*b*, engines 113*b*, and LLM engine 120*b*, providing a unified standard while allowing for source-specific customizations.

Thus, 'Generic Descriptors', as applied within system 100*b*, define standard instructions for the types of data sources typically encountered across network 108*b*. These generic descriptors can provide a structured template for accessing and querying data from a broad array of sources, regardless of their specific functions or operational contexts. For instance, the Generic Descriptors ensure that travel management engine 122*b* can uniformly interact with multiple travel actor engines 112*b*, each possibly adhering to different API specifications but under a unified querying framework.

On the other hand, 'Specific Descriptors' allow for the tailoring of these interactions to the unique characteristics and requirements of each node (e.g. engine 112*b* or engine 113*c*) within network 108*b*. They enable system 100*b* to modify or extend the generic instructions based on the specific capabilities or data offerings of individual engines, such as those represented by engines 113*b*. This specific tailoring accommodates special functionalities or data formats that are unique to certain nodes (engines 112*b* or engines 113*b*), thereby optimizing data retrieval and integration.

In the context of system 100*c*, as depicted in FIG. 29, these descriptors enhance the functionality of search engine server 2900*c* by providing a means to generate, manage, and refine the query graphs for executing method 2500. The integration of Generic and Specific Descriptors allows that LLM engine 120*c* to produce more targeted and efficient query outputs, reducing redundancy and improving response times across the system.

The application of these generic and specific descriptors bolsters capabilities to adapt to and incorporate varied data source characteristics seamlessly. It can also foster a more robust and flexible infrastructure, where changes in external data source specifications or the introduction of new sources can be accommodated with minimal adjustments to the underlying system configuration.

Advantageously, the introduction of Generic and Specific Descriptors thus marks an enhancement in the architecture of system 100*b* and system 100*c*, enabling a more scalable, adaptable, and efficient framework for handling complex and diverse data environments, supporting a wide array of applications from travel to broader data-intensive services. Generic and Specific Descriptors can reduce the number of tokens necessary to handle similar API, thereby optimizing cost since LLM are services usually billed on the number of tokens, and reducing hallucinations since the shorter the instructions, the better. Overall, the generation of the query graph at block 2528 can be done in a controlled fashion, since the LLM engine does not have to guess how to combine the sources, and there are fewer branches to explore to generate the shortest path in the query graph.

The present specification provides certain other advantages over the prior art. First, method 2500 addresses the over-reliance on large language models (LLMs) to interpret and convert natural language directly into executable queries or function calls, which can thereby lead to excessive token usage and/or hallucination and/or otherwise inefficient use of processing, memory and bandwidth within a system such as system 100 or its variants. By enhancing the contextual understanding of these models using method 2500, the specification reduces the likelihood of errors that stem from ambiguities inherent in natural language processing.

Furthermore, the present specification introduces a robust framework for syntactic and semantic checks, so that the queries generated by LLMs are not only structurally correct but also contextually appropriate through the disciplined creation of a query graph at block 2528. This reduces the risk of executing incorrect or irrelevant queries at block 2532, thereby increasing operational efficiency and reducing computational waste.

Additionally, the specification refines the connectivity process between the LLMs (such as LLM engine 120c) and engines 112c and/or engines 113c. By streamlining this aspect, the system accommodates changes in API structures with agility, facilitating updates and modifications to query graphs without substantial reconfiguration of the underlying models. This flexibility keeps the system effective even as external data interfaces evolve.

Overall, the present specification mitigates the limitations observed in the prior art, offering a solution that improves the accuracy and reliability of automated query generation and enhances the scalability and adaptability of systems employing LLMs for functional tasks. These advancements represent a substantial step forward in the application of language models in practical, real-world environments.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A search engine server including a network interface, a processor and a memory for storing programming instructions executable on the processor; the network interface for connecting the processor to a network; the programming instructions when executed by the processor cause the processor to:

establish a conversational session over the network with a client device via the network interface, the conversational session including a plurality of messages between the client device and the search engine server;

determine at least one parameter from a request intention within the conversational session based on natural language processing of at least one message of the plurality of messages;

determine a meta-description based on the at least one parameter;

select, based on the at least one parameter and the meta-description, a first plurality of nodes representing sources within a full domain of sources; the sources including at least one of a function call via an application programming interface (API); a database; and a large language model;

determine at least one additional parameter based on natural language processing of at least one further message of the plurality of messages;

adjust, based on criteria, the first plurality of nodes into a second plurality of nodes;

create a query graph including the second plurality of nodes respective to a plurality of identified sources; and, execute a query to the plurality of identified sources over the network, the query based on the request intention using the query graph;

wherein the criteria includes:

the at least one additional parameter; and, a selected number of tokens for creation of the query graph;

the selected number of tokens being:

i) less than an original number of tokens for the first plurality of nodes, such that the query produces an equivalent result using either the first plurality of nodes or the second plurality of nodes; and, ii) determined by a token limitation algorithm that configures a large language model engine to operate within a predefined token range; the token limitation algorithm dynamically reallocating saved tokens to represent additional sources within the query graph without necessitating multiple calls.

2. The search engine server of claim 1 wherein the meta-description is used by the large language model engine to select the plurality of nodes.

3. The search engine server of claim 1 wherein the at least one additional parameter is based on a missing, overly broad or unstructured parameter from the at least one parameter determined from the request intention.

4. The search engine server of claim 3 wherein the request intention is planning a travel itinerary and the plurality of sources includes selecting the API and/or the database hosted by a subset of a plurality of online travel solution providers within the full domain of sources.

5. The search engine server of claim 4 wherein selecting is further based on one or more of a number of travel actor options, price, and availability of travel packages.

6. The search engine server of claim 4 wherein adjusting includes adding an additional node to the selected nodes representing at least one of: a) a travel database of a travel website and b) a general knowledge large language model that includes general knowledge of activities associated with a destination in the travel itinerary.

7. The search engine server of claim 6 wherein adjusting includes removing a superfluous one of the selected nodes in the query graph based on content of the additional node.

8. The search engine of claim 4 wherein the at least one additional parameter is based on at least one of a destination, a travel period, a budget and an activity.

9. The search engine server of claim 3 wherein the at least one additional parameter is determined based on limitation of content available from the selected nodes in comparison to the request intention.

10. The search engine server of claim 1 wherein the request intention includes planning a dining excursion.

11. The search engine server of claim 1 wherein the request intention includes planning an entertainment activity.

12. The search engine server of claim 1 wherein the request intention includes defining an investment portfolio.

13. The search engine server of claim 1 wherein the request intention includes planning a renovation.

14. A computer implemented method for searching comprising:

establishing a conversational session over the network with a client device via a network interface, the conversational session including a plurality of messages between the client device and a search engine server;

determining at least one parameter from a request intention within the conversational session based on natural language processing of at least one message of the plurality of messages;

determining a meta-description based on the at least one parameter;

select, based on the at least one parameter and the meta-description, a first plurality of nodes representing sources within a full domain of sources; the sources including at least one of a function call via an application programming interface (API); a database; and a large language model;

determining at least one additional parameter based on natural language processing of at least one further message of the plurality of messages;

adjusting, based on criteria, the first plurality of nodes into a second plurality of nodes;

creating a query graph including the second plurality of nodes respective to a plurality of identified sources; and, executing a query to the plurality of identified sources over the network, the query based on the request intention using the query graph;

wherein the criteria includes:

the at least one additional parameter; and, a selected number of tokens for creation of the query graph;

the selected number of tokens being:

i) less than an original number of tokens for the first plurality of nodes, such that the query produces an equivalent result using either the first plurality of nodes or the second plurality of nodes; and, ii) determined by a token limitation algorithm that configures a large language model engine to operate within a predefined token range; the token limitation algorithm dynamically reallocating saved tokens to represent additional sources within the query graph without necessitating multiple calls.

15. The method of claim 14 wherein the at least one additional parameter is based on a missing, overly broad or unstructured parameter from the at least one parameter determined from the request intention.

16. The method of claim 15 wherein the request intention is planning a travel itinerary and the plurality of sources includes selecting the API and/or the database hosted by a subset of a plurality of online travel solution providers within the full domain of sources.

17. A non-transitory computer readable medium storing a plurality of programming instructions for a search engine server implementing a method for:

establishing a conversational session over a network with a client device via a network interface, the conversational session including a plurality of messages between the client device and the search engine server;

determining at least one parameter from a request intention within the conversational session based on natural language processing of at least one message of the plurality of messages;

determining a meta-description based on the at least one parameter;

select, based on the at least one parameter and the meta-description, a first plurality of nodes representing sources within a full domain of sources; the sources including at least one of a function call via an application programming interface (API); a database; and a large language model;

determining at least one additional parameter based on natural language processing of at least one further message of the plurality of messages;

adjusting, based on criteria, the first plurality of nodes into a second plurality of nodes;

creating a query graph including the second plurality of nodes respective to a plurality of identified sources; and, executing a query to the plurality of identified sources over the network, the query based on the request intention using the query graph;

wherein the criteria includes:

the at least one additional parameter; and, a selected number of tokens for creation of the query graph;

the selected number of tokens being:

i) less than an original number of tokens for the first plurality of nodes, such that the query produces an equivalent result using either the first plurality of nodes or the second plurality of nodes; and, ii) determined by a token limitation algorithm that configures a large language model engine to operate within a predefined token range; the token limitation algorithm dynamically reallocating saved tokens to represent additional sources within the query graph without necessitating multiple calls.

18. The non-transitory computer readable media of claim 17 wherein the at least one additional parameter is based on a missing, overly broad or unstructured parameter from the at least one parameter determined from the request intention.

19. The non-transitory computer readable media of claim 18 wherein the request intention is planning a travel itinerary and the plurality of sources includes selecting the API and/or the database hosted by a subset of a plurality of online travel solution providers within the full domain of sources.

* * * * *